US012458555B2

(12) United States Patent
Nordt, III

(10) Patent No.: US 12,458,555 B2
(45) Date of Patent: Nov. 4, 2025

(54) SHORT ARC, HIGH FREQUENCY CONSTANT PASSIVE MOTION MACHINES AND METHODOLOGIES

(71) Applicant: William E. Nordt, III, Charles City, VA (US)

(72) Inventor: William E. Nordt, III, Charles City, VA (US)

( * ) Notice: Subject to any disclaimer, the term of this patent is extended or adjusted under 35 U.S.C. 154(b) by 1010 days.

(21) Appl. No.: 17/521,281

(22) Filed: Nov. 8, 2021

(65) Prior Publication Data

US 2022/0142848 A1 May 12, 2022

Related U.S. Application Data

(60) Provisional application No. 63/110,637, filed on Nov. 6, 2020.

(51) Int. Cl.
*A61H 1/02* (2006.01)

(52) U.S. Cl.
CPC ..... *A61H 1/024* (2013.01); *A61H 2201/1215* (2013.01); *A61H 2201/149* (2013.01); *A61H 2201/1642* (2013.01); *A61H 2201/1676* (2013.01)

(58) Field of Classification Search
CPC .. A61H 1/02; A61H 1/024; A61H 2201/1215; A61H 2201/149; A61H 2201/1676
See application file for complete search history.

(56) References Cited

U.S. PATENT DOCUMENTS

| | | | | |
|---|---|---|---|---|
| 4,665,899 A * | 5/1987 | Farris | A61H 1/0259 | 601/33 |
| 4,834,073 A * | 5/1989 | Bledsoe | A61H 1/0259 | 601/34 |
| 5,170,776 A * | 12/1992 | Pecheux | A61H 1/0266 | 601/87 |
| 5,399,147 A * | 3/1995 | Kaiser | A61H 1/0255 | 601/16 |
| 2011/0208098 A1* | 8/2011 | Zaborowski | A61H 1/0274 | 601/33 |
| 2015/0374574 A1* | 12/2015 | Cataldi | A63B 21/00178 | 601/5 |

FOREIGN PATENT DOCUMENTS

WO WO-2019239088 A1 * 12/2019 ......... A63B 23/0417

* cited by examiner

*Primary Examiner* — Brandy S Lee
*Assistant Examiner* — Mishal Zahra Hussain
(74) *Attorney, Agent, or Firm* — TILLMAN WRIGHT, PLLC; Chad D. Tillman

(57) ABSTRACT

A micro constant passive motion machine for applying short arc constant passive motion to a knee joint of a user includes a base member and a sliding member secured to the base member so as to permit sliding, translational movement of the sliding member relative to the base member. The machine further includes a leg receiving member secured to the sliding member, and one or more motors. The machine further includes a primary rotative component whose rotation is configured to effect, via a connection strut secured to the primary rotative component and the base member, short arc sliding, translational movement of the sliding member relative to the base member. The machine still further includes a second rotative component whose rotation is configured to effect, via a pivot member, continually alternating rotation of the leg receiving member.

18 Claims, 61 Drawing Sheets

Prior Art

Prior Art

24

SHORT ARC, HIGH FREQUENCY CONSTANT PASSIVE MOTION MACHINES AND METHODOLOGIES

CROSS-REFERENCE TO RELATED APPLICATION

The present application is a U.S. nonprovisional patent application of, and claims priority under 35 U.S.C. § 119(e) to, U.S. provisional patent application 63/110,637, filed Nov. 6, 2020, which provisional patent application is incorporated by reference herein.

COPYRIGHT STATEMENT

Any new and original work of authorship in this document—including any source code—is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The present invention generally relates to promoting joint health.

Musculoskeletal joints are complicated systems comprising bone, cartilage, ligaments, tendons, muscles, nerves and an internal fluid ecosystem of chemical mediators. Joints operate to enable motion. Joint motion and pressure are known to promote joint health, and may, for example, aid with joint maintenance, healing, and regeneration. The mechanisms by which joint motion enhances joint health include joint lubrication, blood flow and oxygenation, ligament, muscle and tendon lengthening and shortening, bone and cartilage metabolism, pain control, joint flexibility, and neurologic input/output and proprioception.

Joint movement and pressure create mechanical, chemical, and electrical signals to the cellular structure of the joint organ system. Receptors within a joint receive these signals and initiate a cell-level response to joint motion. Cells respond to regulate the homeostasis of the joint milieu.

Certain metabolic processes of a joint are based on the mechanical cellular environment. The quantity or volume of joint movement is thought to affect the cellular response to increase or decrease metabolism within that joint. As to what amount of joint motion is advantageous, or destructive, to joint health, this remains the subject of research and debate.

When considering (e.g. attempting to measure or quantify) joint movement, it can be useful to consider the magnitude of pressure that joint cells experience, the frequency of pressure the joint cells experience, and the vector of these forces (magnitude and direction).

Force can be assessed in compression (e.g. pushing together), tension (e.g. pulling apart), and shear (e.g. sliding on another surface). An applied or experienced force can be broken down into these three types of force.

Cells respond favorably, or unfavorably, based on some combination of these forces—in magnitude, direction and frequency. For example, physiological loading can involve an optimal combination of these forces to regenerate cartilage optimally.

Further, characteristics of movement are dependent on degrees of motion, or motion arc.

Movement can be described with reference to directionality, magnitude, frequency, and arc.

With respect to directionality, movement in three dimensional space of any joint can be defined in three planes (e.g. with respect to three axes—x, y, and z): coronal, sagital and transverse. The delivery of motion to a joint can be separated into each of the planes, as illustrated in FIG. 1. FIG. 2 illustrates exemplary motion of a knee joint through these three planes. This movement can include rotation, extension, flexion, adduction, and abduction. Motion of a joint such as a knee joint can be characterized as triaxial, in that it involves motion through three planes defined by three axes.

With respect to magnitude, this can, for example, be characterized as the amount of force delivered across joint surfaces.

With respect to frequency, this can, for example, be characterized as a number of cycles of motion per unit of time.

With respect to arc, this can, for example, be characterized as a number of degrees of motion through which a joint cycles or traverses, e.g. 90 degrees or 180 degrees.

"Passive" range of motion describes movement of a joint without using one's own muscles. A therapist moving a relaxed leg would be considered to be effecting passive range of motion (ROM) exercise.

Devices known as constant passive motion (CPM) machines are a class of medical machinery that delivers passive ROM to one or more joints. A traditional CPM machine slowly moves a selected joint through a defined movement arc. CPM machines are known to improve ROM and possibly increase anabolic/regenerative behavior. These devices are traditionally based on slow, long-arc motion, in essence to establish full ROM of one or more joints. CPM machines can be applied to almost any joint. For example, a traditional knee CPM machine concerns itself with flexion and extension of the knee through a long, slow arc of motion.

Needs exist for improvement in constant passive motion machines and methodologies. These and other needs are addressed by one or more aspects of the present invention.

SUMMARY OF THE INVENTION

The present invention includes many aspects and features. Moreover, while many aspects and features relate to, and are described in, a particular context, the present invention is not limited to use only in this context, as will become apparent from the following summaries and detailed descriptions of aspects, features, and one or more embodiments of the present invention.

Accordingly, one aspect of the present invention relates to a micro constant passive motion machine for applying short arc constant passive motion to a knee joint of a user. The machine includes a base member including an adjustable stand member rotatably secured thereto, and a sliding member secured to the base member using one or more slide mechanisms which permit sliding, translational movement of the sliding member relative to the base member, the sliding member including a pivot mechanism opening defined therethrough proximate one lengthwise end thereof. The machine further includes a fixed support member secured to, and extending upward from, a top side of the sliding member. The machine further includes a pivot member rotatably secured to the fixed support member with a bottom end of the pivot member extending through the pivot mechanism opening defined through the sliding member. The machine further includes a leg receiving member secured to the pivot member, the leg receiving member being sized and shaped to receive a leg of a user, including a foot of a user. The machine further includes a motor assembly secured to an underside of the sliding member, the motor assembly comprising a motor, and a primary rotative component including a first pulley and a plurality of connection openings defined in a top side of the primary rotative component. The machine further includes a second rotative component rotatably secured to the underside of the sliding member proximate the pivot mechanism opening, the second rotative component comprising a second pulley. The machine further includes a belt mechanically connecting the first pulley of the first rotative component with the second pulley of the second rotative component, such that rotation of the first rotative component by the motor effects rotation of the second rotative component via the belt. The machine further includes a pivot shaft secured to the bottom end of the pivot member, the pivot shaft being mechanically connected to the second rotative component such that rotation of the second rotative component effects side to side pivoting movement of a bottom of the pivot shaft, which in turn effects rotation of the pivot member and the leg receiving member. The machine further includes a connection strut secured proximate a first end to the primary rotative component at one of the connection points, and secured proximate a second end to the base member, such that rotation of the primary rotative component effects sliding, translational movement of the sliding member relative to the base member. The machine is configured such that the motor, when effecting rotation of the primary rotative component, effects both, via the connection strut, sliding, translational movement of the sliding member relative to the base member, and, via the belt and the secondary rotative component, rotation of the pivot member and the leg receiving member.

In a feature of this aspect, the leg receiving member comprises a foot receiving portion.

In a feature of this aspect, the leg receiving member comprises a leg support portion.

In a feature of this aspect, the plurality of connection openings defined in the top side of the primary rotative component are arranged in a spiral configuration.

In a feature of this aspect, the leg receiving member is secured directly to the pivot member.

In a feature of this aspect, the leg receiving member is secured to the pivot member with a hinge member.

In a feature of this aspect, the machine comprises one or more springs secured to the base member and the sliding member configured to dampen sliding, translational movement of the sliding member at one or both ends of a range of motion.

In a feature of this aspect, the machine comprises one or more shock absorbers configured to dampen sliding, translational movement of the sliding member at one or both ends of a range of motion.

In a feature of this aspect, the machine comprises one or more springs secured to the base member and the sliding member configured to assist in lifting of a leg of a user during an up stroke.

In a feature of this aspect, the secondary rotative component comprises a groove receiving and retaining in floating engagement therein an end of the pivot shaft.

In a feature of this aspect, the secondary rotative component comprises a groove receiving and retaining in floating engagement therein an end of the pivot shaft, and wherein the groove is shaped to effect a single oscillation per revolution.

In a feature of this aspect, the secondary rotative component comprises a groove receiving and retaining in floating engagement therein an end of the pivot shaft, and wherein the groove is shaped to effect two oscillations per revolution.

In a feature of this aspect, the secondary rotative component comprises a groove receiving and retaining in floating engagement therein an end of the pivot shaft, and wherein the groove is shaped to effect three oscillations per revolution.

In a feature of this aspect, the secondary rotative component comprises a groove receiving and retaining in floating engagement therein an end of the pivot shaft, and wherein the groove is shaped to effect four oscillations per revolution.

In a feature of this aspect, a pivot strut is secured at one end to the pivot shaft, and is secured at its opposite end to a bottom face of the secondary rotative component such that rotation of the secondary rotative component effects, via the pivot strut, movement of a bottom of the pivot shaft.

In a feature of this aspect, the machine comprises a plurality of rotatable stand members.

In a feature of this aspect, the machine further comprises one or more leaf springs supporting the leg receiving member.

In a feature of this aspect, the machine further comprises one or more leaf springs supporting a calf portion of the leg receiving member.

In a feature of this aspect, the machine further comprises one or more leaf springs secured to both the pivot member and a heel portion of the leg receiving member, the one or more leaf springs being configured to dynamically support a user's heel.

In a feature of this aspect, the leg receiving member comprises a plurality of strap receiving slots.

In a feature of this aspect, the leg receiving member comprises a plurality of strap receiving slots, and wherein hook and loop fastener straps are disposed through the strap receiving slots.

In a feature of this aspect, the pivot member comprises a hinge.

In a feature of this aspect, the machine comprises an anchor hinge member configured to support a calf portion of the leg receiving member.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings, wherein the same elements are referred to with the same reference numerals, and wherein.

DETAILED DESCRIPTION

Figure 1:
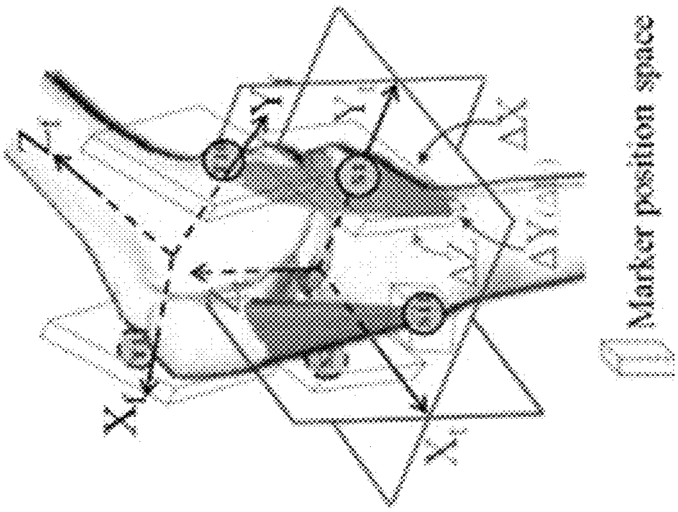
FIG. 1 fancifully illustrates separation of the delivery of motion to a joint into planes.
Figure 2:
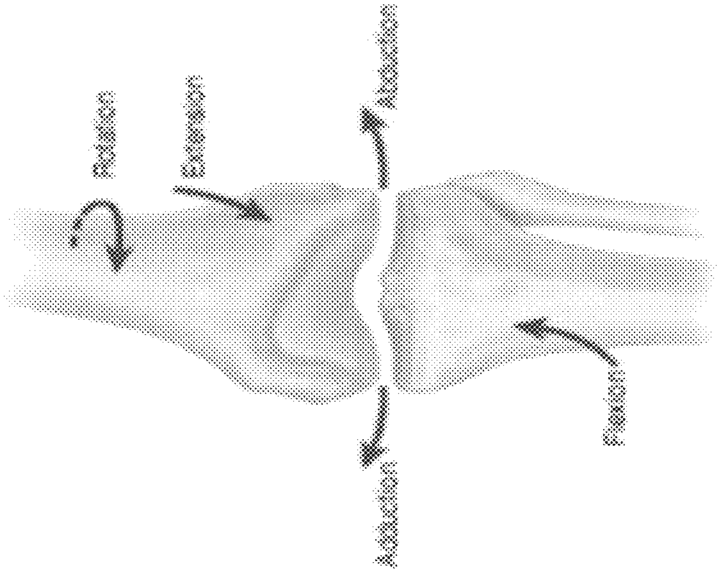
FIG. 2 illustrates exemplary motion of a knee joint through the three planes illustrated in FIG. 1.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

As noted above, a conventional CPM machine slowly moves a selected joint through a defined movement arc, which is traditionally a slow, long-arc motion. For example, conventional knee CPM machines focus on flexion and extension of the knee slowly through a long arc of motion.

In accordance with one or more preferred implementations, a constant passive motion machine is configured to deliver high-frequency short-arc movement for promoting joint health, e.g. knee health. In accordance with one or more preferred implementations, a CPM machine that delivers high-frequency, short-arc movement can be characterized as a short-arc CPM machine, or a micro CPM machine.

Figure 3A:
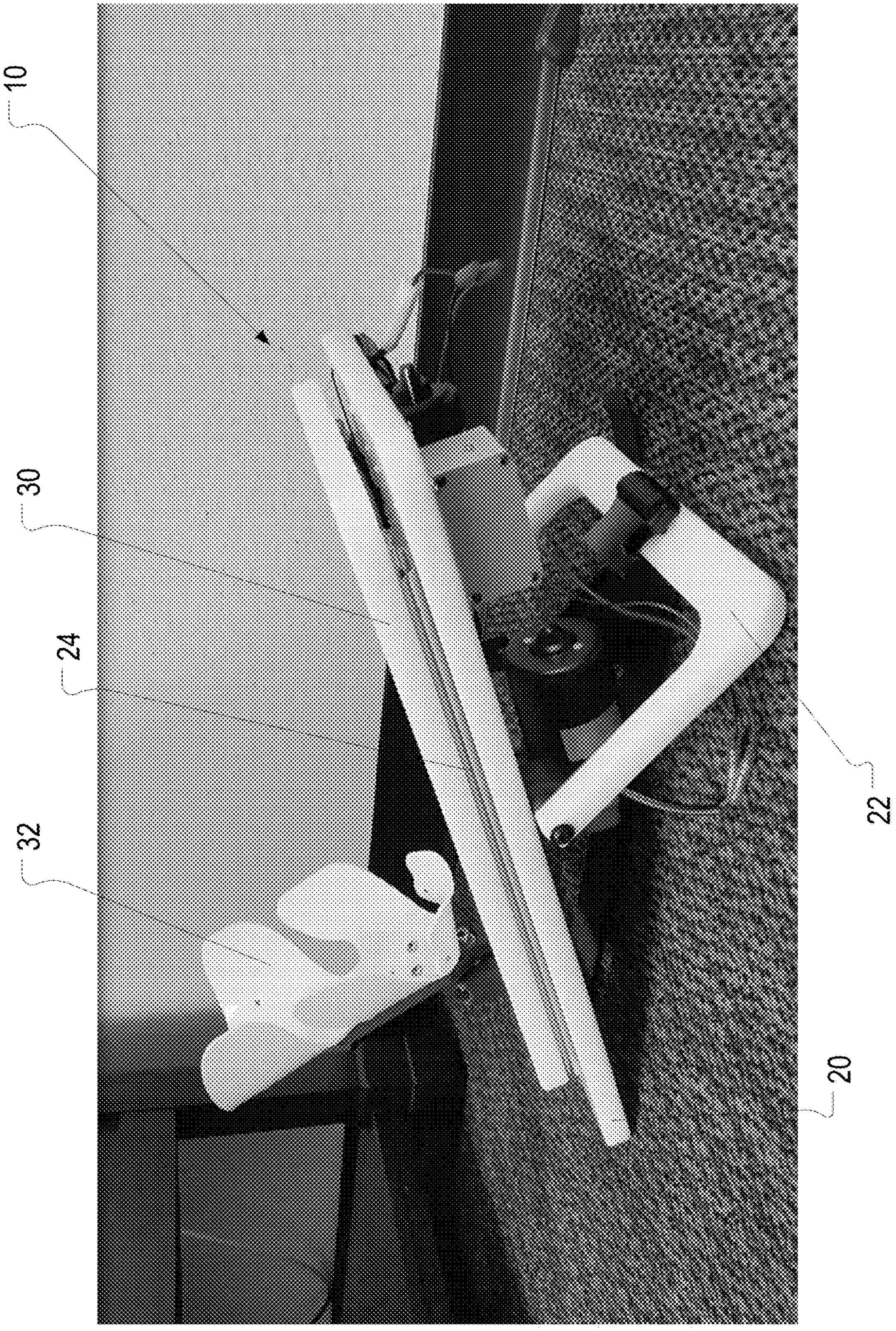
FIGS. 3A and 3B illustrate an exemplary micro CPM machine 10 in accordance with one or more preferred implementations.
Figure 3B:
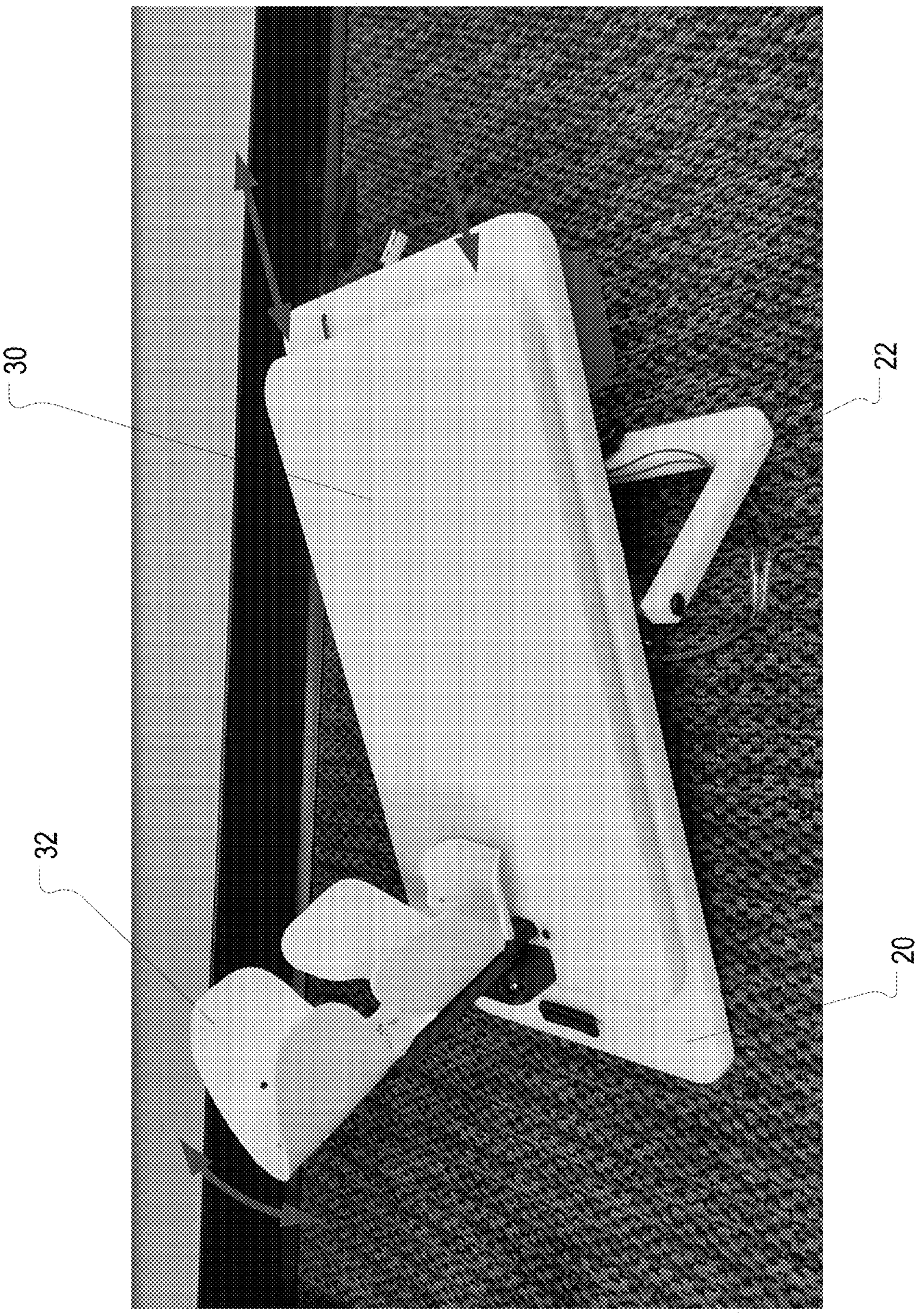
Figure 4A:
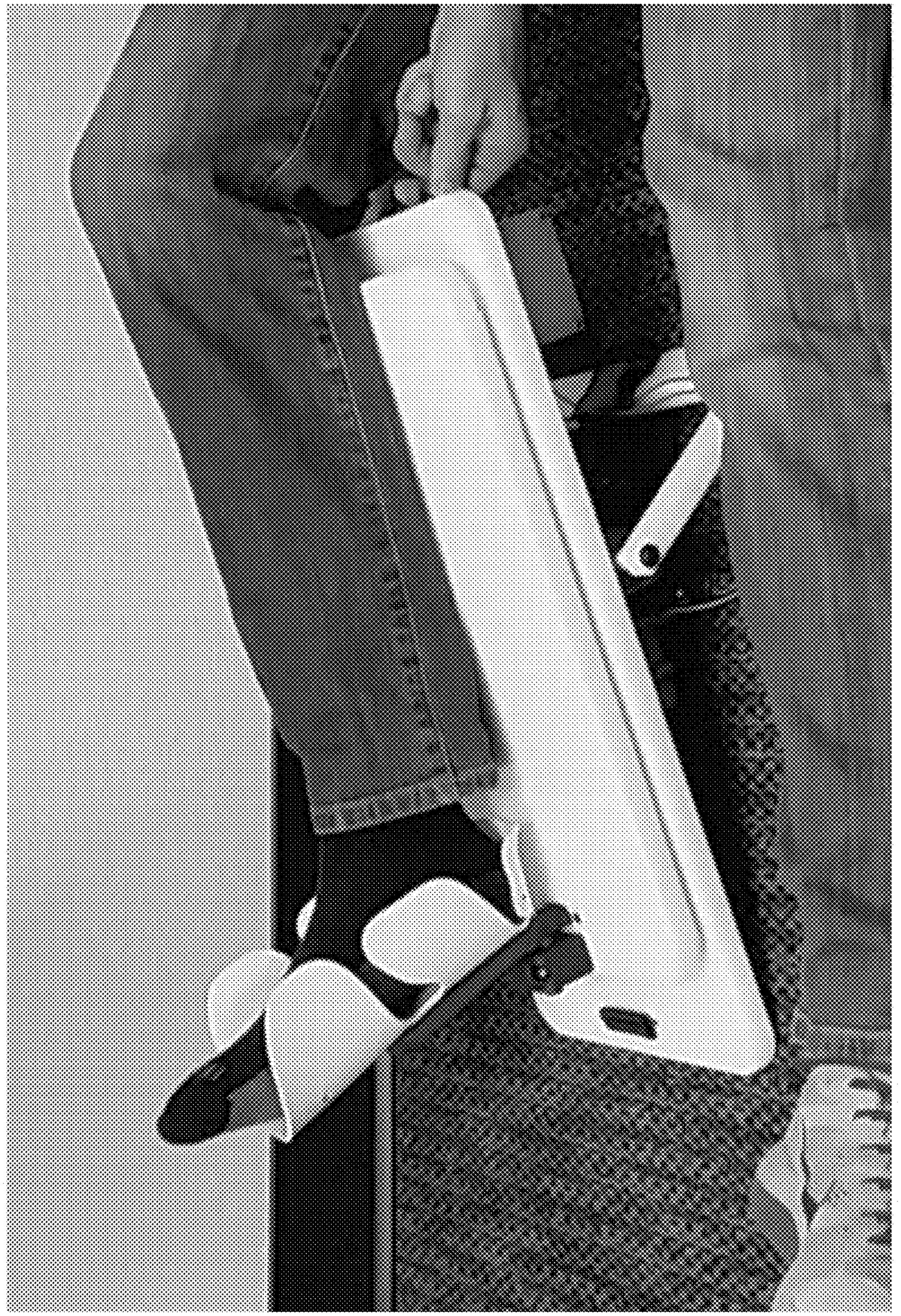
FIGS. 4A-E illustrate sliding, translational movement of the sliding member 30 and the foot receiving member 32 relative to the base member 20.
Figure 4B:
Figure 4C:
Figure 4D:
Figure 4E:

FIGS. 3A and 3B illustrate an exemplary micro CPM machine 10 in accordance with one or more preferred implementations. The micro CPM machine 10 includes a base member 20 including an adjustable stand 22 rotatably secured thereto. The micro CPM machine 10 further includes a sliding member 30 configured for sliding, translational movement relative to the base member 20. The micro CPM machine 10 further includes a foot receiving member 32 configured to receive a user's foot for use of the micro CPM machine 10.

As noted, the sliding member 30 is configured for sliding, translational movement relative to the base member 20, as illustrated by the two parallel arrows in FIG. 3B. This sliding movement is facilitated by slide members 24 disposed between the base member 20 and the sliding member 30. In particular, each slide member comprises a first mating slide member secured to the base member 20, and a second mating slide member secured to the sliding member 30. The first and second mating slide members are configured to mate with one another in sliding engagement.

Further, the micro CPM machine 10 is configured to effect rotative movement of the foot receiving member 32 back and forth during sliding translational movement of the sliding member 30, as illustrated by the additional arrow in FIG. 3B.

Figure 5A:
FIGS. 5A-5B perhaps illustrate rotational movement of the foot receiving member 32 back and forth.
Figure 5B:

In use, a user's foot is disposed within the foot receiving member 32, and a control mechanism is actuated which causes a motor to simultaneously effect both: (i) sliding, translational movement of the sliding member 30 and the foot receiving member 32 relative to the base member 20; and (ii) rotational movement of the foot receiving member 32 back and forth. FIGS. 4A-E perhaps best illustrate such sliding, translational movement of the sliding member 30 and the foot receiving member 32 relative to the base member 20. FIGS. 5A-5B perhaps best illustrate such rotational movement of the foot receiving member 32 back and forth.

Two key points of distinction from traditional knee CPM machines are worth emphasizing. First, this sliding, translational movement of the sliding member 30 and the foot receiving member 32 relative to the base member 20 effects a much shorter arc of motion than a traditional knee CPM machine. Second, in contrast to traditional knee CPM machines which involve only motion in a single plane, the micro CPM machine 10 via the rotational movement of the foot receiving member 32 back and forth also incorporates movement in a second plane, e.g. movement of the user's foot through another plane of movement (involving rotation at the ankle, knee, or hip).

Figure 6:
FIG. 6 illustrates a motor.

As noted above, the CPM machine 10 includes a motor which effects the described movement. FIG. 6 illustrates this motor 60. It will be appreciated that various configurations of components (e.g. belts, cams, gears, struts, etc.) can be utilized to translate rotative movement from the motor into the described movement. Details regarding exemplary configurations of components to translate rotative movement from the motor into the described movement are provided hereinbelow.

Figure 7:
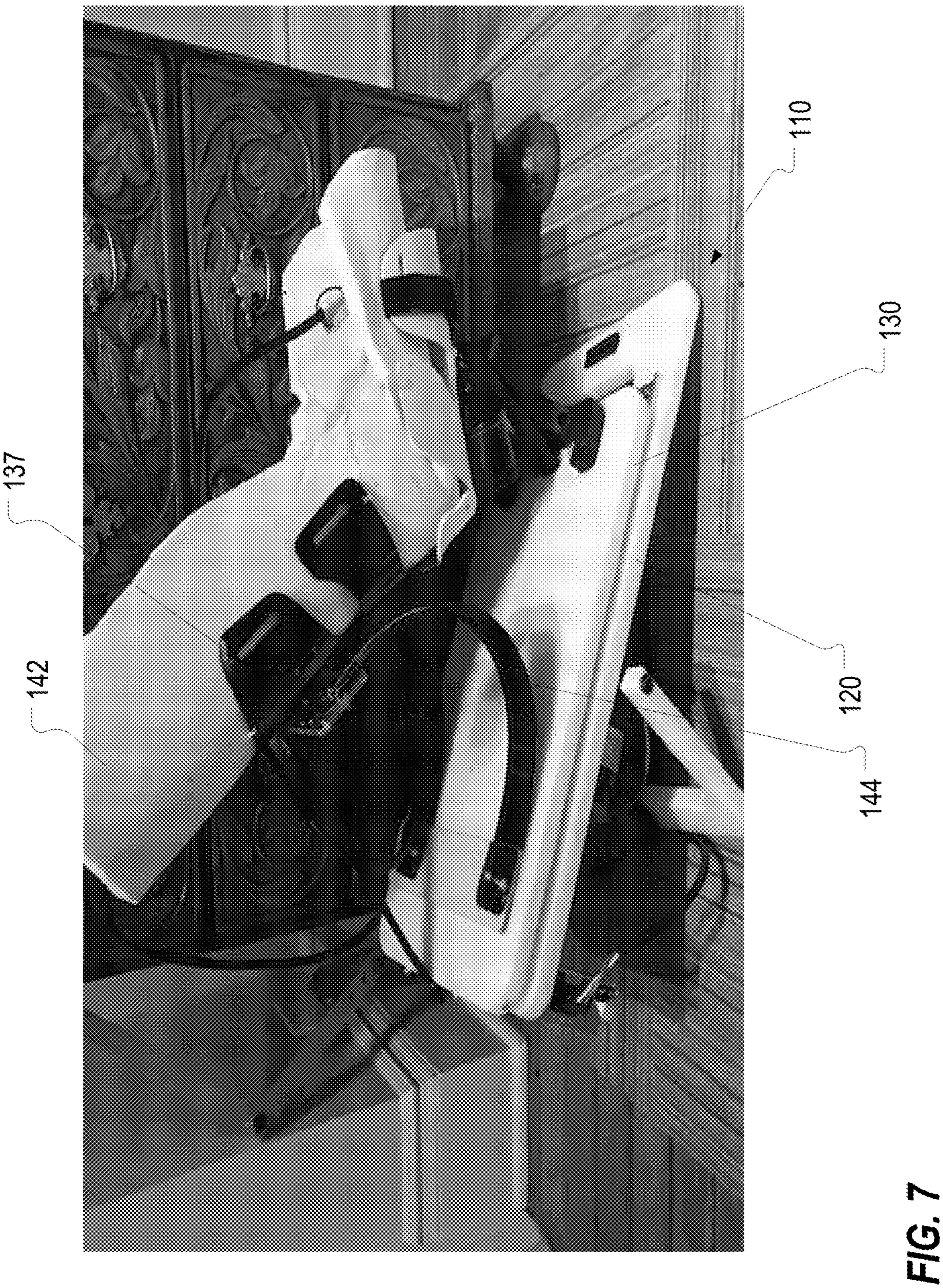
FIG. 7 illustrates another exemplary micro CPM machine 110 in accordance with one or more preferred implementations.
Figure 8:
FIG. 8 illustrates leaf springs configured to dynamically support a user's leg when using the micro CPM machine 110.

FIG. 7 illustrates another exemplary micro CPM machine 110 in accordance with one or more preferred implementations. The micro CPM machine 110 is similar to the micro CPM machine 10 in that it comprises a base member 120 and a sliding member 130 configured for sliding, translational movement relative to the base member 120. As with the micro CPM machine 10, the micro CPM machine 110 includes The micro CPM machine 110 similarly likewise includes a foot receiving member 132 configured to receive a user's foot for use of the micro CPM machine 110. However, in contrast to the micro CPM machine 10, the micro CPM machine 110 includes a leg support member 137 extending from, or secured to, the foot receiving member 132. The micro CPM machine 110 further includes two leaf springs 144 configured to dynamically support a user's leg when using the micro CPM machine 110, as illustrated in FIG. 8. The micro CPM machine 110 can include, and be used with, padding sized and dimensioned to support a user's leg, as illustrated in FIG. 7, although it does not have to be used with such padding, as illustrated in FIG. 8.

Like the micro CPM machine 10, the micro CPM machine 110 is configured to effect rotative movement of the foot receiving member 132 back and forth during sliding translational movement of the sliding member 130.

The micro CPM machine 110 includes a fixed support member 133 secured to, and extending upward from, an upper surface of the sliding member 130. A pivot member 134 is rotatably connected to this fixed support member 133 via a bolt 136, allowing the pivot member 134 to rotate relative to the fixed support member 133 about the axis defined by the bolt 136. In this regard, movement of the lower end of the pivot member 134 (effected by a motor), effects pivoting (in the opposite direction) of the upper end of the pivot member 134.

The foot receiving member 132 is secured to the upper end of the pivot member 134 via a hinge 135. In particular a first hinge plate of the hinge 135 is secured to a bottom face of the foot receiving member 132, and a second hinge plate of the hinge 135 is secured to a face of the upper end of the pivot member 134, as illustrated in FIG. 8. A heel portion of the foot receiving member 132 is secured to the pivot member 134 via one or more leaf springs 138, which serve to dynamically support a user's heel when used. The leaf springs 144, hinge 135 and the one or more leaf springs 138 collectively enable a user's leg and foot to move through various positions while still remaining dynamically supported. This is helpful during sliding, translational movement of the sliding member 130 relative to the base member 120.

The foot receiving member 132 and the leg support member 137 each include a plurality of strap receiving slots 139 for use with a strap, such as the hook and loop fastener strap 131 illustrated in FIG. 8. The strap receiving slots 139 and one or more straps can be utilized to secure a user's leg.

Figure 9:
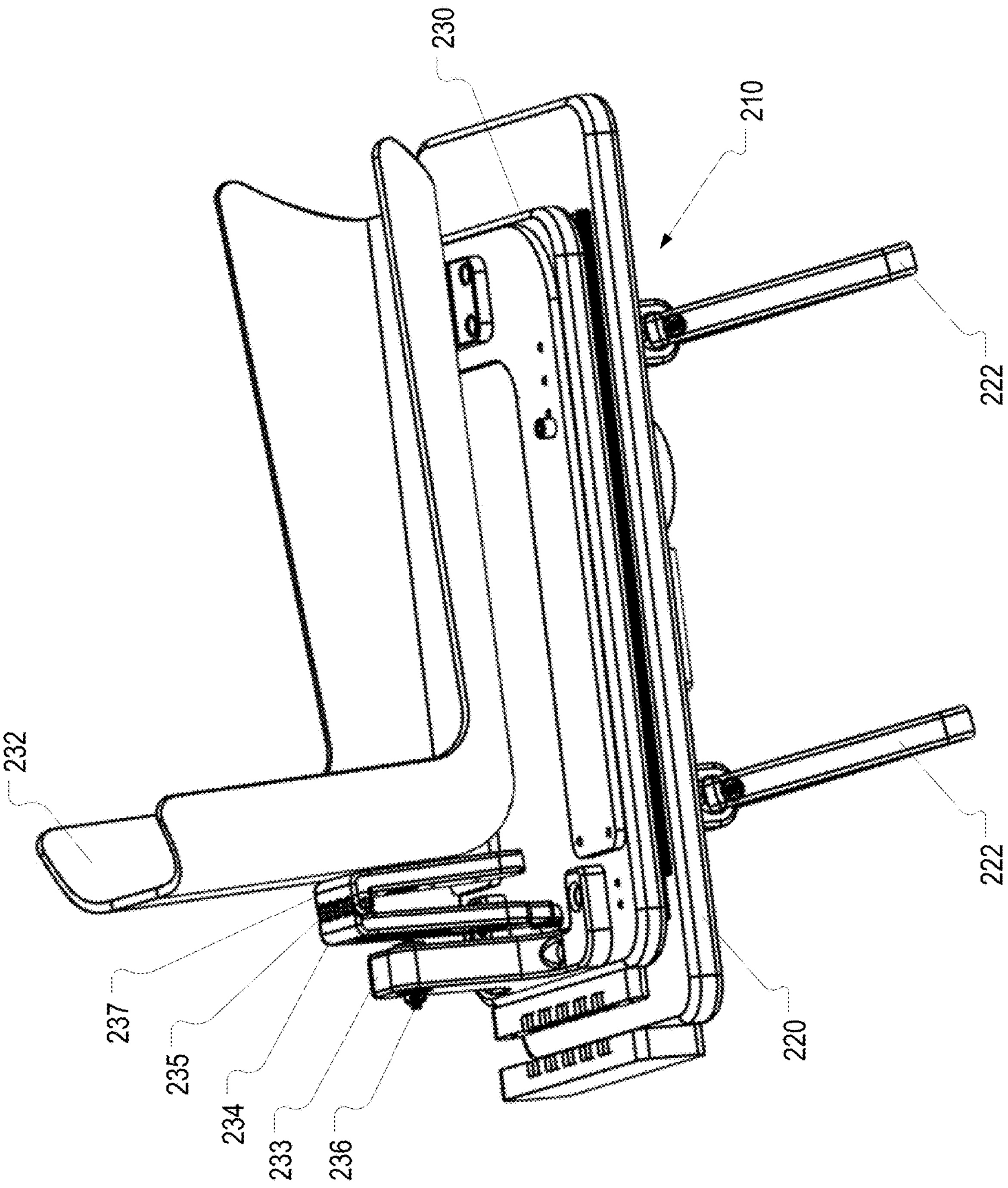
FIG. 9 illustrates another exemplary micro CPM machine 210 in accordance with one or more preferred implementations.

FIG. 9 illustrates another exemplary micro CPM machine 210 in accordance with one or more preferred implementations. The micro CPM machine 210 is similar to the micro CPM machine 10 and the micro CPM machine 110 in that it comprises a base member 220 and a sliding member 230 configured for sliding, translational movement relative to the base member 220. In contrast to the micro CPM machine 10 and the micro CPM machine 110, the micro CPM machine 110 includes two adjustable stand members 222. Various implementations of micro CPM machines may include one, two, or more stand adjustable stand members.

The micro CPM machine 210 includes a leg receiving member 232 comprising both a foot receiving portion and a leg receiving portion.

Like the micro CPM machine 10 and the micro CPM machine 110, the micro CPM machine 210 is configured to effect rotative movement of the leg receiving member 232 back and forth during sliding translational movement of the sliding member 230.

The micro CPM machine 210 includes a fixed support member 233 secured to, and extending upward from, an upper surface of the sliding member 230. A pivot member 234 is rotatably connected to this fixed support member 233 via a bolt 236, allowing the pivot member 234 to rotate relative to the fixed support member 233 about the axis defined by the bolt 236. In this regard, movement of the lower end of the pivot member 234 (effected by a motor), effects pivoting (in the opposite direction) of the upper end of the pivot member 234.

Figure 10:
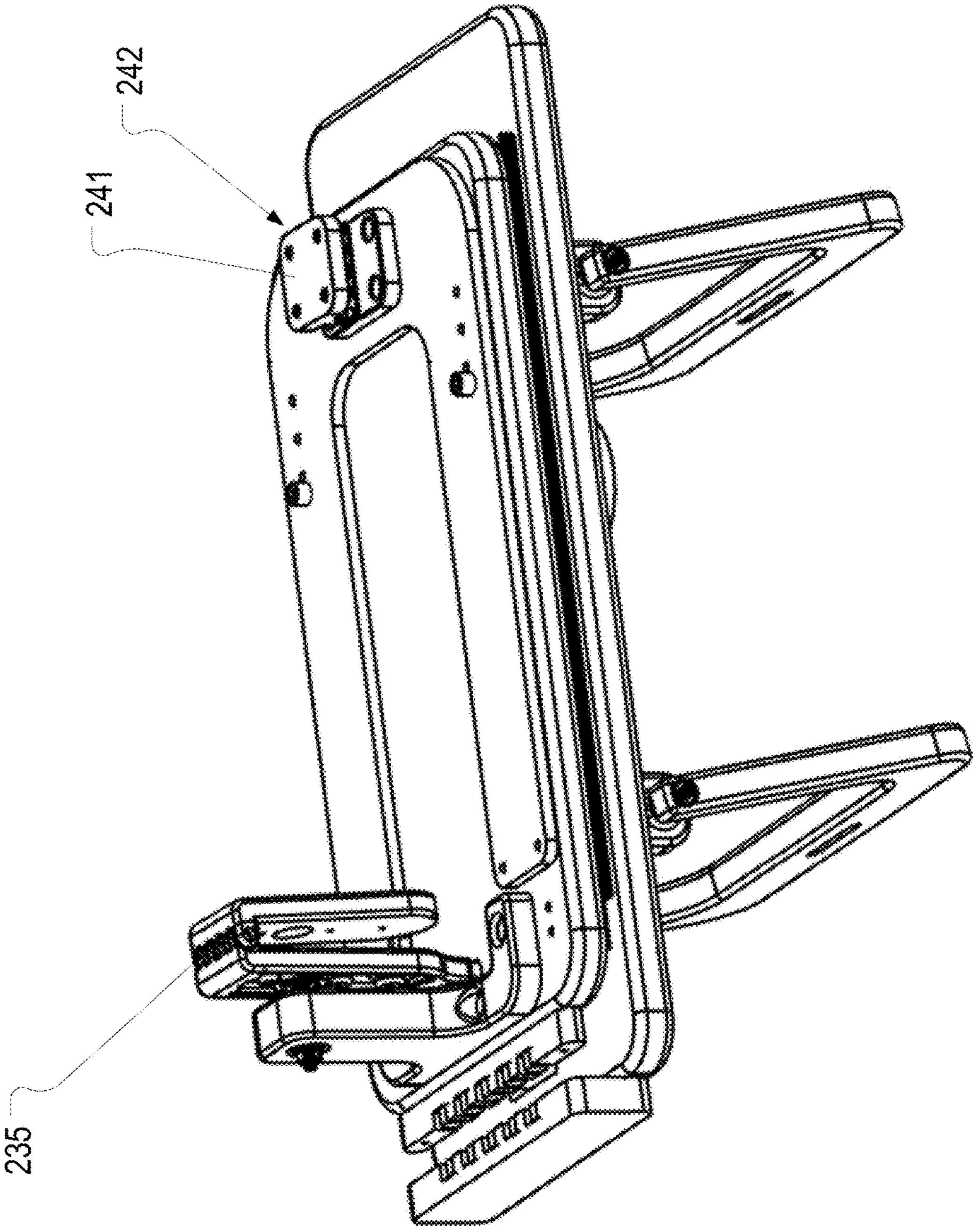
FIGS. 10-31 illustrate components and movement of the micro CPM machine 210.
Figure 11:
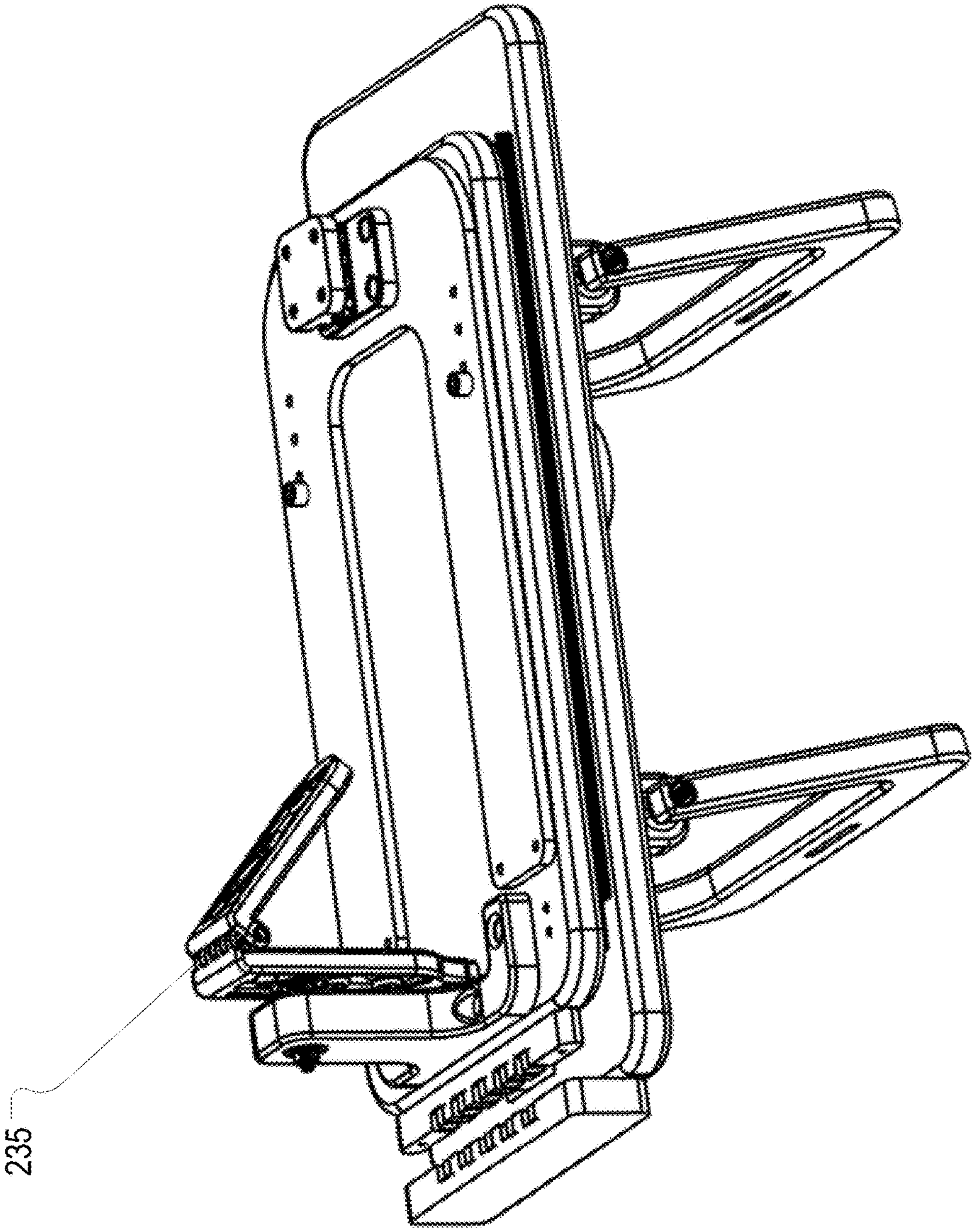

The leg receiving member 232 is secured to the upper end of the pivot member 234 via a hinge member 135. In particular a first hinge plate 237 of the hinge member 235 is secured to a bottom face of the leg receiving member 232, and a second hinge plate 234 of the hinge 235 is secured to a face of the upper end of the pivot member 234, as illustrated in FIG. 9. A heel portion of the leg receiving member 232 is secured to the pivot member 234. The hinge member 235 is configured to allow for rotative movement of the two hinge plates 234,237 relative to one another as illustrated in FIGS. 10-11, in which the leg receiving member 232 is omitted for illustrative clarity.

At the other end of the leg receiving member 232, a portion of the leg receiving member 232 is secured to a pivotable hinge plate 241 of an anchor hinge member 242. These components can be seen in FIG. 10, which is a view of the micro CPM machine 210 with the leg receiving member 232 removed.

Figure 12:
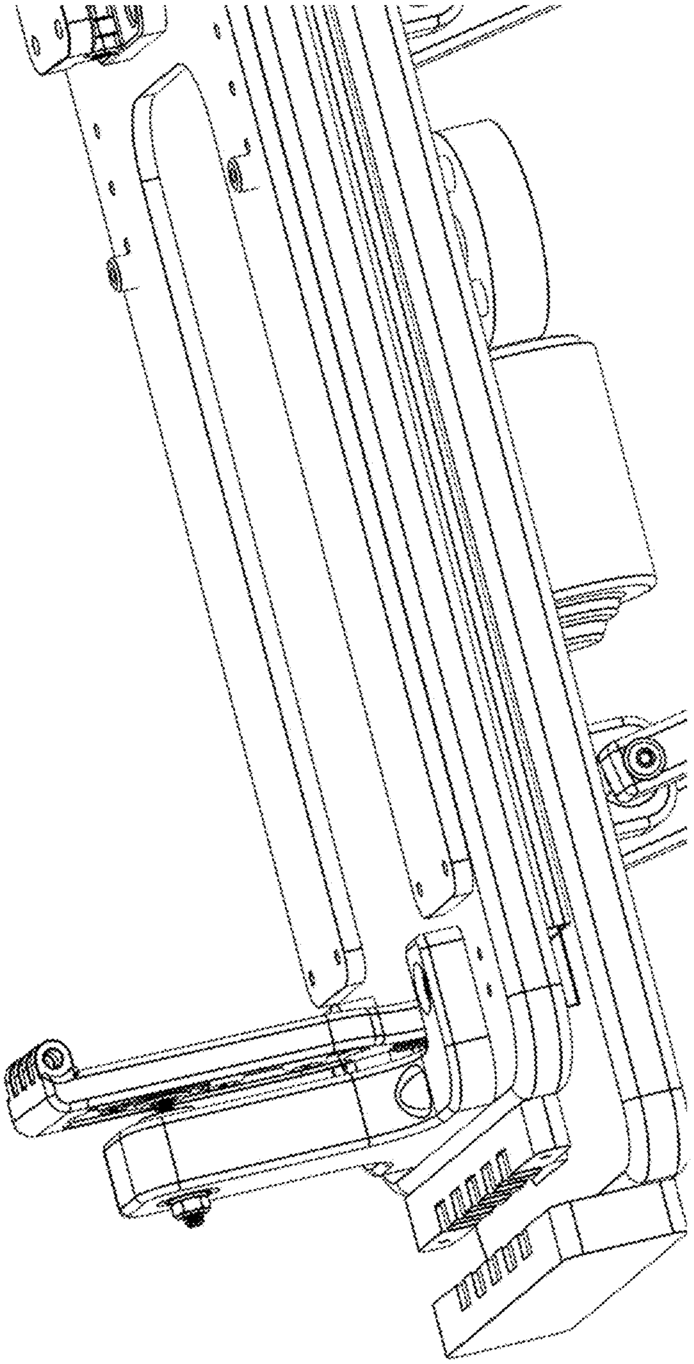

FIG. 12 is another view showing the pivot member 234 rotatably connected to the fixed support member 233 via the bolt 236. As noted above, this allows the pivot member 234 to rotate relative to the fixed support member 233 about the axis defined by the bolt 236, as illustrated by the upper arrow in FIG. 13.

Figure 13:
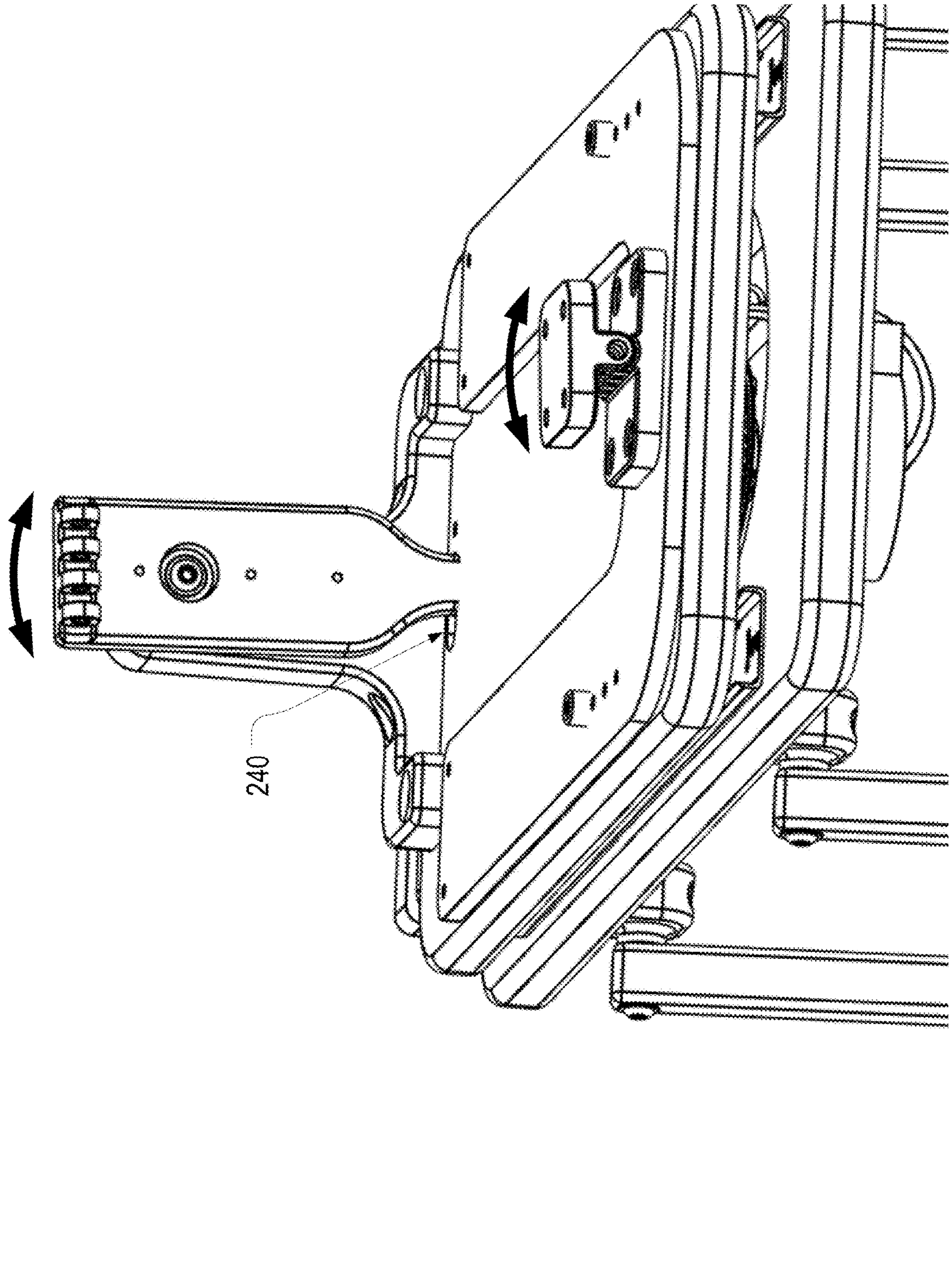

Similarly, the hinge of the anchor hinge member 242 allows for rotation of the pivotable hinge plate 241 about the axis defined by the hinge of the anchor hinge member 242, as illustrated by the lower arrow in FIG. 13.

Notably, the axis defined by the hinge of the anchor hinge member 242 is parallel to the axis defined by the bolt 236, and thus these components collectively enable pivoting of the leg receiving member 232 when it is secured to the pivotable hinge plate 241 of the anchor hinge member 242 and the hinge plate 237 of the hinge member 235.

In this regard, as noted above, movement of the lower end of the pivot member 234 (effected by a motor), effects pivoting (in the opposite direction) of the upper end of the pivot member 234, which in turn effects rotative movement of the connected leg receiving member 232.

The sliding member 230 includes a pivot mechanism opening 240 defined therethrough which is disposed between attachment points of the fixed support member 233, as illustrated in FIG. 13 and FIG. 14 (in FIG. 14, the hinge plate 234 of the hinge member 235 has been removed for illustrative clarity).

The pivot mechanism opening 240 is positioned and dimensioned such that, when the hinge plate 234 of the hinge member 235 is secured to the fixed support member 233 via the bolt 236, the lower end of the pivot member 234 is received within the pivot mechanism opening 240. In accordance with one or more preferred implementations, the position, shape, and dimensions of the pivot mechanism opening 240, together with the shape and dimensions of the lower end of the pivot member 234, cause the pivot mechanism opening 240 to effectively bound movement of the lower end of the pivot member 234.

Figure 14A:
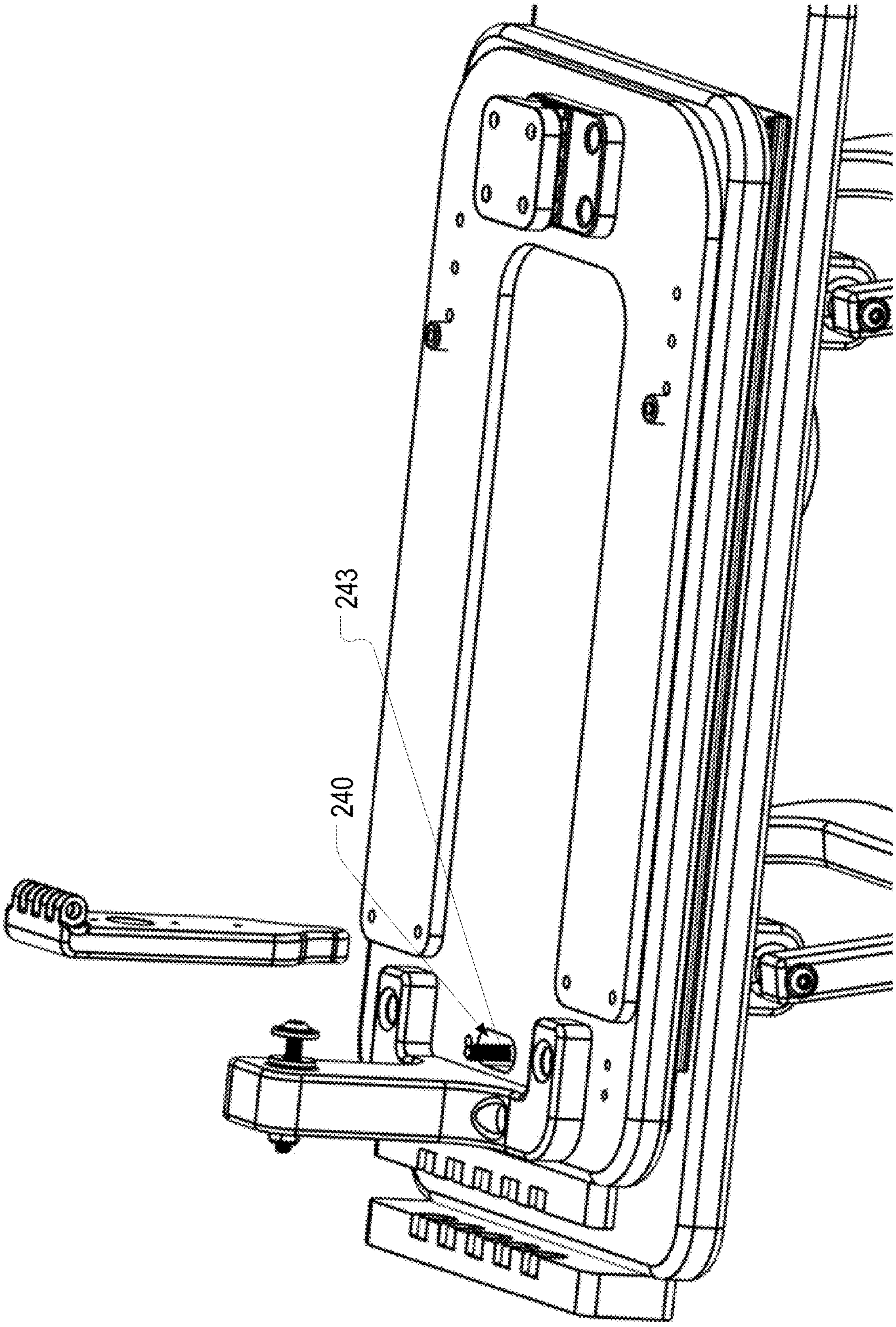
Figure 14B:
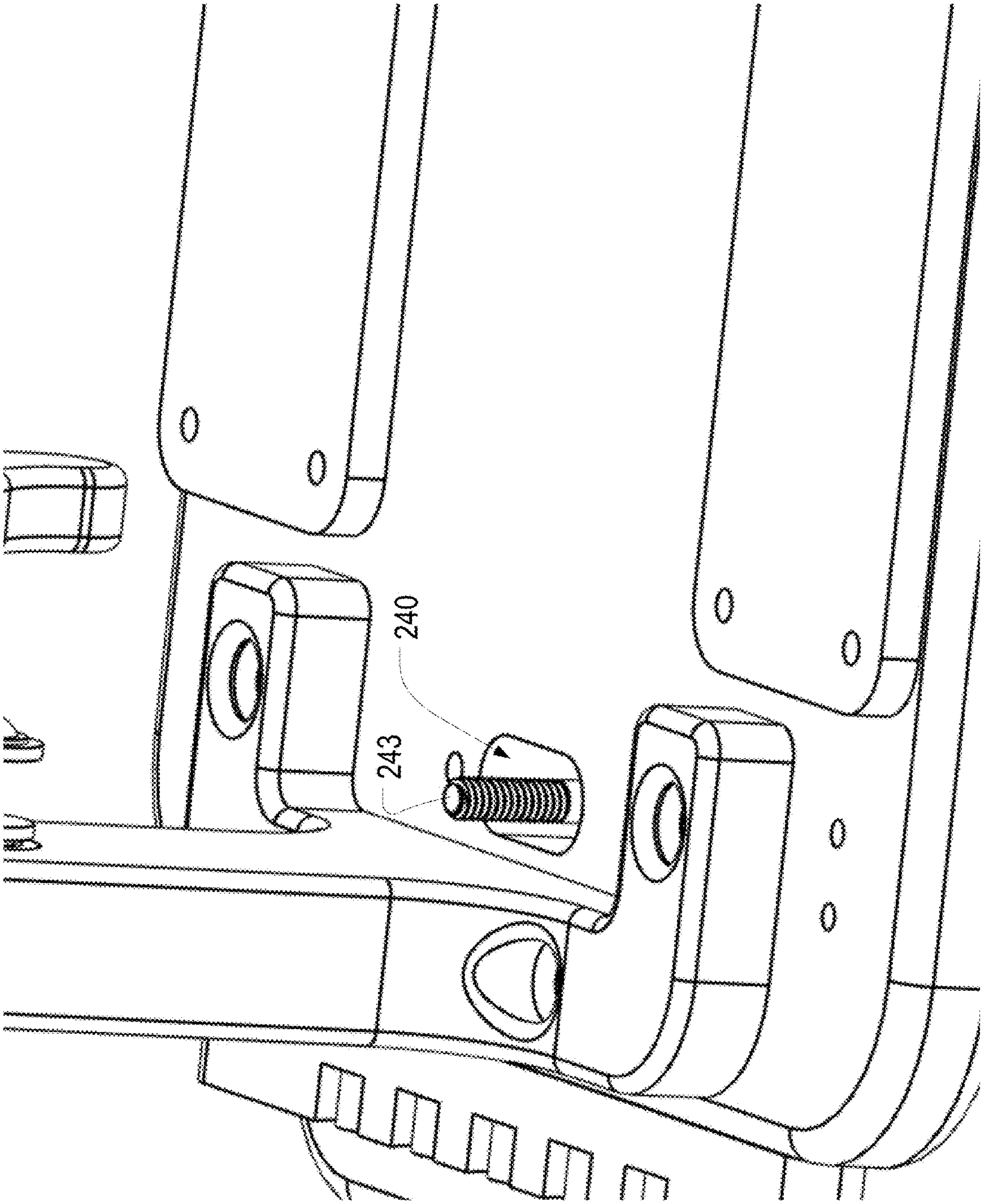
Figure 15:
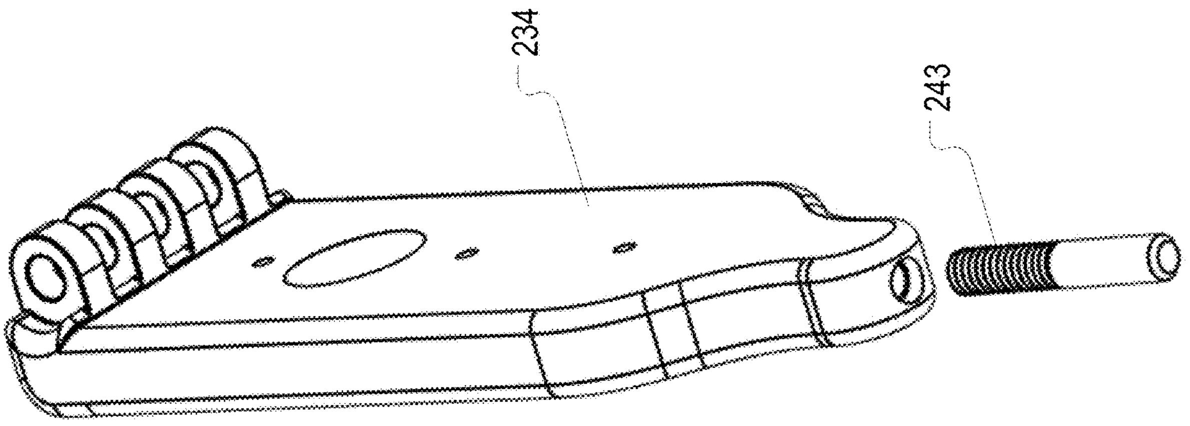

The lower end of the pivot member 234 is configured to receive, engage, and retain a threaded shaft 243 which protrudes through the pivot mechanism opening 240. FIGS. 14A-B illustrates this threaded shaft 243 protruding through the pivot mechanism opening 240. FIG. 15 illustrates an opening in the lower end of the pivot member 234 for receiving the threaded shaft 243.

Back and forth movement of the threaded shaft 243 within the pivot mechanism opening 240 is effected by a motor, which in turn effects movement of the lower end of the pivot member 234, which effects pivoting (in the opposite direction) of the upper end of the pivot member 234, which in turn effects rotative movement of the connected leg receiving member 232.

Figure 16:
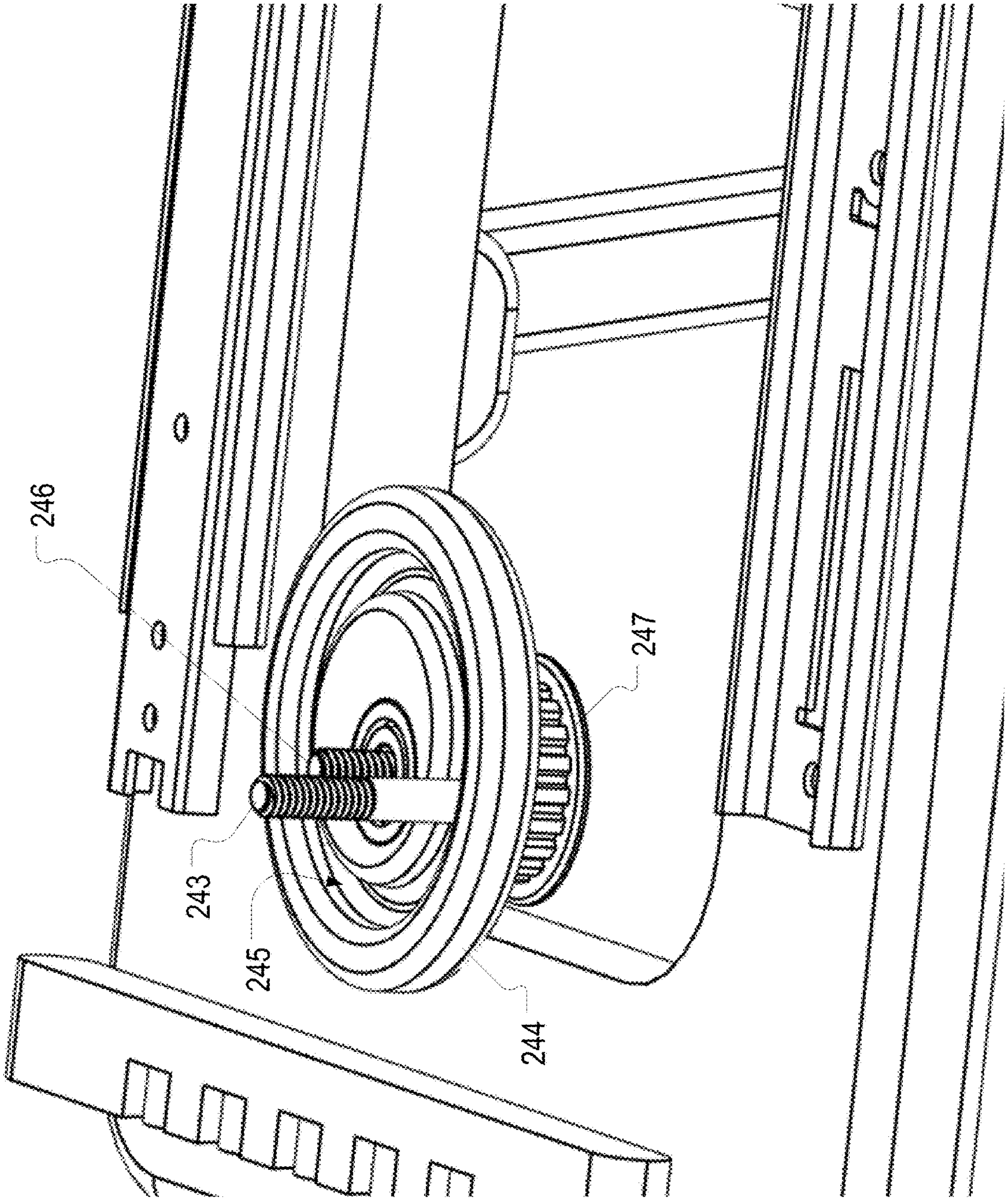
Figure 17:
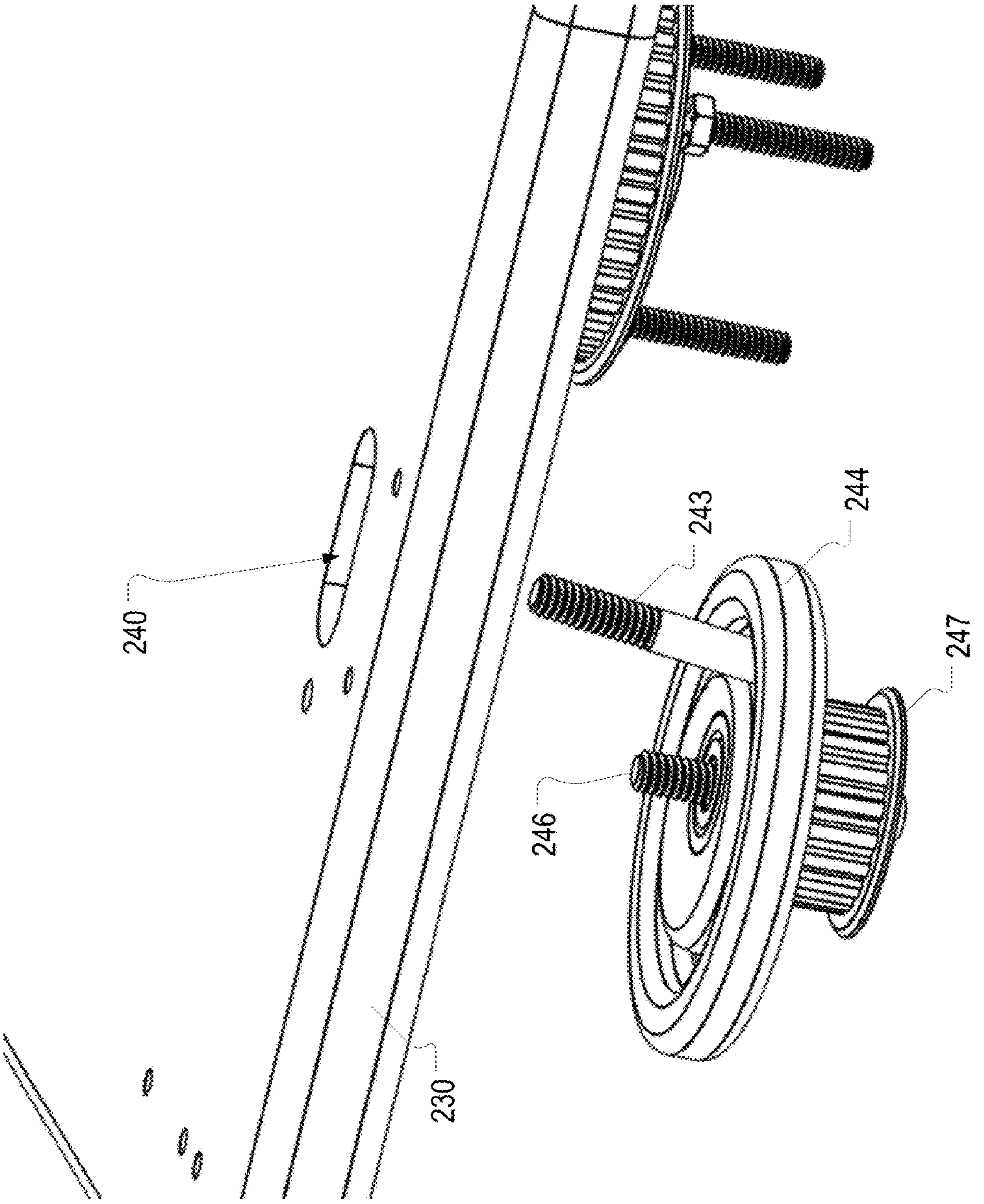
Figure 18:
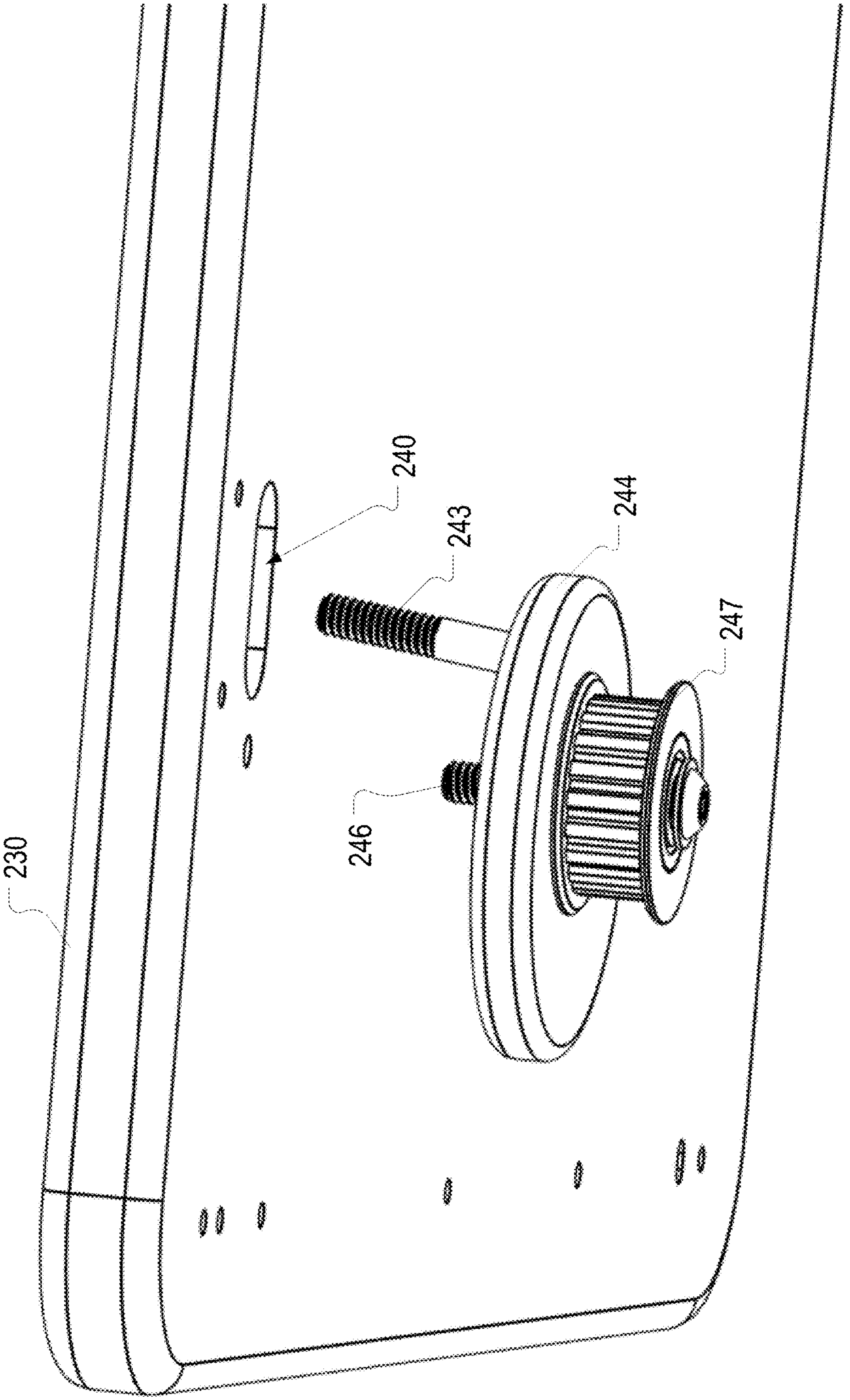
Figure 19:
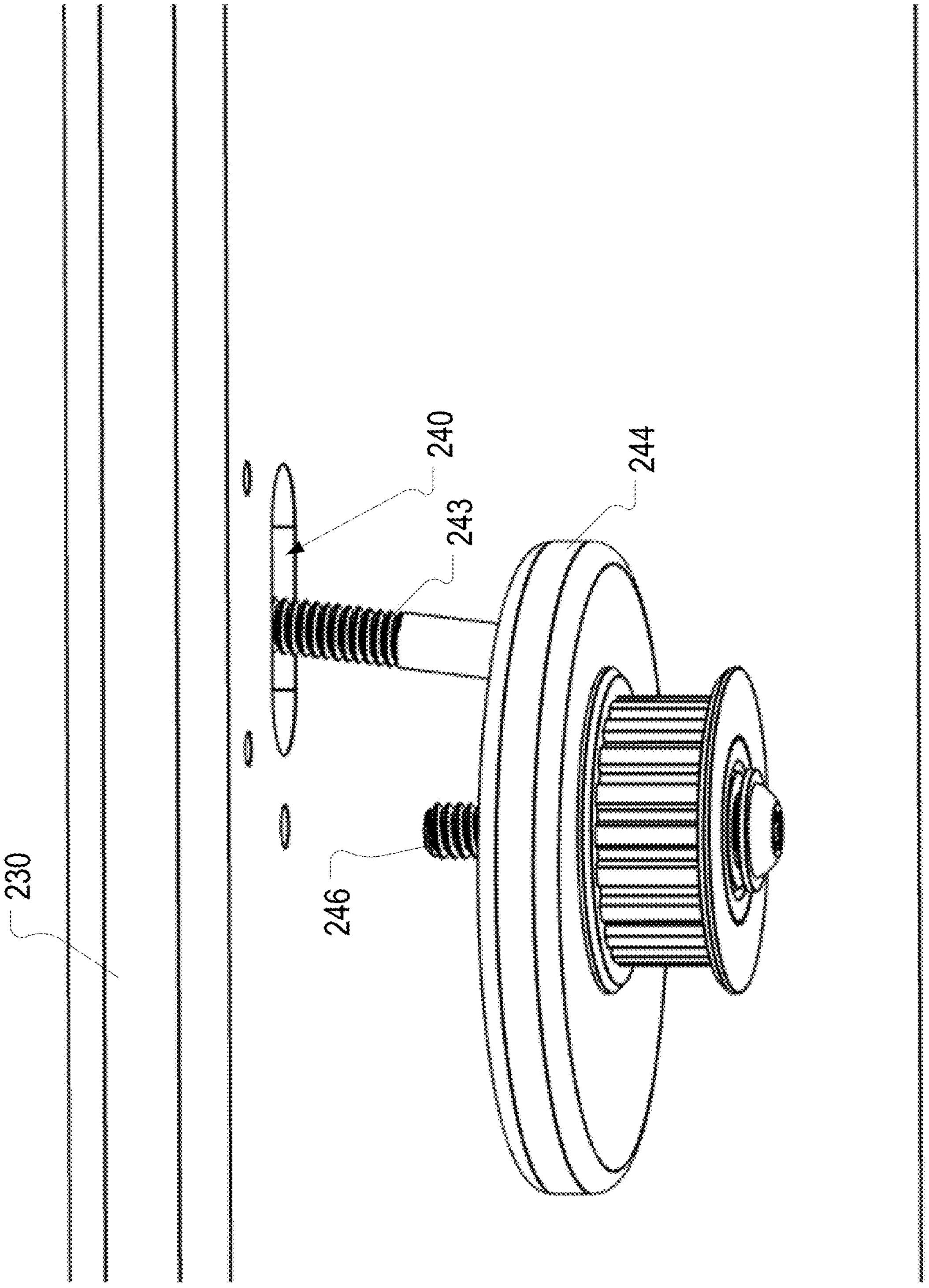
Figure 20:
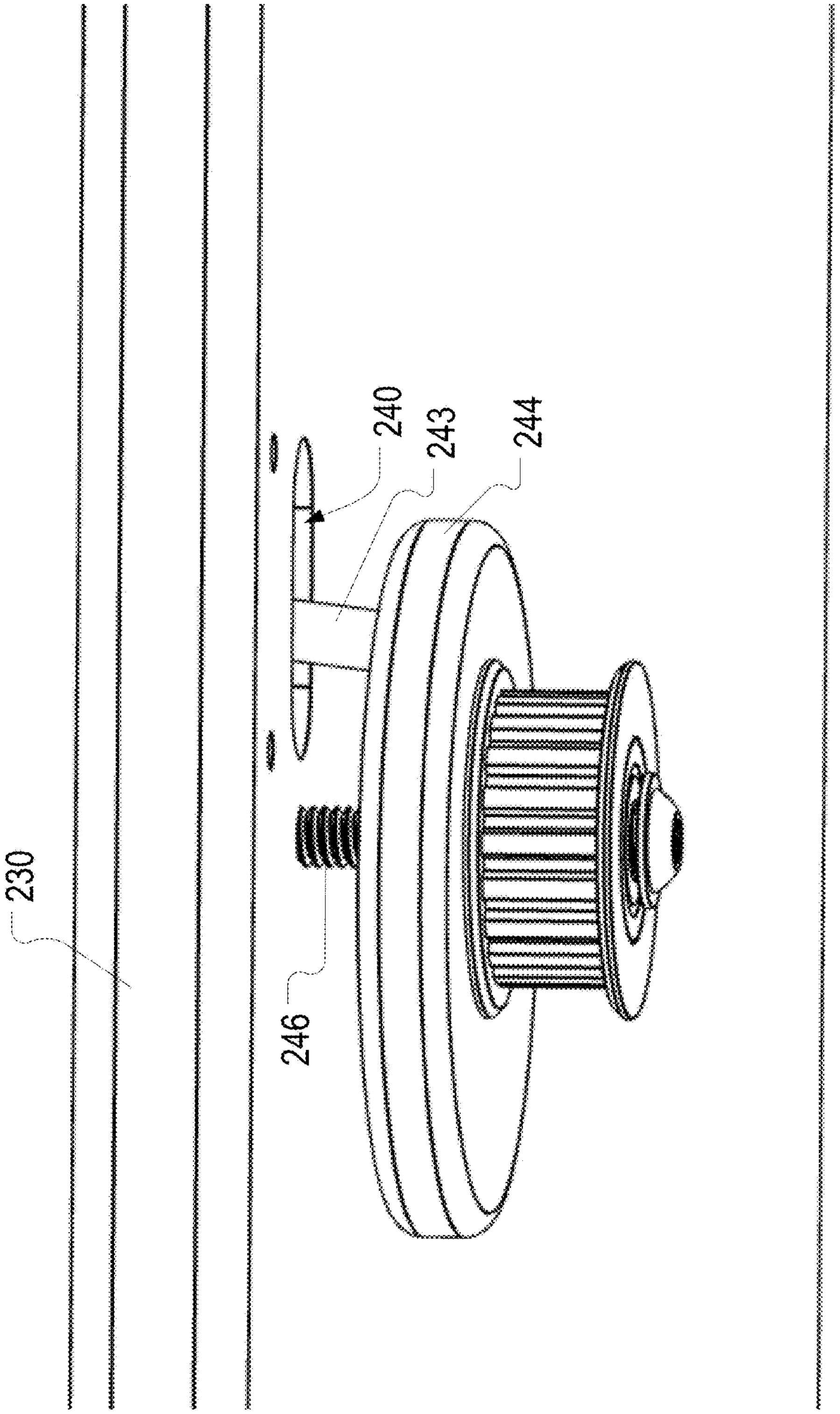
Figure 21:
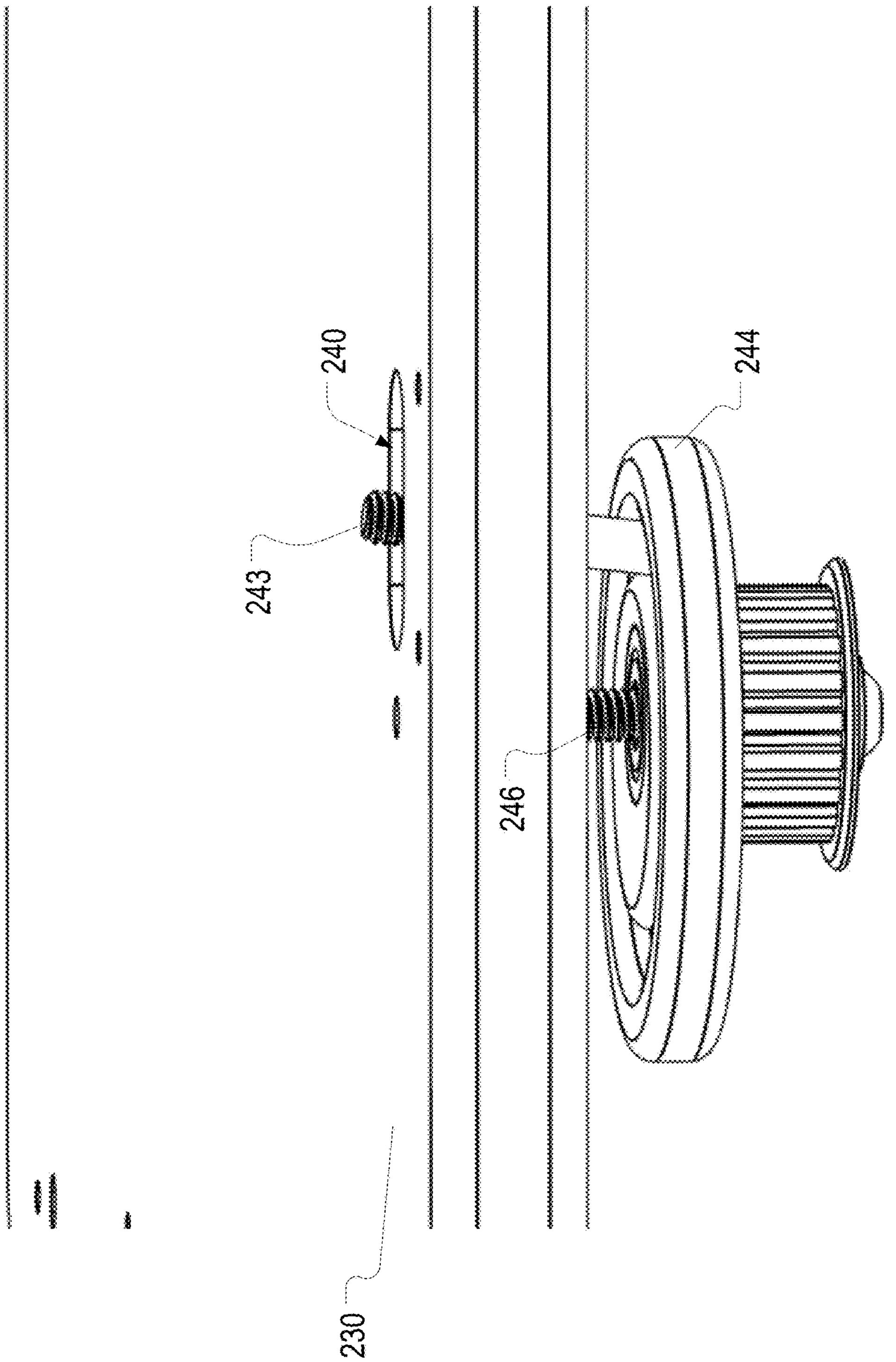
Figure 22:
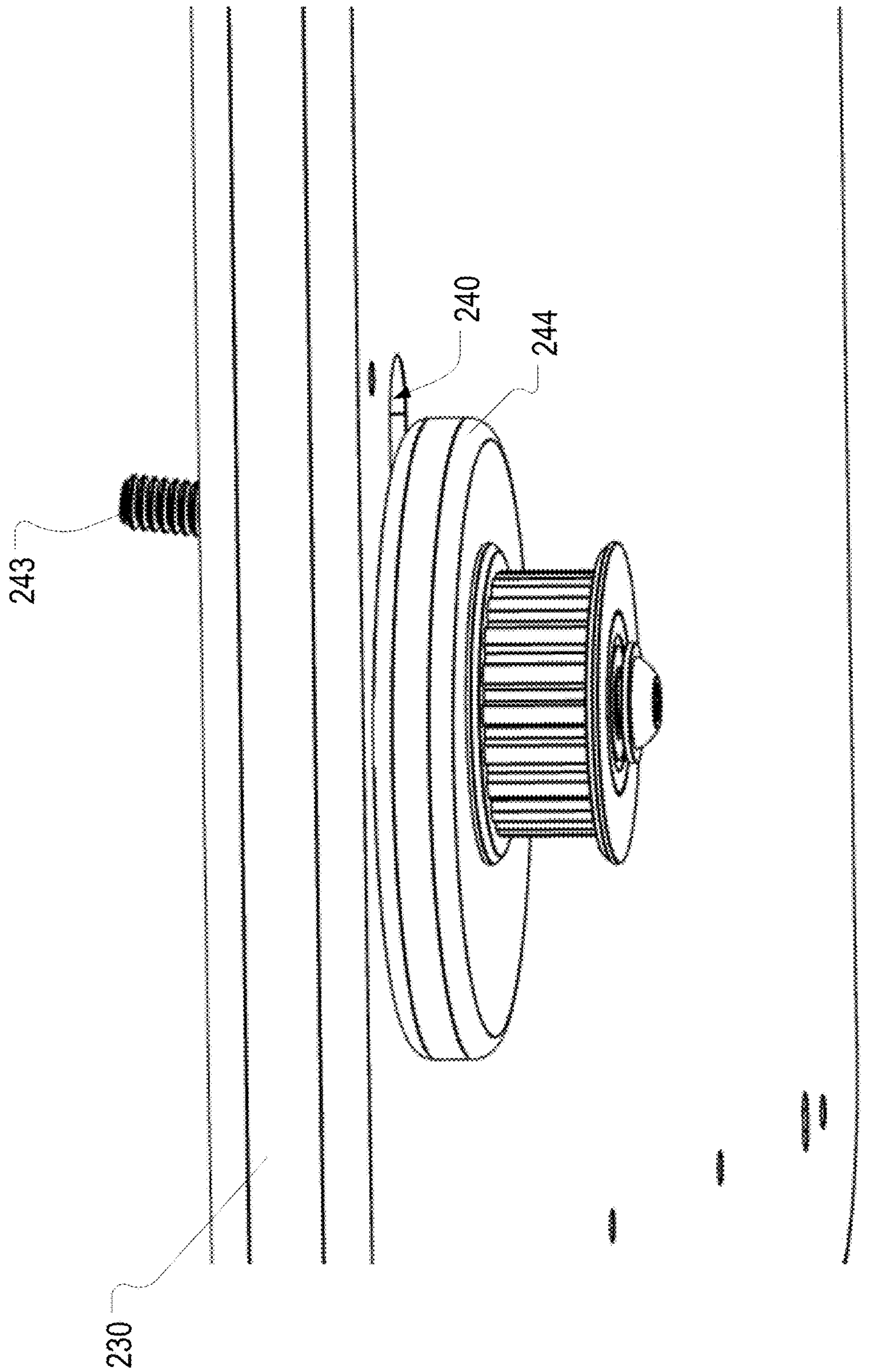
Figure 23:
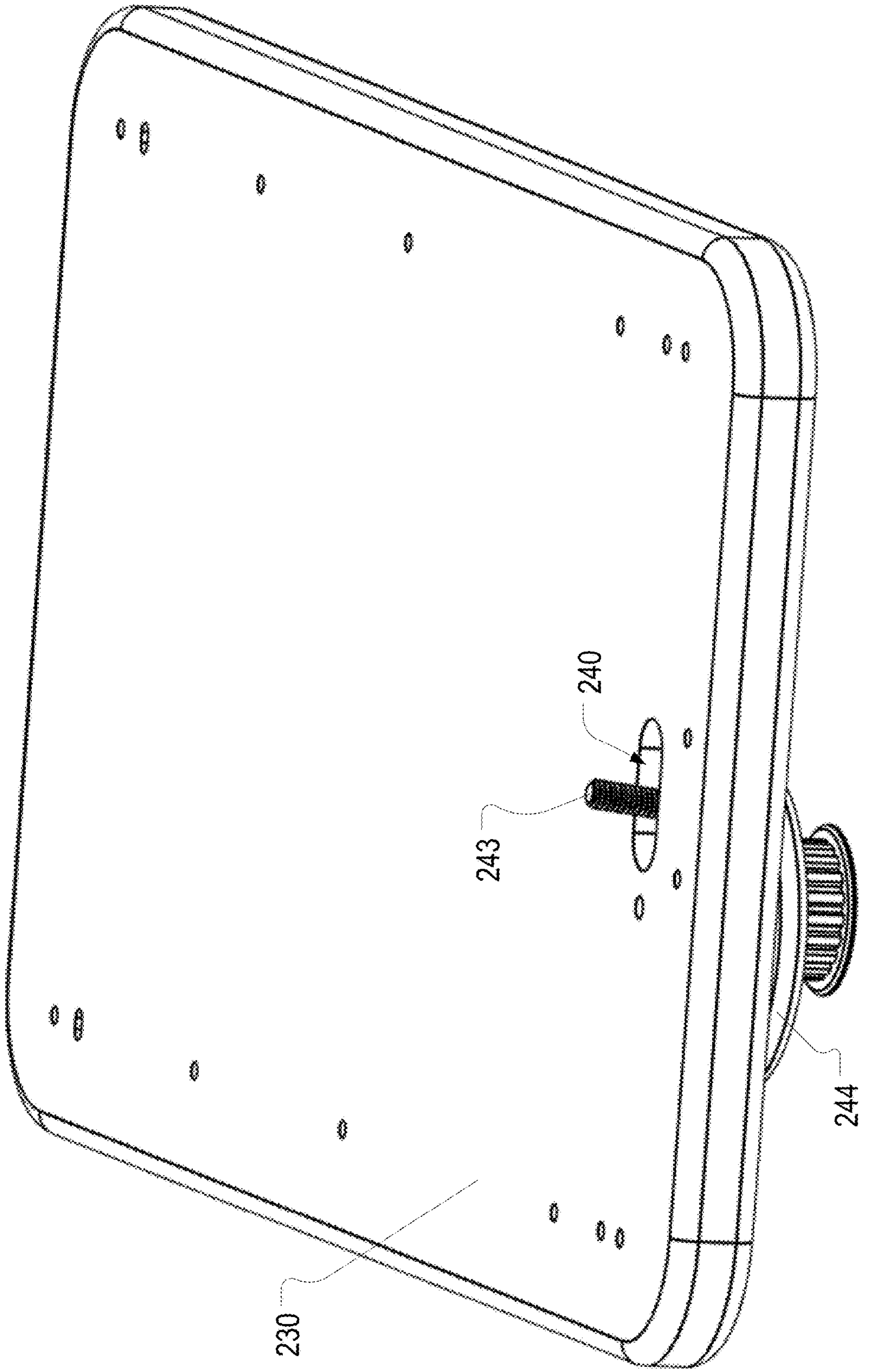

The upper end of the threaded shaft 243 is received and retained within the lower end of the pivot member 234. The lower end of the threaded shaft 243 is received and slidably retained within a channel 245 of a secondary rotative component 244, as illustrated in FIG. 16. The secondary rotative component 244 is rotatably secured to the underside of the sliding member 230 via a bolt 246 which allows for rotation of the secondary rotative component about an axis defined by the bolt 246. For example, FIGS. 17-23 fancifully illustrate securement of the secondary rotative component 244 to the underside of the sliding member 230.

Figure 24:
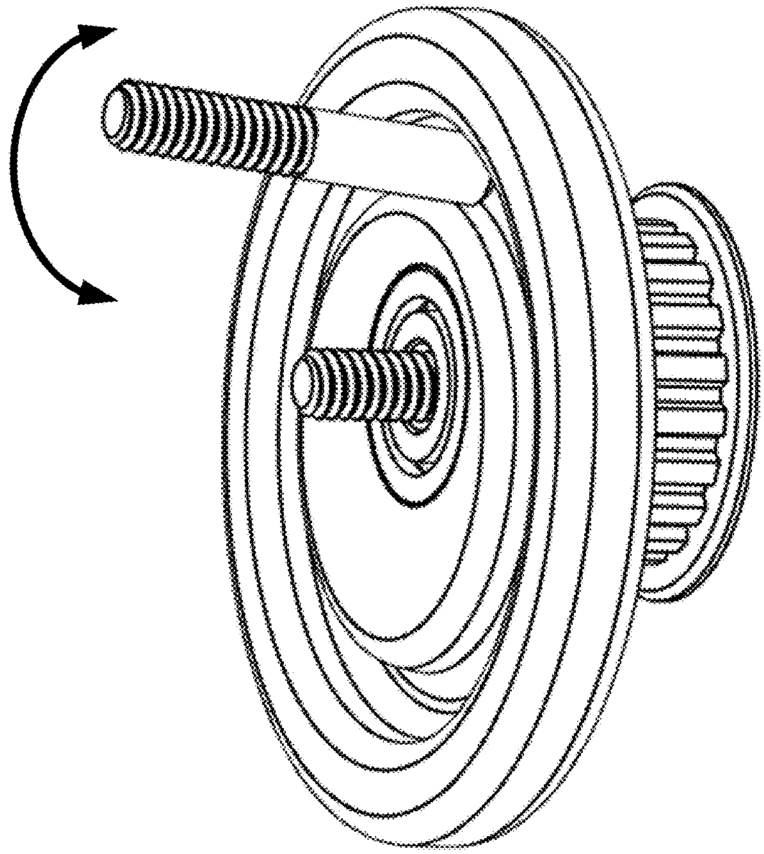
Figure 25:
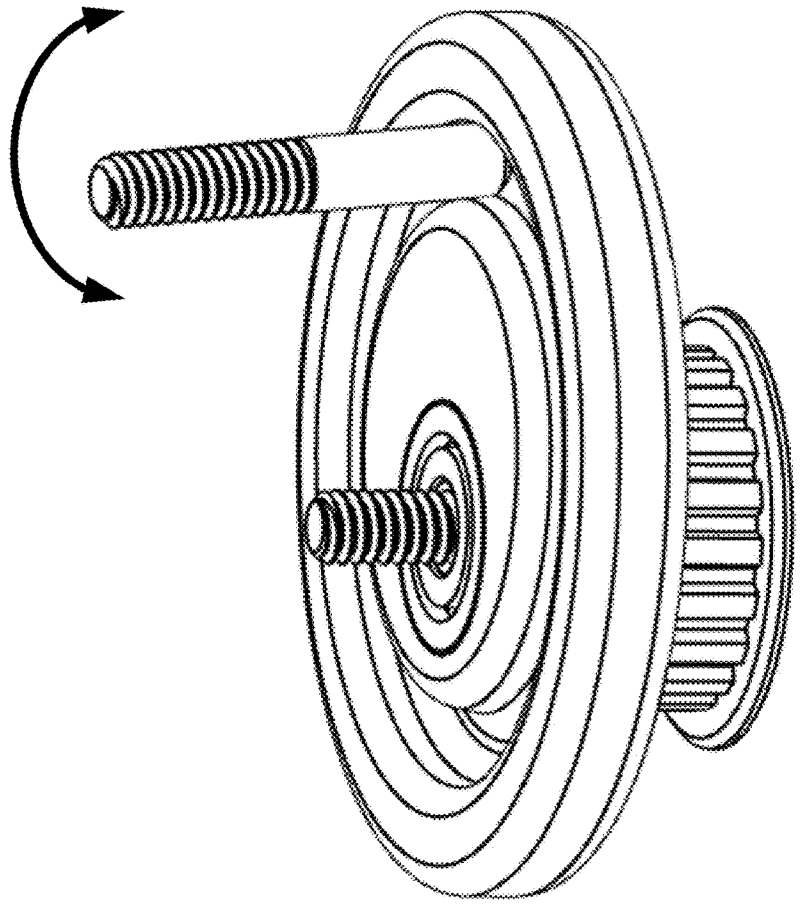

The secondary rotative component 244 is configured such that, as the secondary rotative component 244 rotates, the lower end of the threaded shaft 243 floats and slides within the channel 245 of the secondary rotative component 244. The channel 245 of the secondary rotative component and the threaded shaft 243 are configured such that, as the secondary rotative component 244 rotates and the threaded shaft 243 floats and slides within the channel 245, an upper portion of the threaded shaft 243 pivots from one side to another, as illustrated in FIGS. 24-25. When the upper portion of the threaded shaft 243 is disposed through the pivot mechanism opening 240 and received and retained within the lower end of the pivot member 234, this back and forth movement of the threaded shaft 243 effects movement of the lower end of the pivot member 234 it is received within, which effects pivoting (in the opposite direction) of the upper end of the pivot member 234, which in turn effects rotative movement of the connected leg receiving member 232.

Figure 26A:
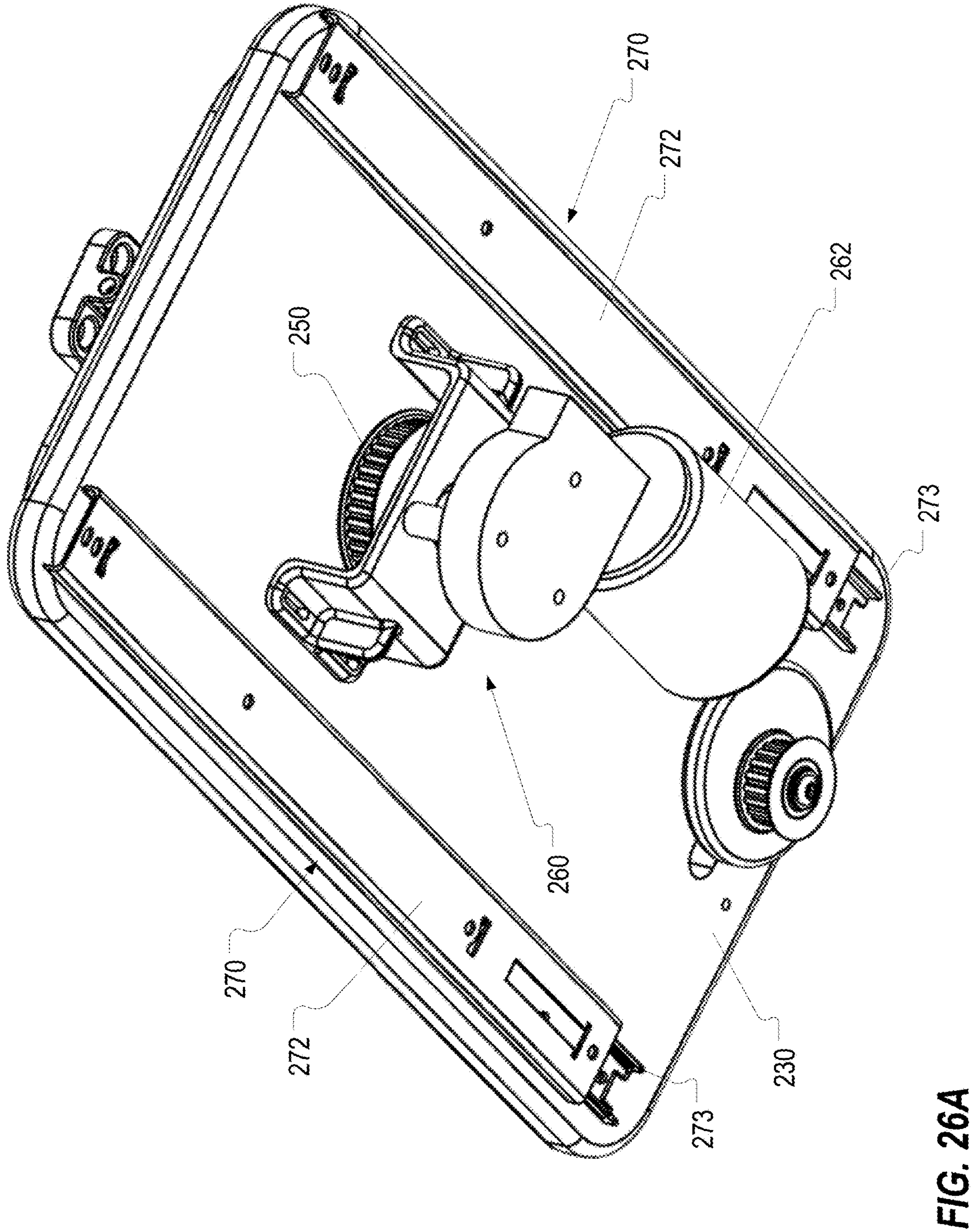

Rotation of the secondary rotative component 244 is effected by a motor 262, which can be seen in FIG. 26A. The motor 262 effects rotation of a primary rotative component 250, including a primary belt engagement pulley 257. A belt connects the primary belt engagement pulley 257 to the secondary belt engagement pulley 247 of the secondary rotative component 244. Rotative force applied to the primary rotative component 250 by the motor 260 is transferred to the secondary rotative component 244 via the belt and the pulleys 247,257. As described above, as the secondary rotative component 244 rotates and the threaded shaft 243 floats and slides within the channel 245, an upper portion of the threaded shaft 243 pivots from one side to another, and this back and forth movement of the threaded shaft 243 effects movement of the lower end of the pivot member 234 it is received within, which effects pivoting (in the opposite direction) of the upper end of the pivot member 234, which in turn effects rotative movement of the connected leg receiving member 232.

The motor 262 is part of a motor assembly 260 which is secured to the underside of the sliding member 230. The motor assembly 260 includes an attachment portion 264 that is directly secured to the underside of the sliding member 230, as illustrated in FIG. 26B.

Figure 26B:
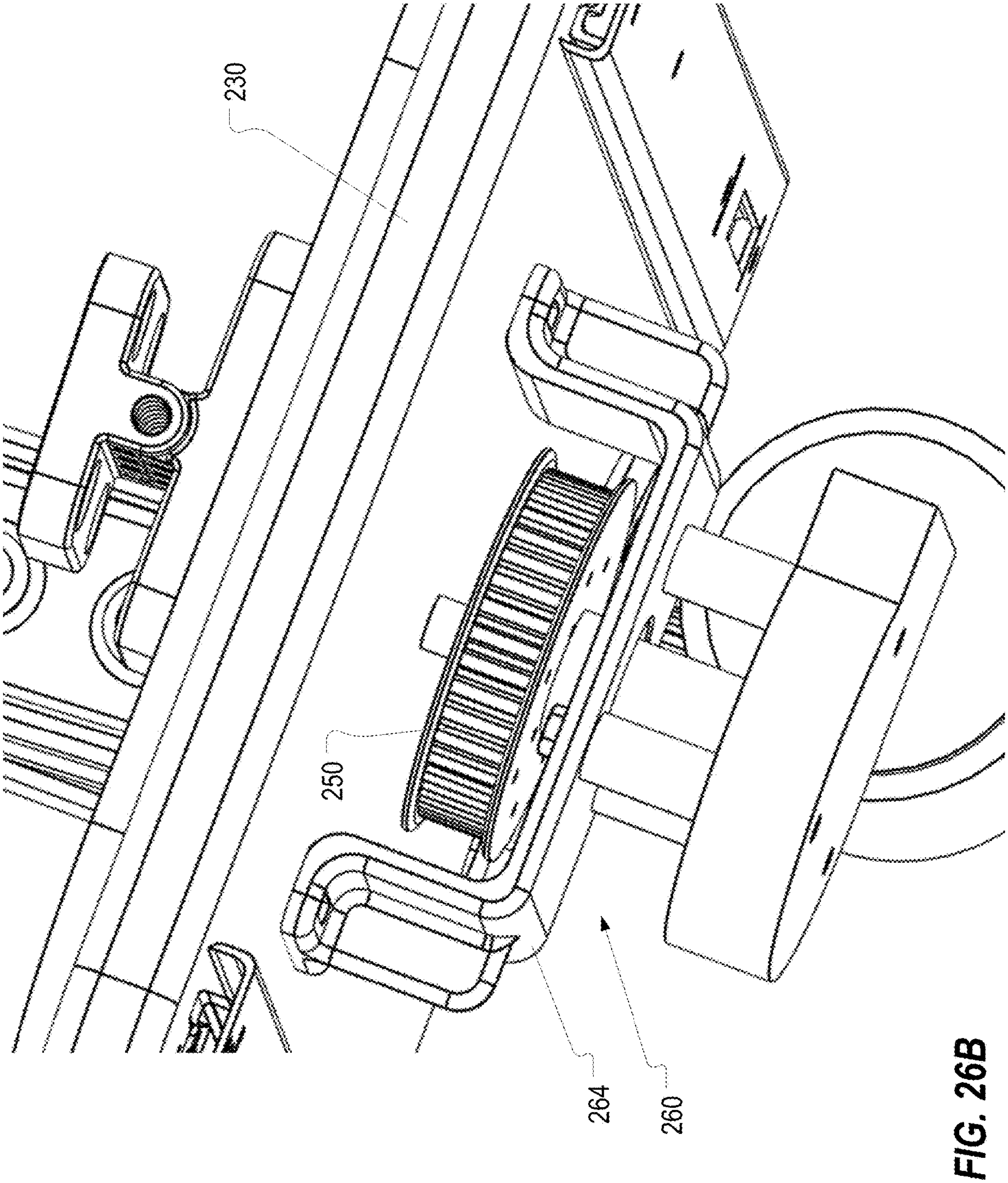

The primary rotative component 250 is rotatably connected to and forms part of the motor assembly 260, and is disposed within the attachment portion 264, as illustrated in FIG. 26B. A bolt or shaft defining an axis of rotation of the primary rotative component is connected to the motor assembly 260, and may also be connected to the underside of the sliding member 230, although in at least some preferred implementations it is not also connected to the underside of the sliding member 230.

Figure 27:
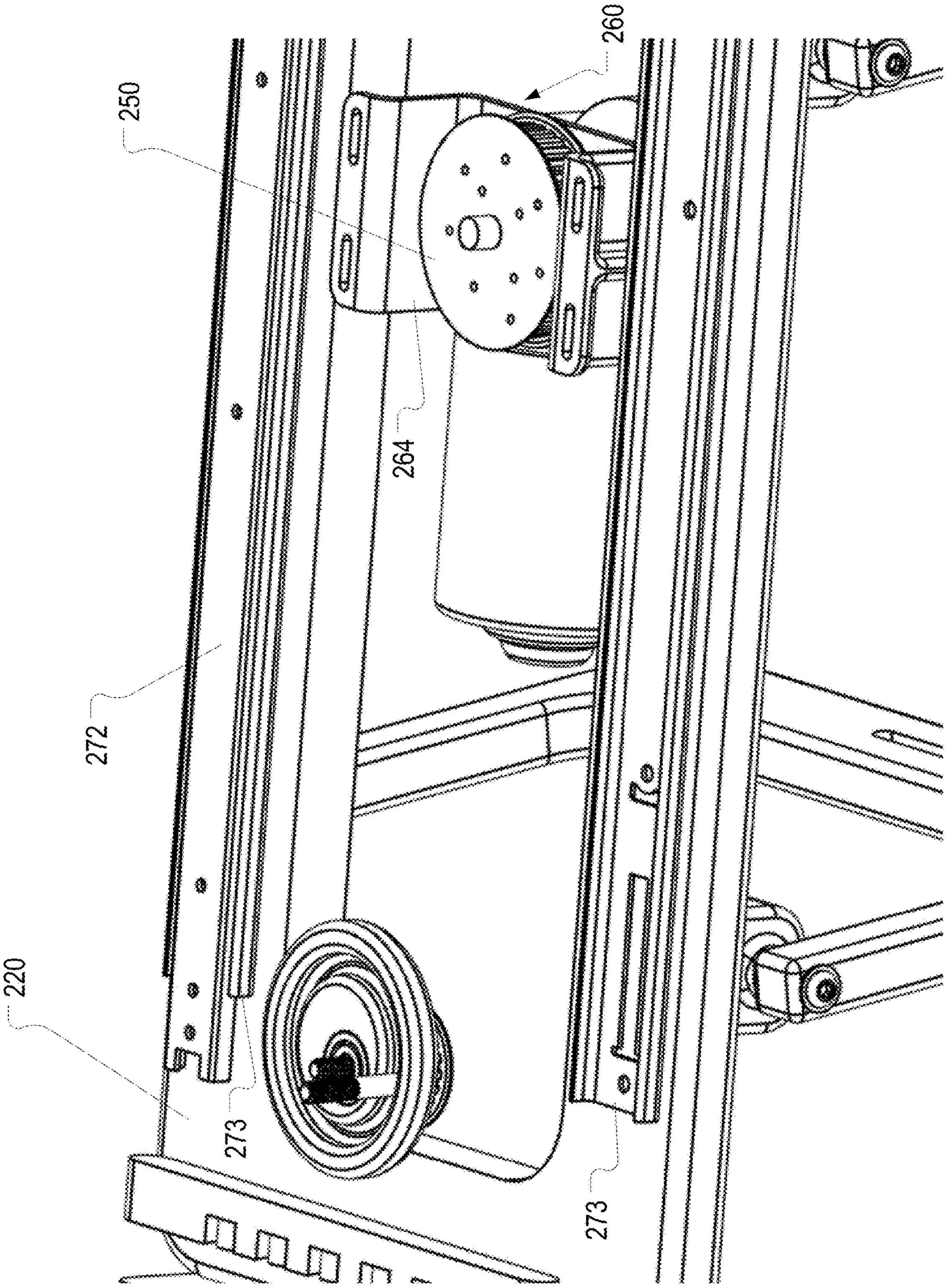
Figure 28:
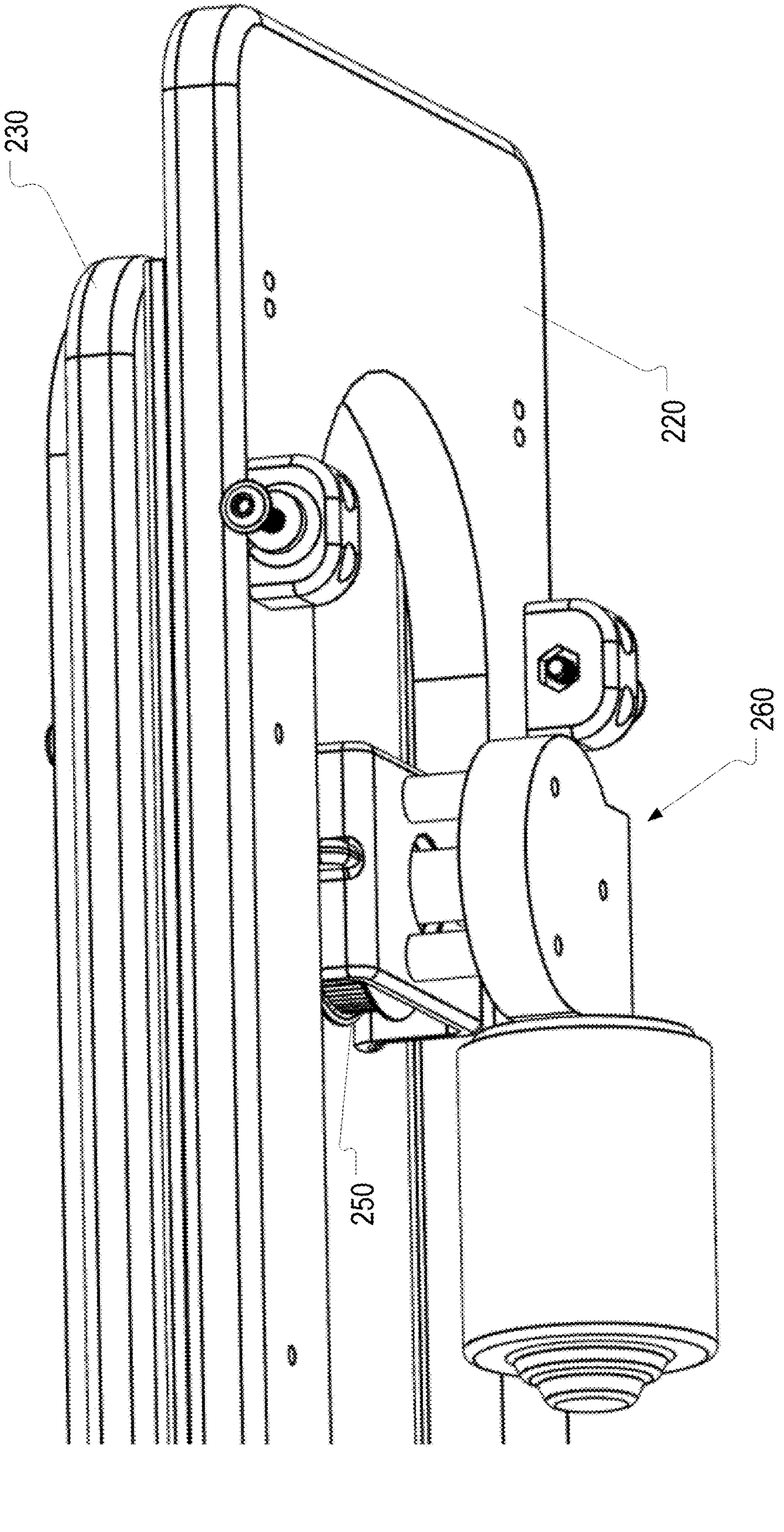
Figure 29:
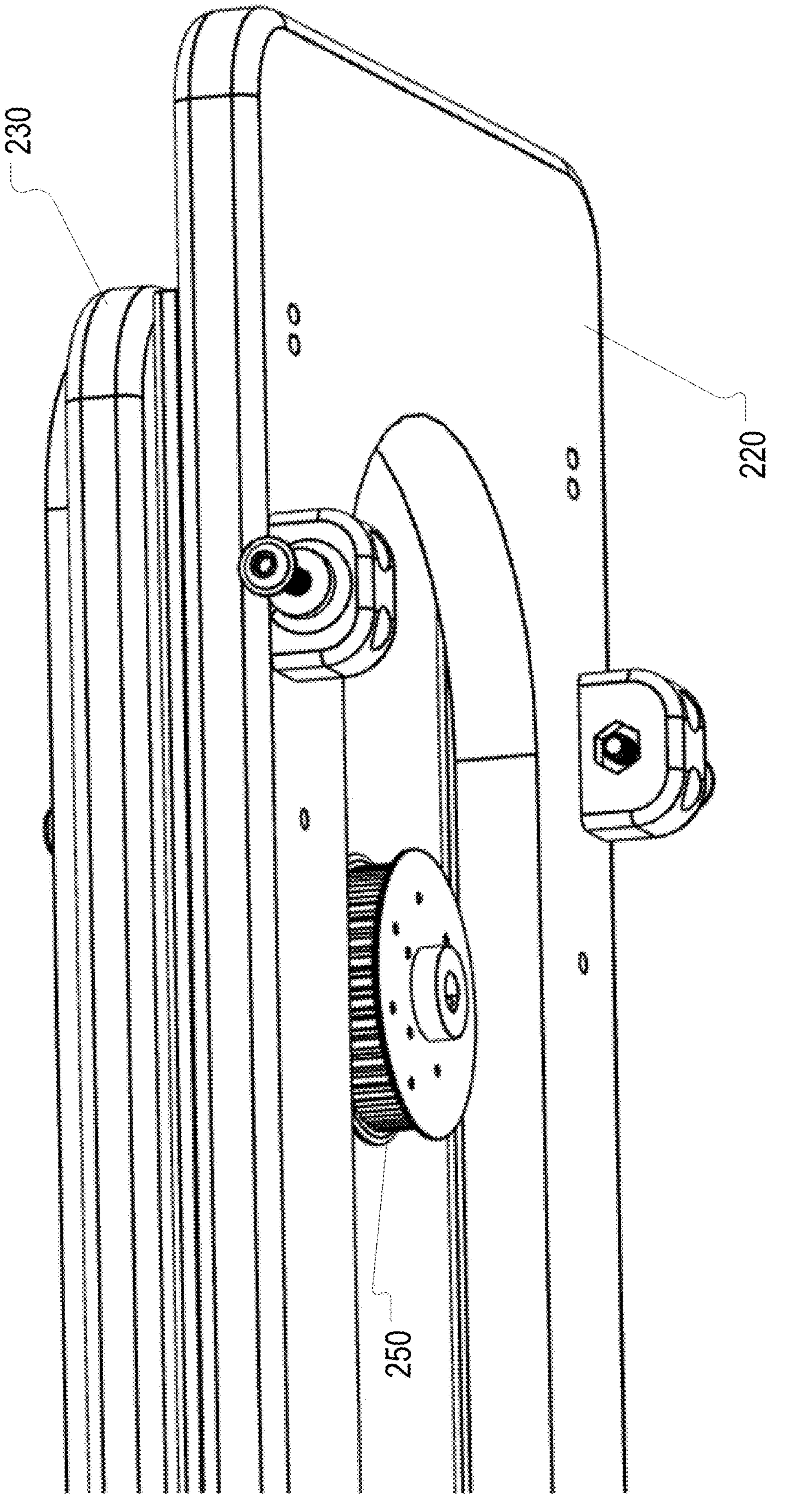

FIG. 27 is another view of the primary rotative component 250 and the motor assembly 260 with the sliding member 230 omitted for clarity. FIG. 28 is another view of the primary rotative component 250 and the motor assembly 260 with both the sliding member 230 and the base member 220 illustrated. FIG. 29 provides the same view, with many components of the motor assembly 260 omitted for clarity.

As described above, the primary rotative component 250 is rotatably connected to and forms part of the motor assembly 260, which in turn is connected to the underside of the sliding member 230. It will be appreciated that, as thus far described and illustrated, the primary rotative component 250 has not been described as connected to the base member 220.

However, the micro CPM machine 210 further includes a connection strut 252 secured to both the primary rotative component 250 and the base member 220 which serves to effect sliding, translational movement of the sliding member 230 relative to the base member 220 when the motor 262 effects rotation of the primary rotative component 250. In particular, as the primary rotative component 250 rotates, causing the connection point of the connection strut 252 at the primary rotative component 250 to move, the connection strut 252 effects movement of the sliding member 230.

Figure 30:
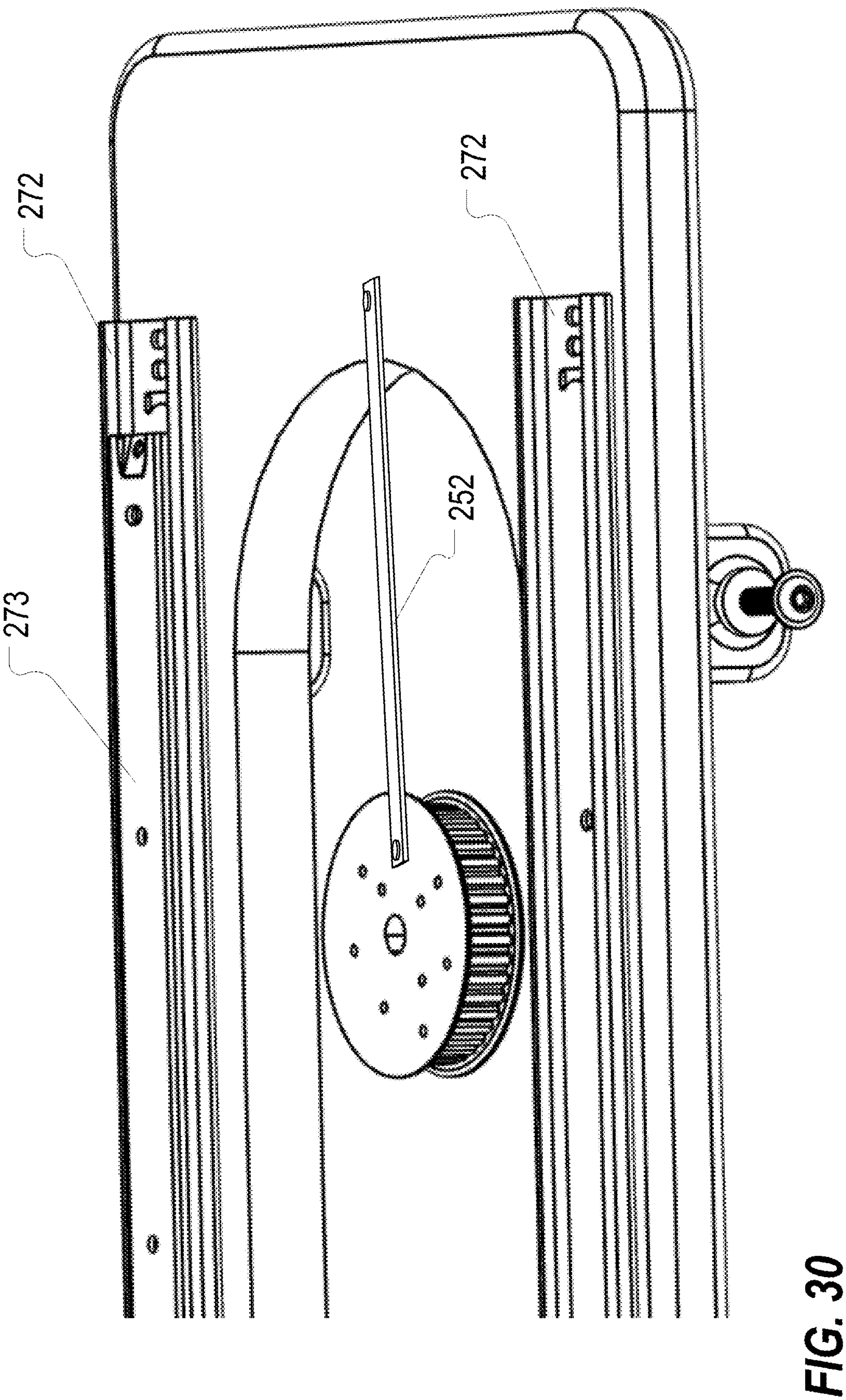
Figure 31:
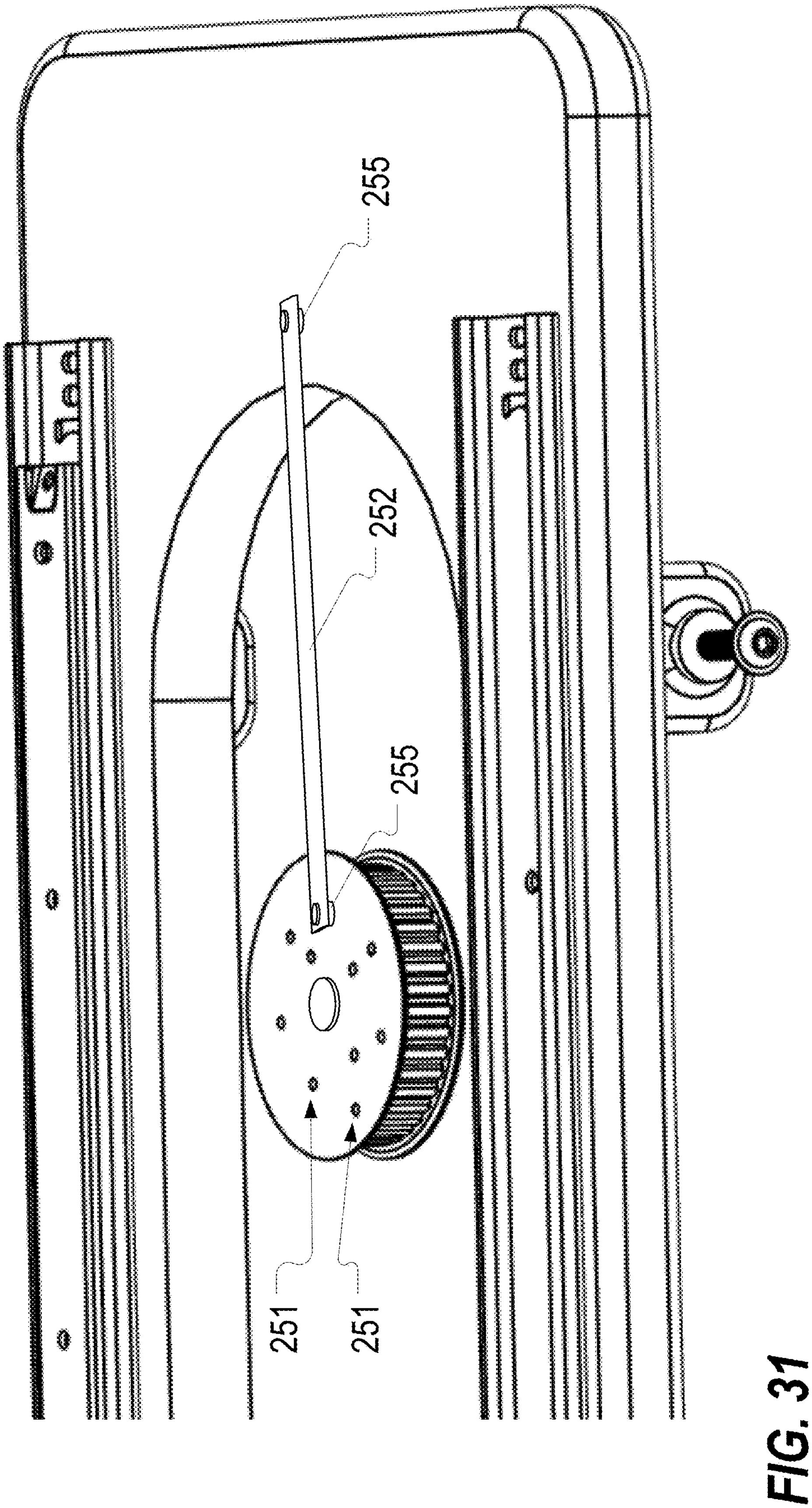

The connection strut 252 is secured to a top side of the primary rotative component 250 and a top side of the base member 220, as illustrated in FIG. 30. The components are sized, dimensioned, and positioned to allow the connection strut 252 to freely move throughout the entire range of rotation of the primary rotative component 250. As illustrated in FIG. 31, one or more spacers 255 may be utilized to facilitate this, e.g. by lifting the connection strut 252 higher to prevent contact with a protruding object such as a screw or bolt head.

The primary rotative component 250 preferably includes a plurality of different connection openings 251 for securement of the connection strut 252 to the primary rotative component 250. These different connection openings 251 are preferably positioned and spaced to provide different stroke lengths. In accordance with one or more preferred implementations, connection openings 251 are spaced on a spiral so each connection hole represents a different stroke length.

Sliding movement of the sliding member 230 relative to the base member 220 is preferably facilitated by slide members 270 disposed between the base member 220 and the sliding member 230. In particular, each slide member 270 comprises a first mating slide member 272 secured to the base member 220, and a second mating slide member 273 secured to the sliding member 230. The first and second mating slide members are configured to mate with one another in sliding engagement.

Figure 32:
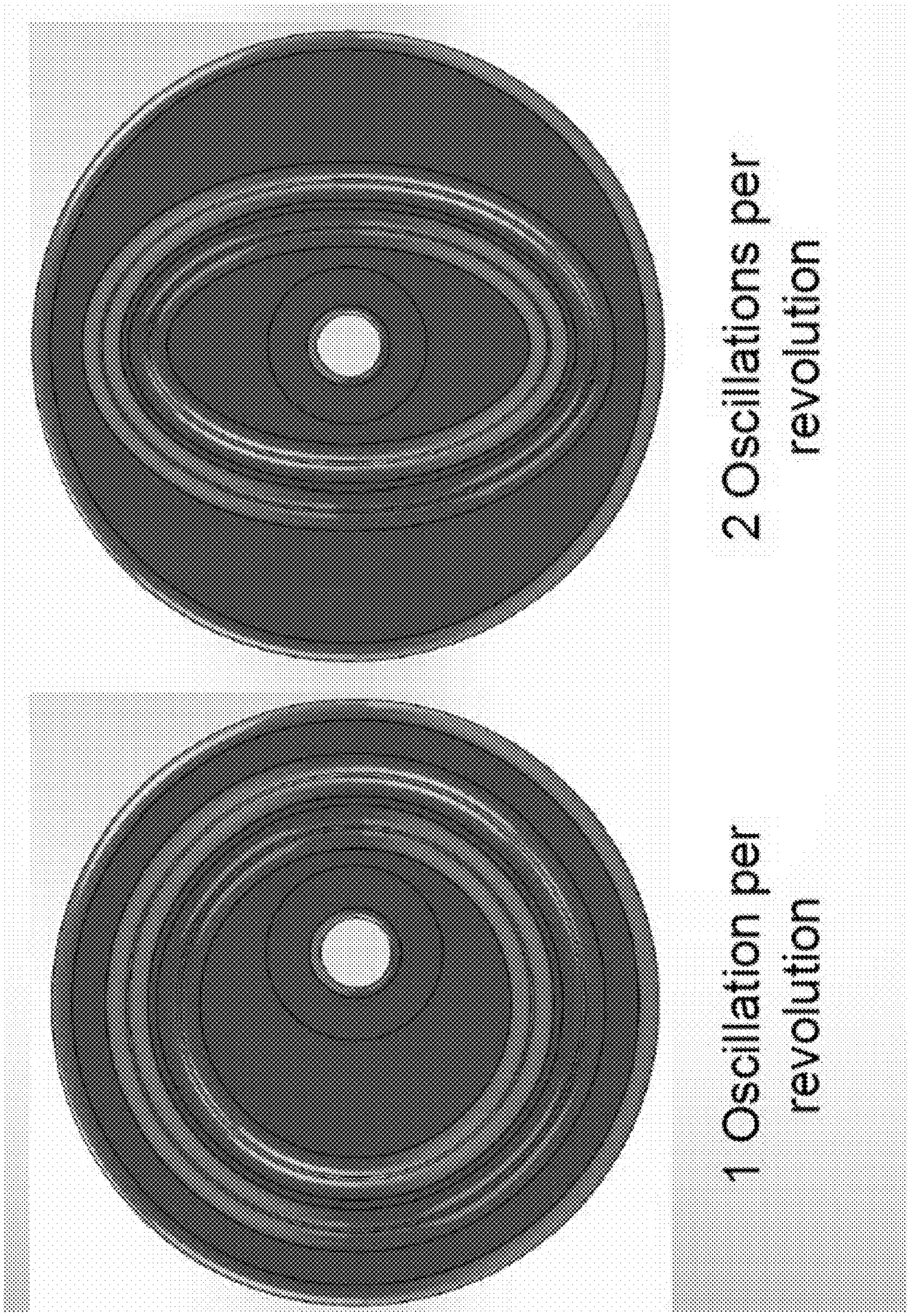
FIGS. 32 and 33 illustrate shapes which are configured for one, two, three, and four oscillations per revolution of the second rotative component 244.
Figure 33:
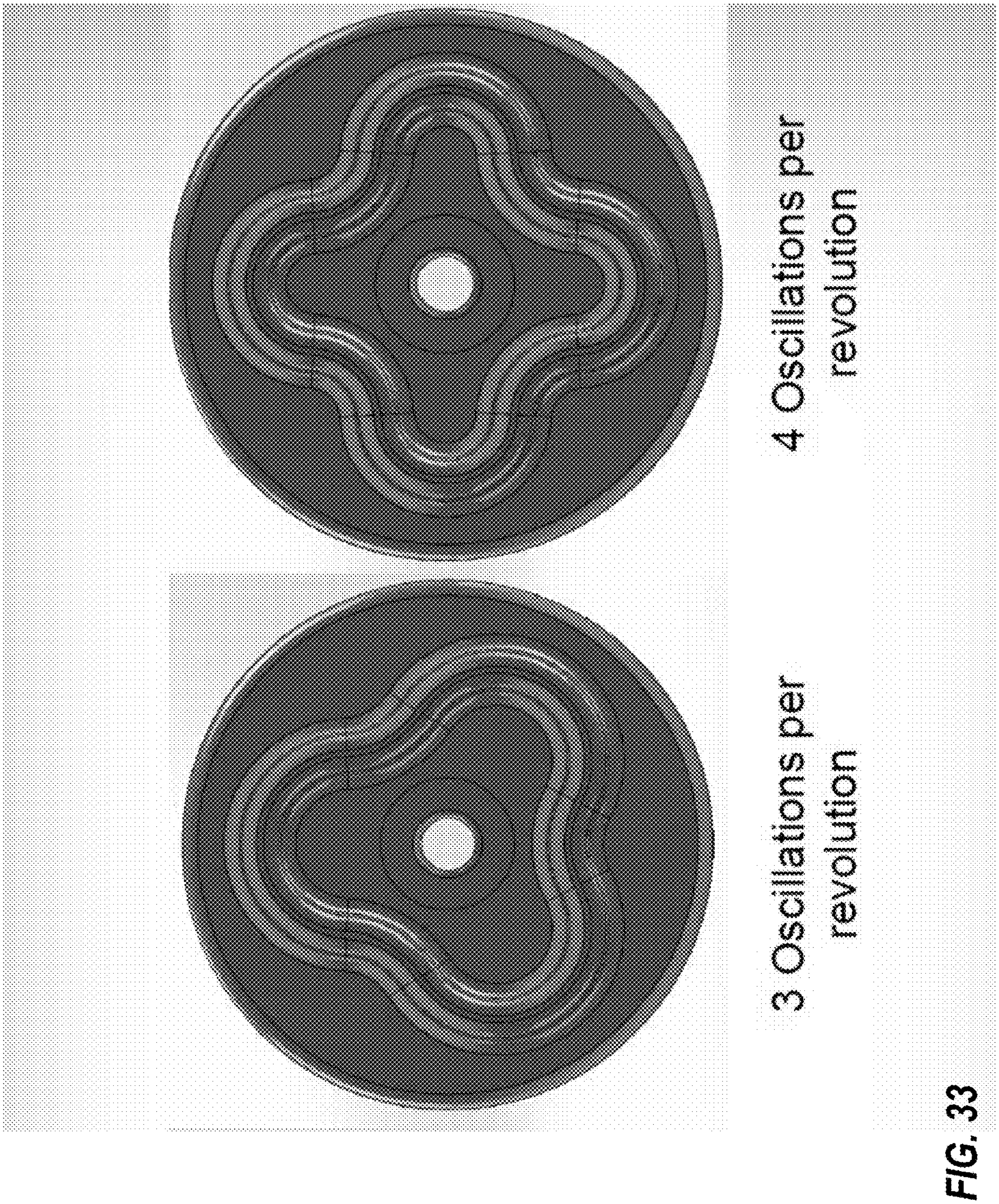

In accordance with one or more preferred implementations, a shape of a channel of the second rotative component is varied to alter oscillation frequency of the side to side pivoting movement of the pivot member 234, which in turn affects the frequency of rotative movement of the connected leg receiving member 232. As illustrated in FIG. 32, the shape illustrated in FIG. 16 is configured for one oscillation per revolution of the second rotative component 244. FIGS. 32 and 33 illustrate additional shapes which are configured for two, three, and four oscillations per revolution of the second rotative component 244.

Figure 34:
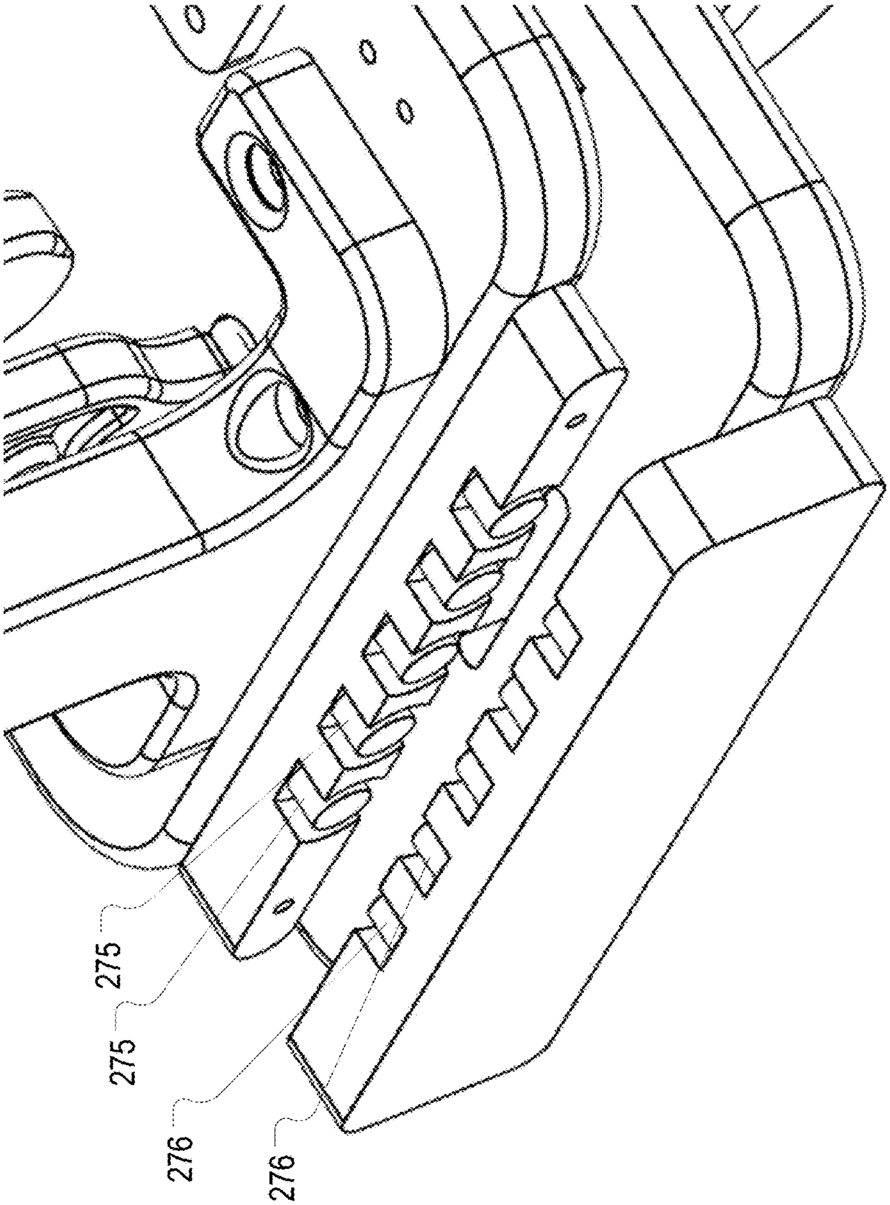
FIG. 34 illustrates a plurality of opposed spring connection points 275,276.

In accordance with one or more preferred implementations, one or more springs are utilized for elastic dampening at one or both ends of a movement, or to assist a motor in effecting lifting of a user's leg during an up stroke. For example, as illustrated in FIG. 34, the micro CPM machine 210 includes a plurality of opposed spring connection points 275,276. In particular, the sliding member 230 includes a plurality of spring connection points 275, and the base member 220 includes a plurality of spring connection points 276.

These spring connection points are configured such that a first end of a spring can be secured around a spring connection point 275, and a second end of the spring can be secured around an opposed spring connection point 276, such that the spring extends therebetween and acts to both cushion and dampen movement as a user's leg moves downward, and assist a motor in effecting lifting of the user's leg during an up stroke. In particular, such a spring is compressed as the opposed connection points are pushed together owing to sliding, translational movement of the sliding member 230 relative to the base member 220, and the potential energy of the spring resulting from such compression assists in effecting lifting of the user's leg during the up stroke.

Figure 35:
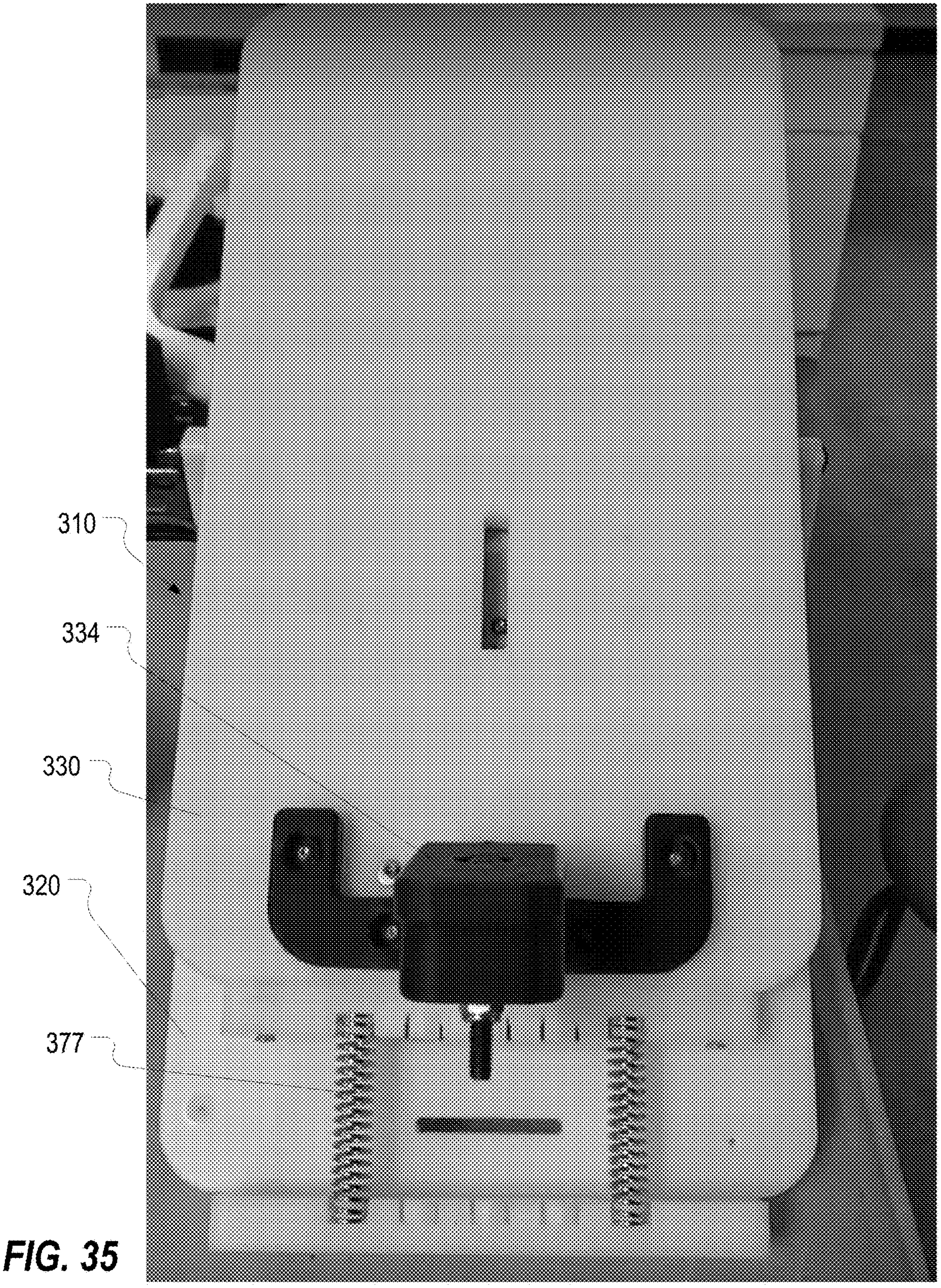
FIG. 35-40 illustrate components of another micro CPM machine 310.
Figure 36:
Figure 37:

For example, FIG. 35 illustrates components of another micro CPM machine 310 (some components, including a leg receiving member, omitted for clarity). The micro CPM machine 310 includes springs 377 extending between connection points of the micro CPM machine 310. The springs 377 both cushion and dampen movement as a user's leg moves downward, and assist a motor of the micro CPM machine 310 in effecting lifting of the user's leg during an up stroke. For example, FIGS. 35-37 illustrate compression of the springs 377 as the opposed connection points are pushed together owing to sliding, translational movement of the sliding member 330 relative to the base member 320. Thereafter, the potential energy of the springs 377 resulting from such compression assists in effecting lifting of the user's leg during the up stroke.

Figure 38:
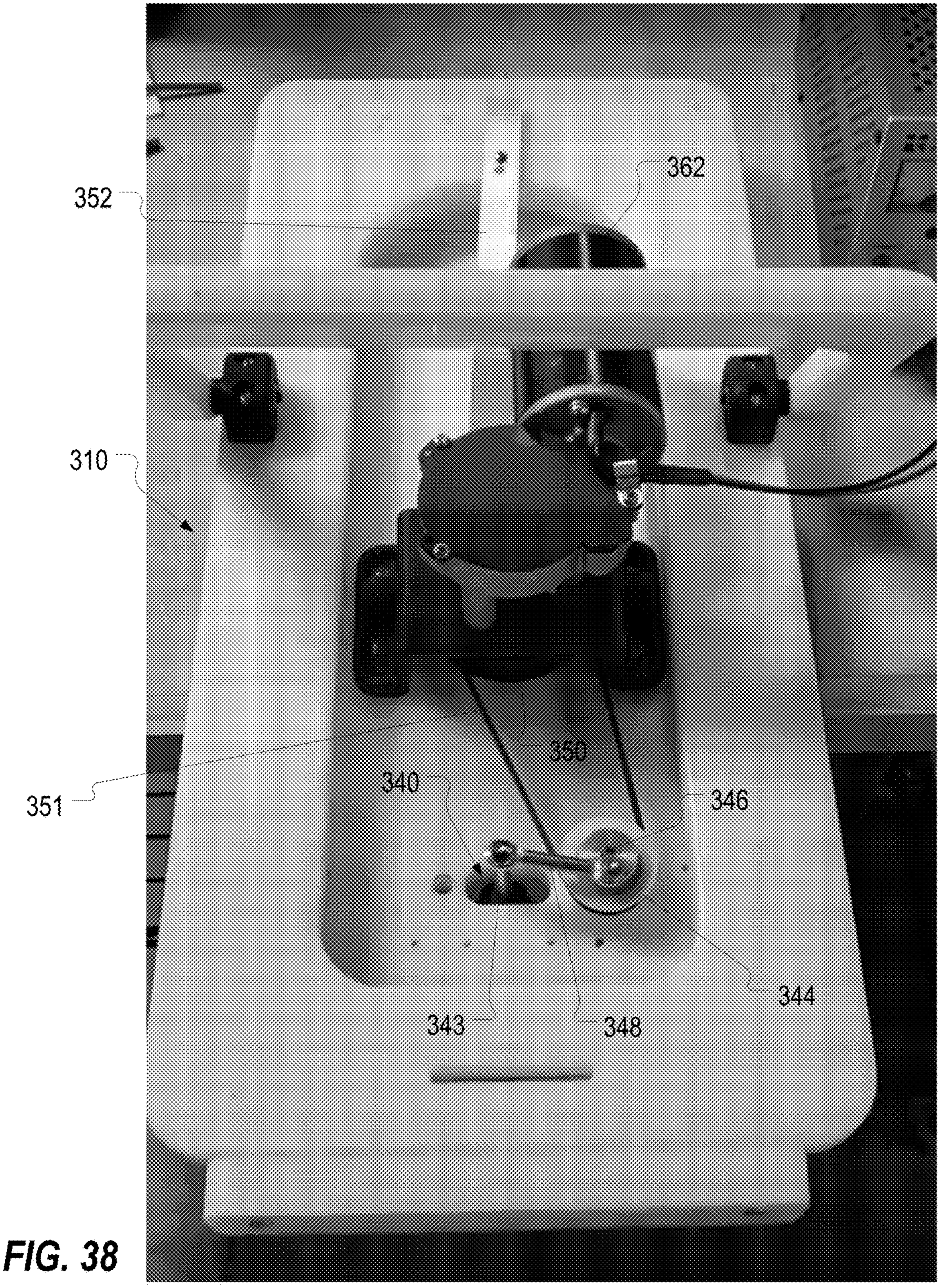

FIG. 38 illustrates an underside of the micro CPM machine 310. The micro CPM machine 310 includes a motor assembly, primary rotative component 350, and connection strut 352 that is similar to those of the micro CPM machine 210 and serve to effect sliding, translational movement of the sliding member 330 relative to the base member 320.

The micro CPM machine 310 differs from the micro CPM machine 210 in that the secondary rotative component 344 effects back and forth movement of a pivot member (in particular the pivot member 334 which can be seen in FIG. 35) in a manner different from that of the secondary rotative component 244 of the micro CPM machine 210.

The secondary rotative component 344 is secured to the underside of the sliding member 330 using a bolt 346 which defines an axis of rotation of the secondary rotative component 344. The secondary rotative component 344 includes a pivot strut 348 secured thereto at a bottom face thereof. In particular, the pivot strut 348 is secured at a connection point which rotates as the secondary rotative component 344 rotates. An opposite end of the pivot strut 348 is secured to a pivot shaft 343 which extends through a pivot mechanism opening 340. An opposite end of the pivot shaft 343 is received and retained within the lower end of the pivot member 334.

Rotation of the secondary rotative component 344 is effected by a motor 362. The motor 362 effects rotation of the primary rotative component 350, including a primary belt engagement pulley. A belt connects the primary belt engagement pulley to a secondary belt engagement pulley of the secondary rotative component 344. Rotative force applied to the primary rotative component 350 by the motor 360 is transferred to the secondary rotative component 344 via the belt 351 and the pulleys.

Figure 39:
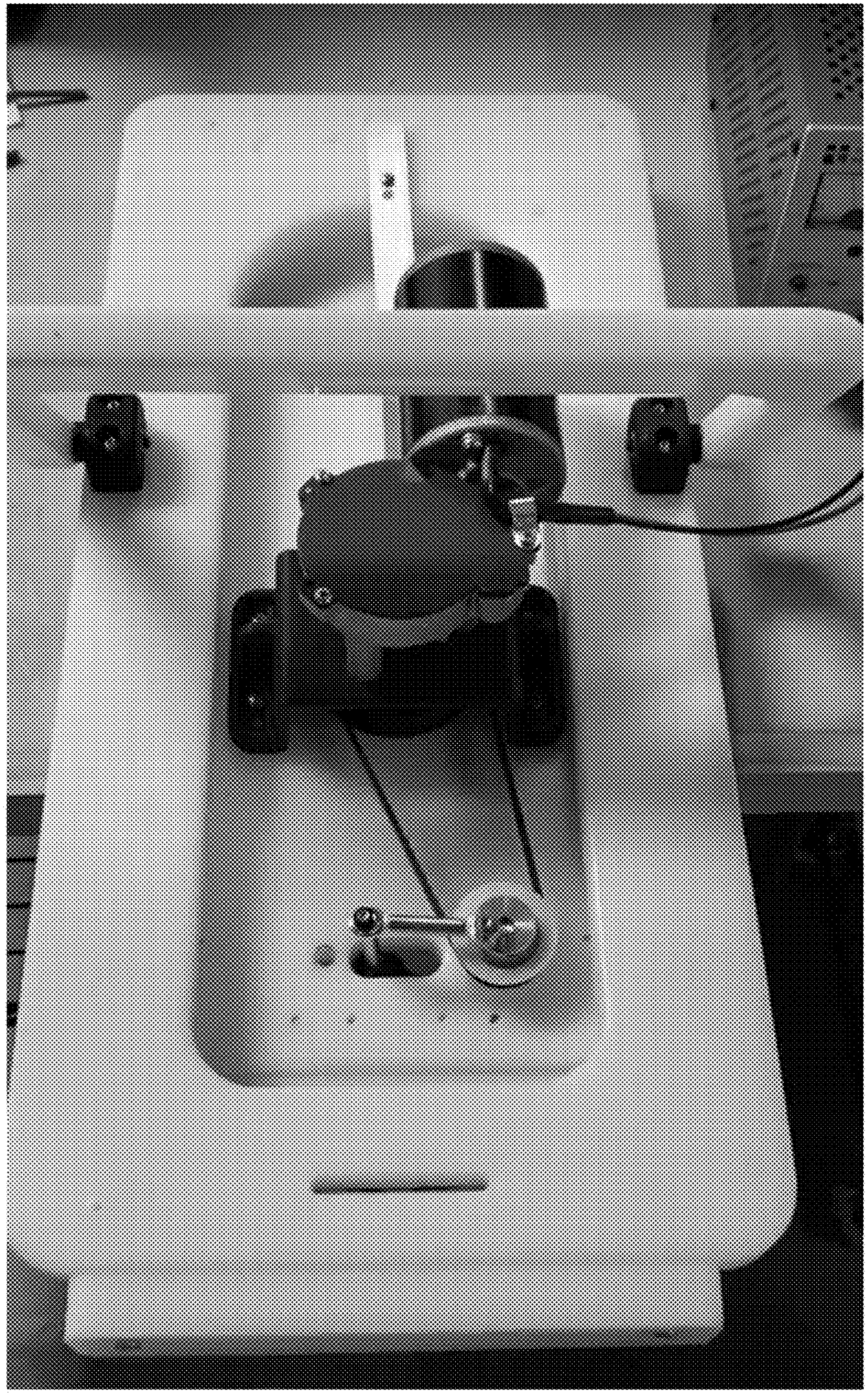
Figure 40:
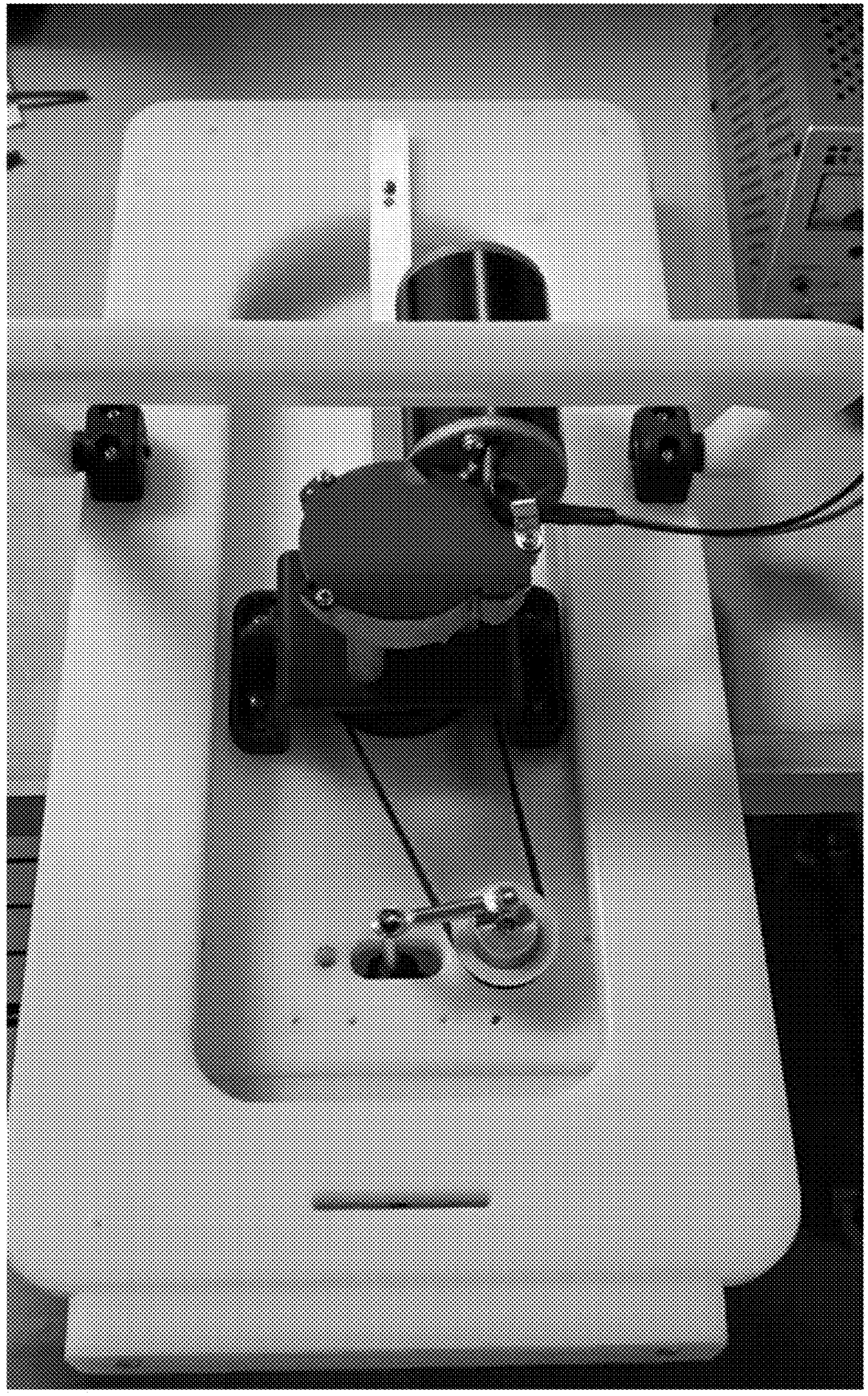
Figure 41:
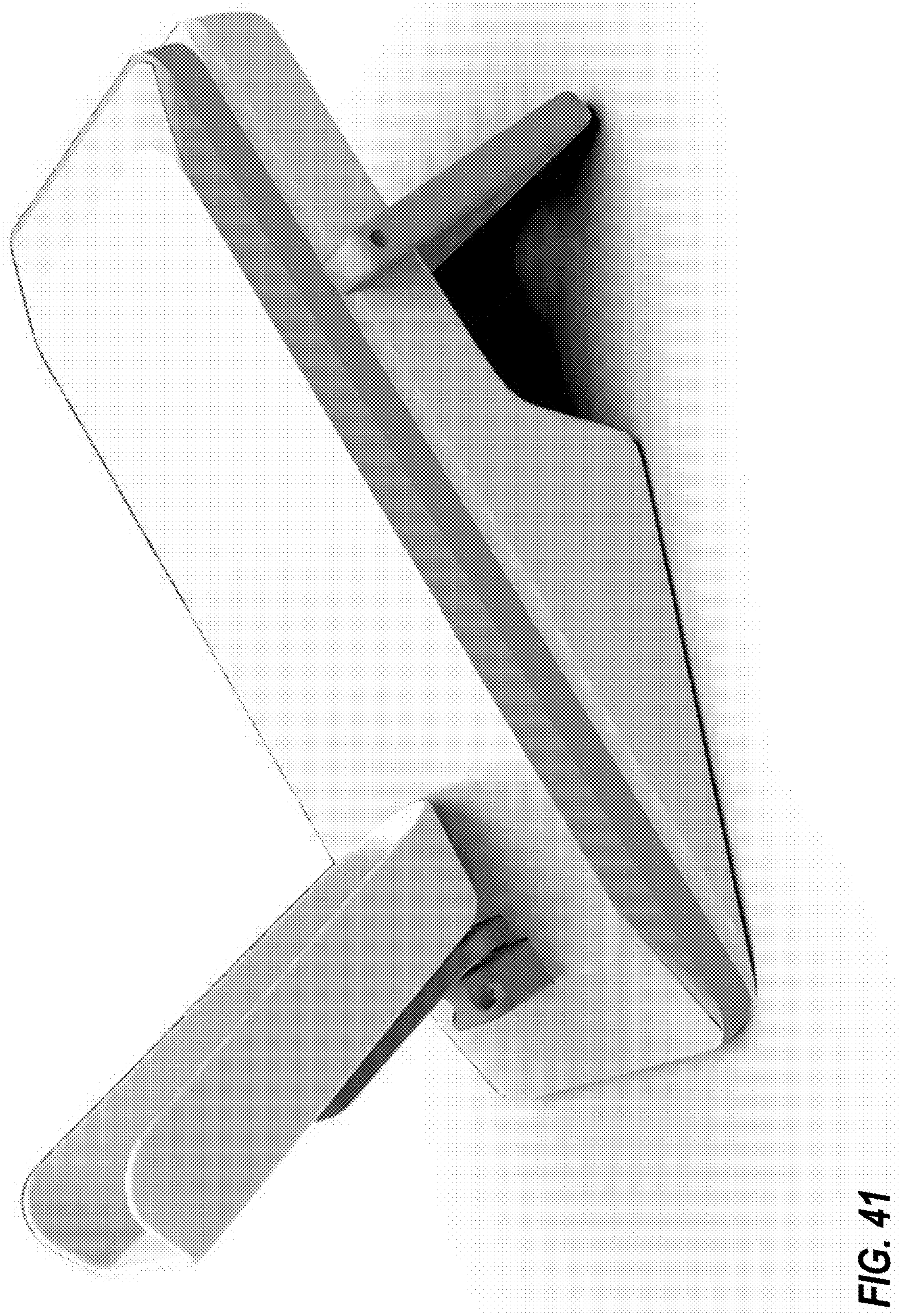
FIGS. 41-45 illustrate additional exemplary micro CPM machines in accordance with one or more preferred implementations.
Figure 42:
Figure 43:
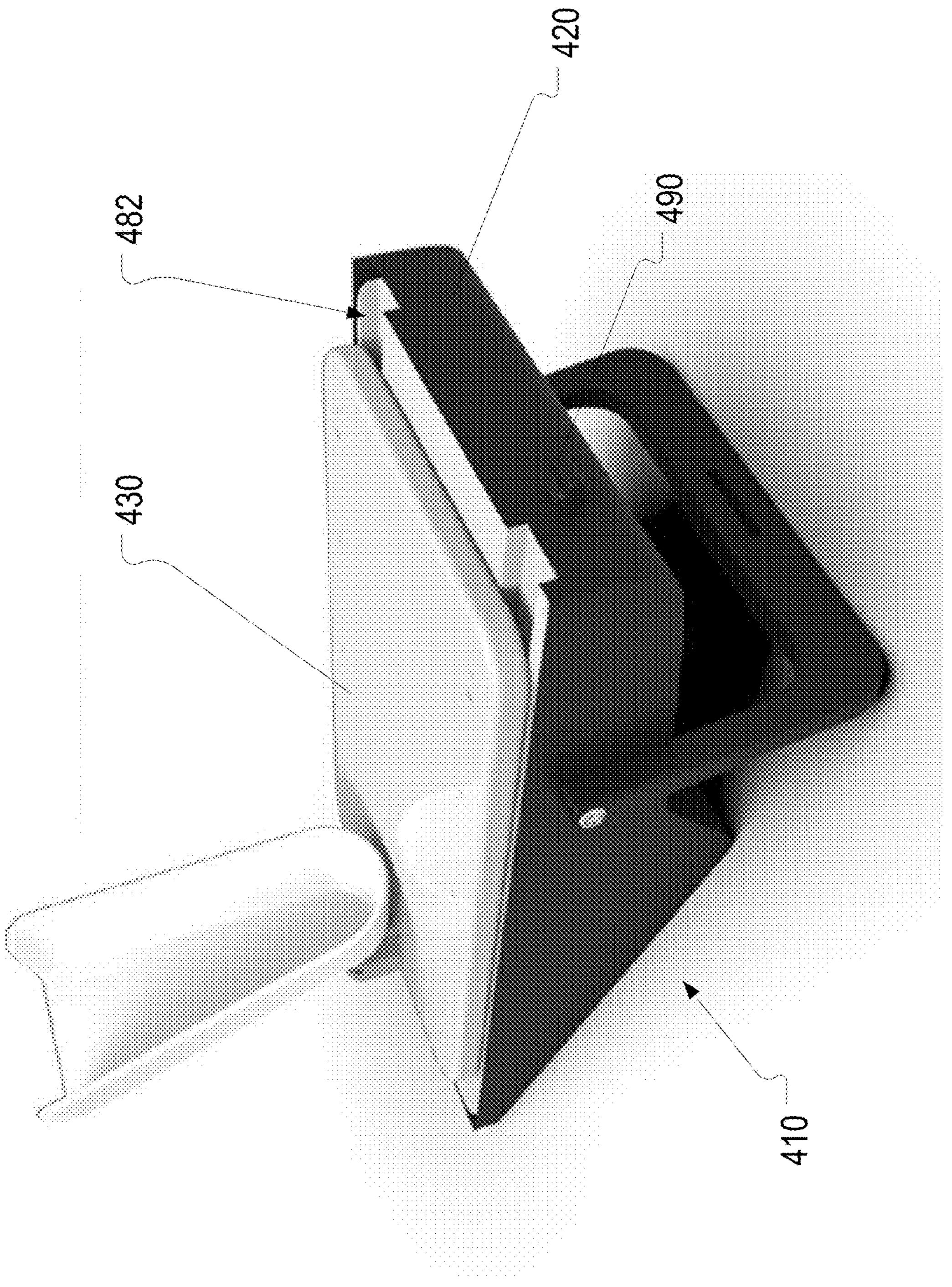

Rotative movement of the secondary rotative component 344 effects, via the pivot strut 348, movement of the pivot shaft 343, as illustrated in FIGS. 38-40. Back and forth movement of the pivot shaft 343 effects movement of the lower end of the pivot member 334 it is received within, which effects pivoting (in the opposite direction) of the upper end of the pivot member 334, which in turn effects rotative movement of a connected foot or leg receiving member. Simultaneously, rotation of the primary rotative component 350, effects, as a result of the connection strut 352, sliding translational movement of the sliding member 330 relative to the base member 320. Thus, the single motor effects both sliding, translational movement of the sliding member 330 relative to the base member 320, and rotative movement of a foot or leg receiving member.

FIGS. 41-45 illustrate additional exemplary micro CPM machines in accordance with one or more preferred implementations. For example, the micro CPM machine 410 of FIG. 43 includes rails 482 defined in the base member 420 configured to facilitate sliding, translational movement of the sliding member 430 relative to the base member 420. The micro CPM machine 410 also includes a control knob 490 configured to both turn the micro CPM machine 410 on and off, and vary the speed of movement of the micro CPM machine 410. In other implementations, e.g. those utilizing multiple motors, multiple control knobs may be utilized.

Figure 44:
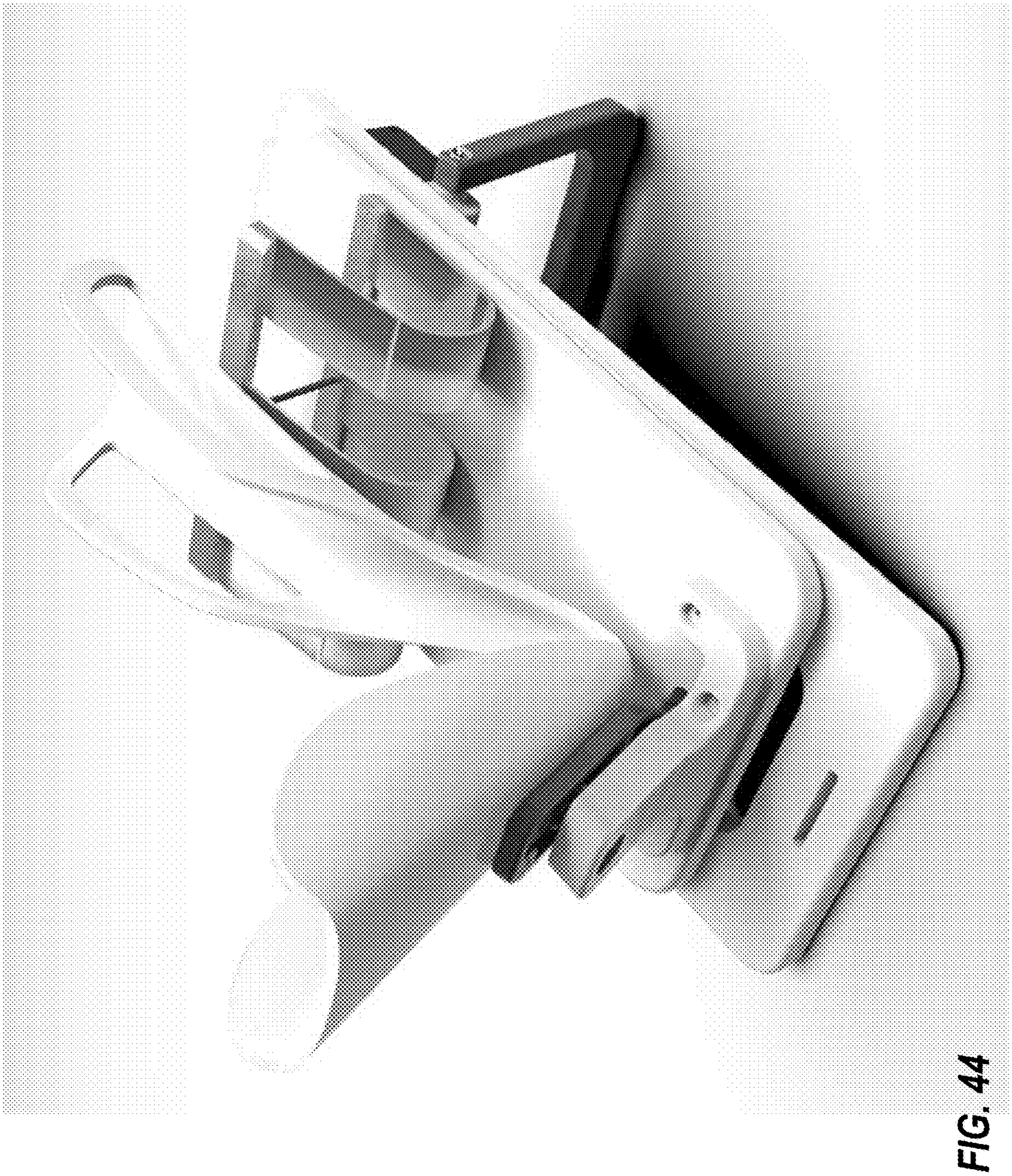
Figure 45:
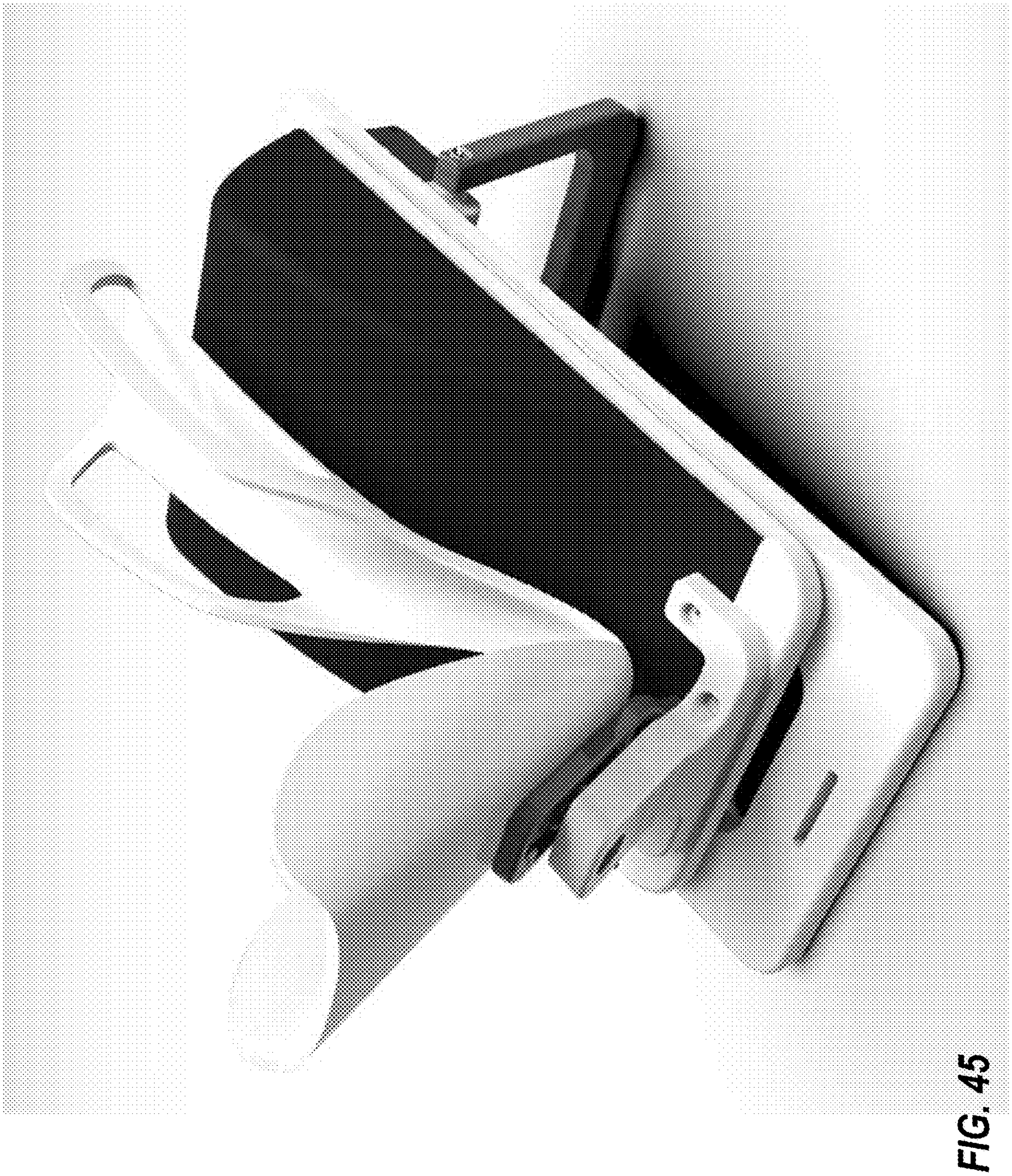

FIG. 44 illustrates another implementation in which leaf springs are utilized to support a leg receiving portion of a leg receiving member, and FIG. 45 illustrates an exemplary implementation in which padding is utilized to support a leg receiving portion of a leg receiving member. In accordance with one or more preferred implementations, padding may be utilized to cover one or more leaf springs.

In accordance with one or more preferred implementations, a CPM machine is configured to deliver high frequency, short arc motion where a motor drives an extremity holder relative to a stationary platform. In accordance with one or more preferred implementations, the motor is attached to the holder to achieve the motion application. In accordance with one or more preferred implementations, the motor is attached to the platform to achieve the motion application.

Figure 46:
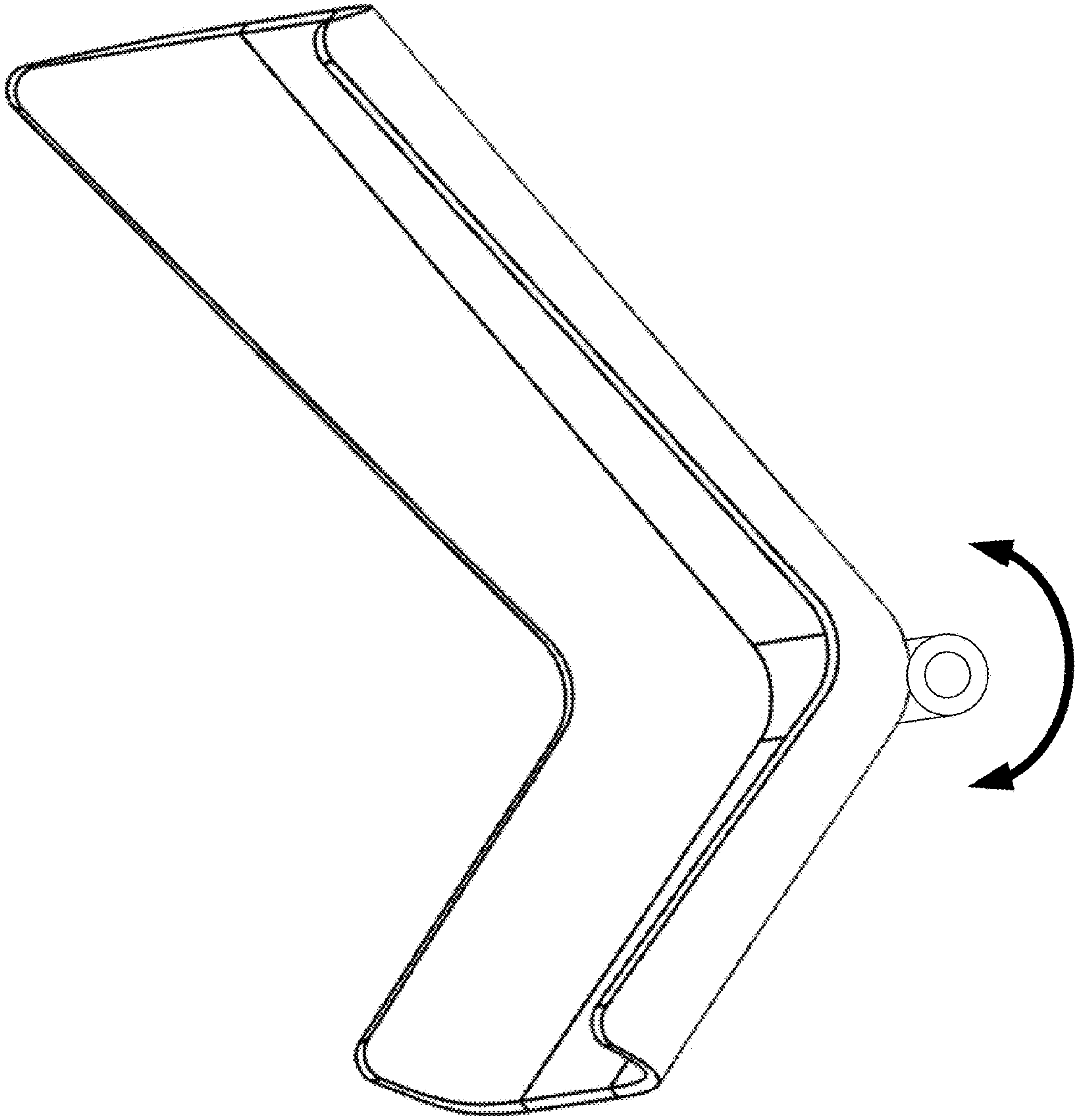
FIGS. 46-47 fancifully illustrate exemplary rolling or rocking movement via illustration of an exemplary simplified mechanism for effecting such rolling or rocking movement.
Figure 47:
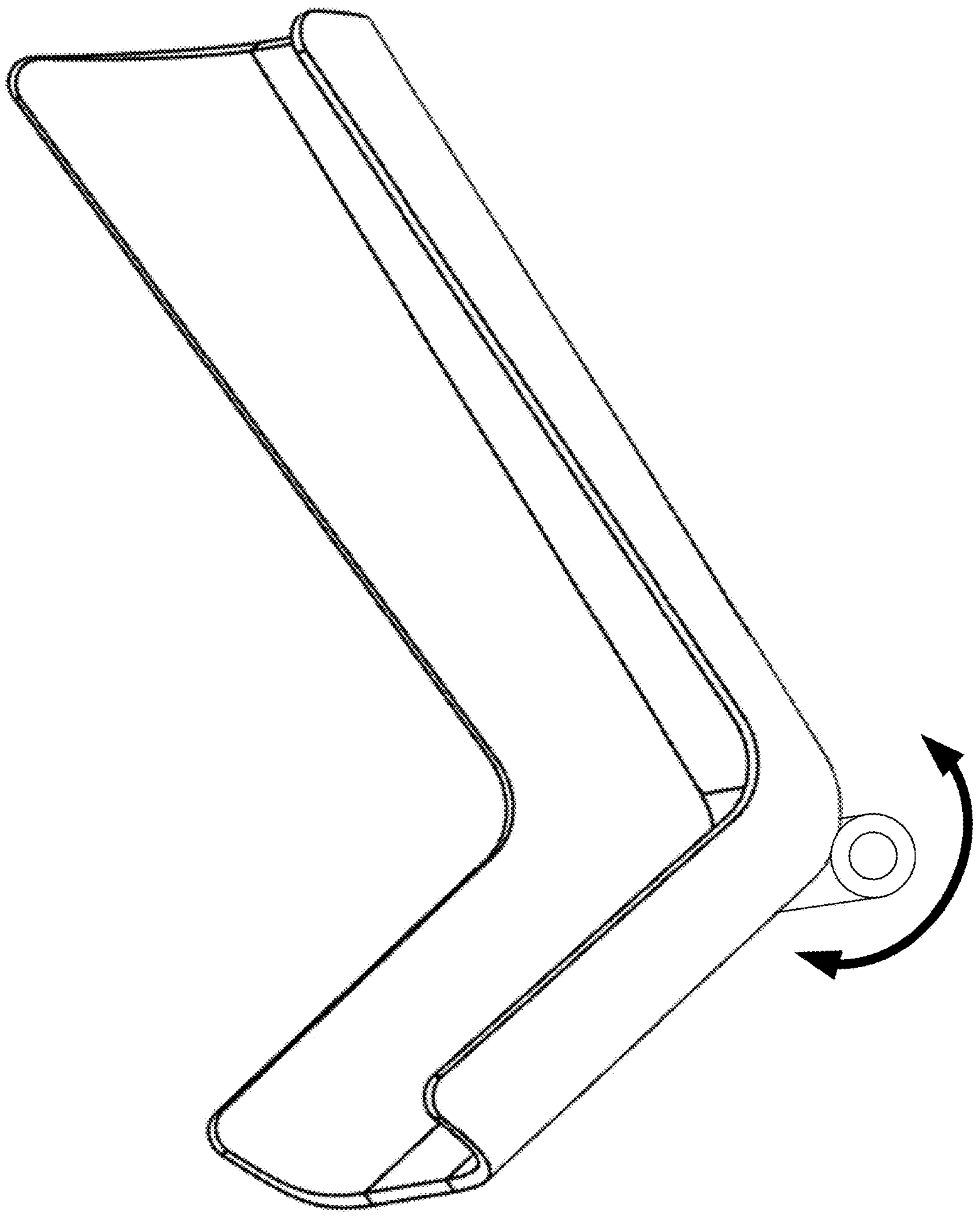

In accordance with one or more preferred implementations, such a machine produces high frequency short arc motion through a rolling or rocking movement of the holder. FIGS. 46-47 fancifully illustrate exemplary such rolling or rocking movement via illustration of an exemplary simplified mechanism for effecting such rolling or rocking movement. In particular, FIGS. 46-47 illustrate a simplified mechanism involving a rotational component which rotates about an axis to effect rolling or rocking movement of an extremity holder component. In accordance with one or more preferred implementations, a motor is attached to the holder to achieve the motion application. In accordance with one or more preferred implementations, a motor is attached to the platform to achieve the motion application.

Although FIGS. 46-47 illustrate connection of a heel of an extremity holder via a simplified mechanism involving a rotational component which rotates about an axis, in accordance with one or more preferred implementations, various different mechanisms and approaches are utilized to connect an extremity holder.

In accordance with one or more preferred implementations, to implement a link or connection to an extremity holder a ball and socket joint is utilized. In accordance with one or more preferred implementations, such a ball and socket joint is configured to restrict range of motion in one or more areas.

In accordance with one or more preferred implementations, a pivot joint or double pivot joint is utilized.

Figure 48:
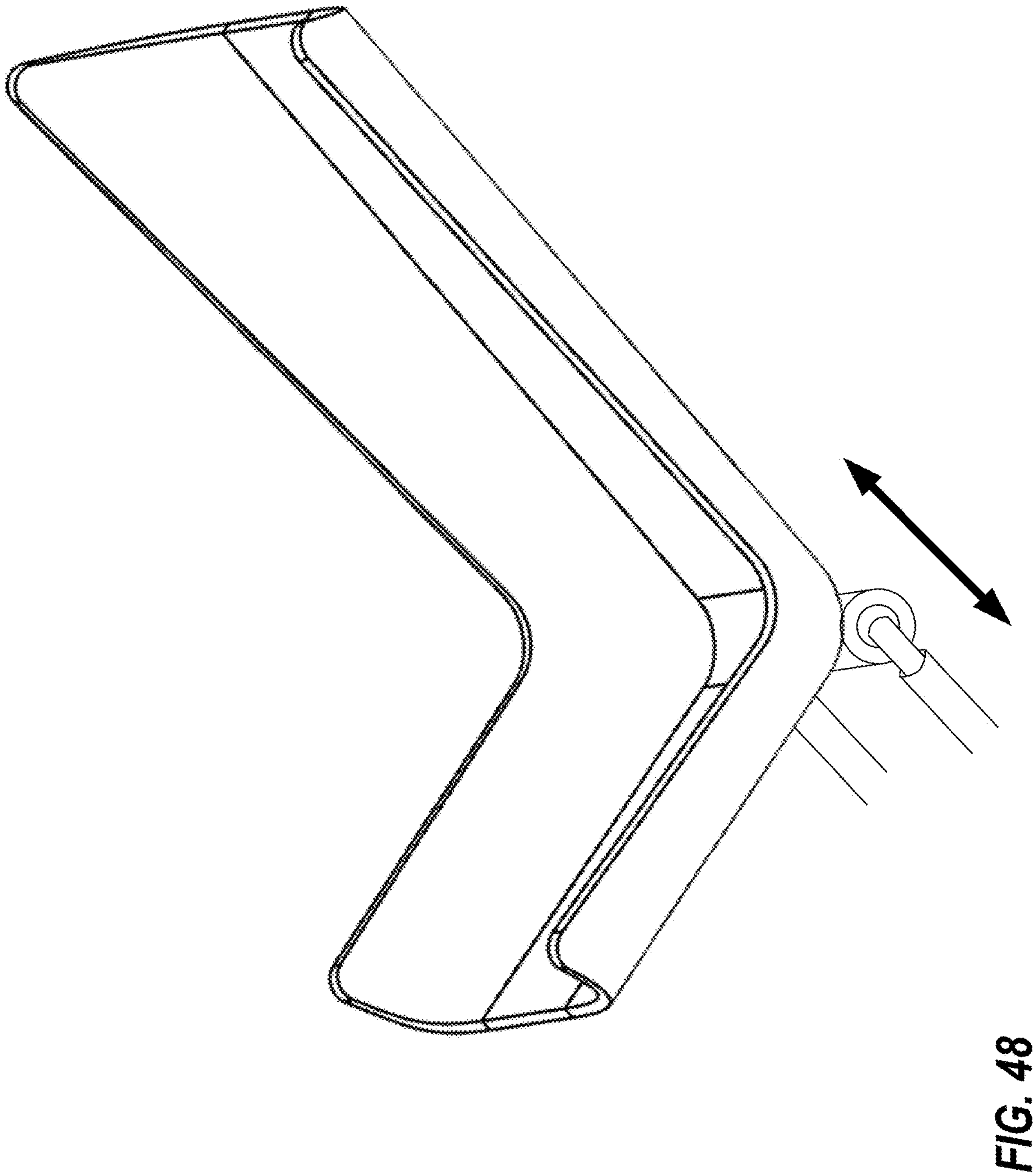
FIGS. 48-49 fancifully illustrate exemplary pistoning movement via illustration of an exemplary simplified mechanism for effecting such pistoning movement.
Figure 49:
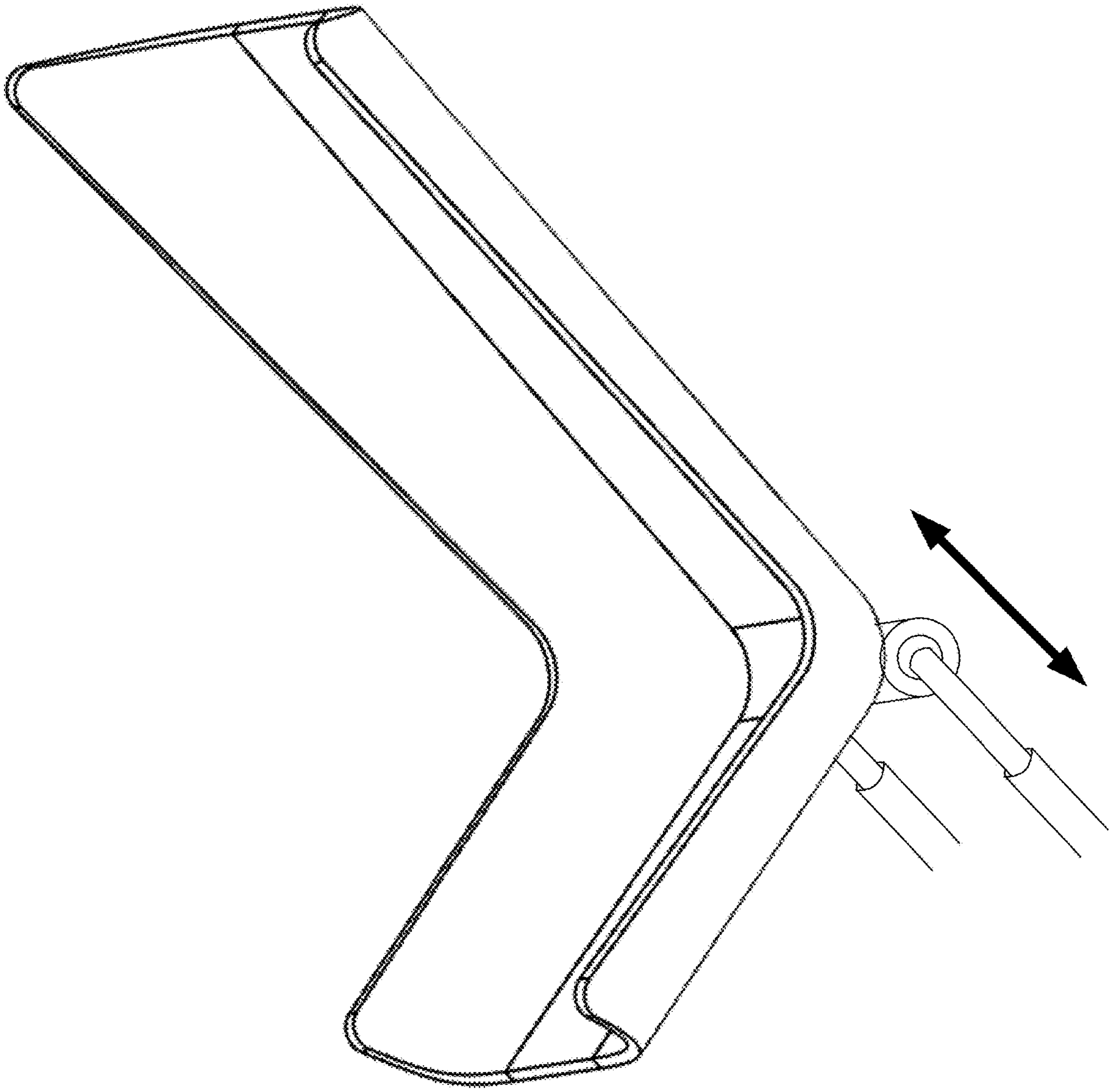

In accordance with one or more preferred implementations, such a machine produces high frequency short arc motion through a pistoning movement of the holder. FIGS. 48-49 fancifully illustrate exemplary such pistoning movement via illustration of an exemplary simplified mechanism for effecting such pistoning movement. In particular, FIGS. 48-49 illustrate a simplified mechanism involving a piston component which rotates about an axis to effect pistoning movement of an extremity holder component. In accordance with one or more preferred implementations, a motor is attached to the holder to achieve the motion application. In accordance with one or more preferred implementations, a motor is attached to the platform to achieve the motion application.

Figure 50:
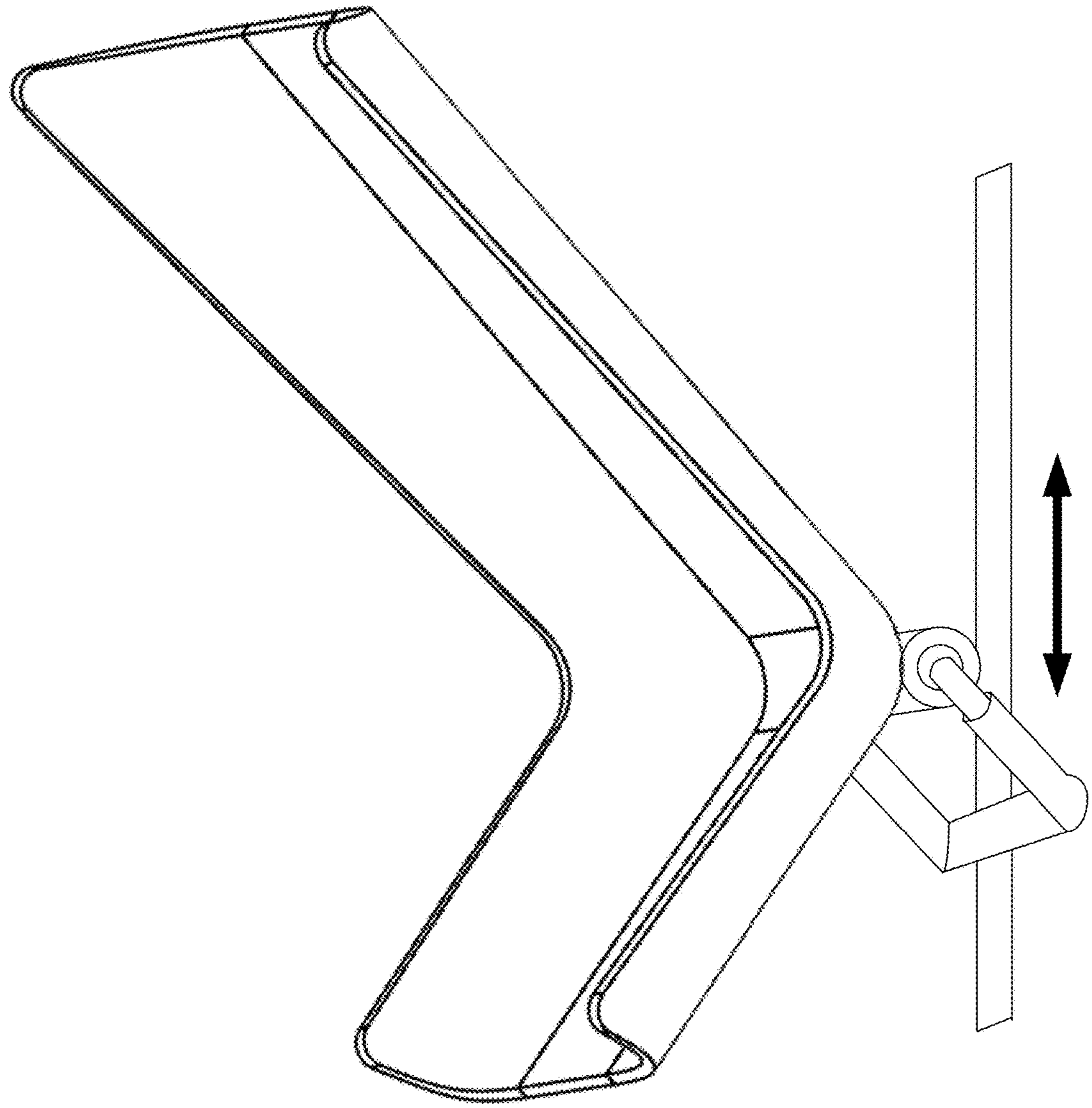
FIGS. 50-51 fancifully illustrate exemplary gliding movement via illustration of an exemplary simplified mechanism for effecting such gliding movement.
Figure 51:
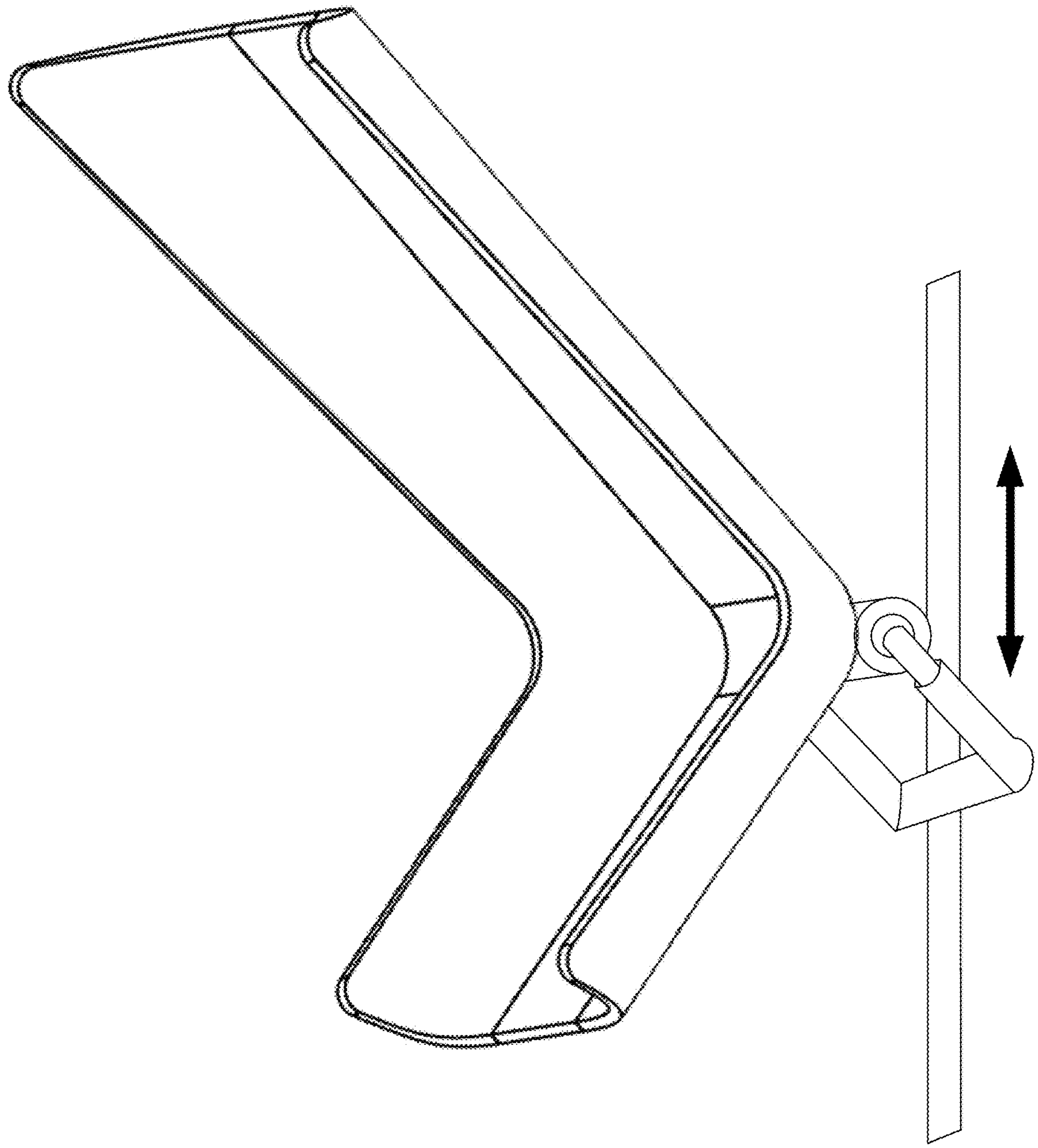

In accordance with one or more preferred implementations, such a machine produces high frequency short arc motion through a gliding movement of the holder. FIGS. 50-51 fancifully illustrate exemplary such gliding movement via illustration of an exemplary simplified mechanism for effecting such gliding movement. In particular, FIGS. 50-51 illustrate a simplified mechanism involving a rotational component which rotates about an axis to effect gliding movement of an extremity holder component. In accordance with one or more preferred implementations, a motor is attached to the holder to achieve the motion application. In accordance with one or more preferred implementations, a motor is attached to the platform to achieve the motion application.

In accordance with one or more preferred implementations, a CPM machine is configured to deliver high frequency, short arc motion via a suspension system. In accordance with one or more preferred implementations, an extremity of a user is received within an extremity holder, which is suspended from a framework. A motorized connection to the holder delivers short arc, high frequency movement. The suspension apparatus allows for partially constrained or unconstrained motion or the extremity.

Figure 52:
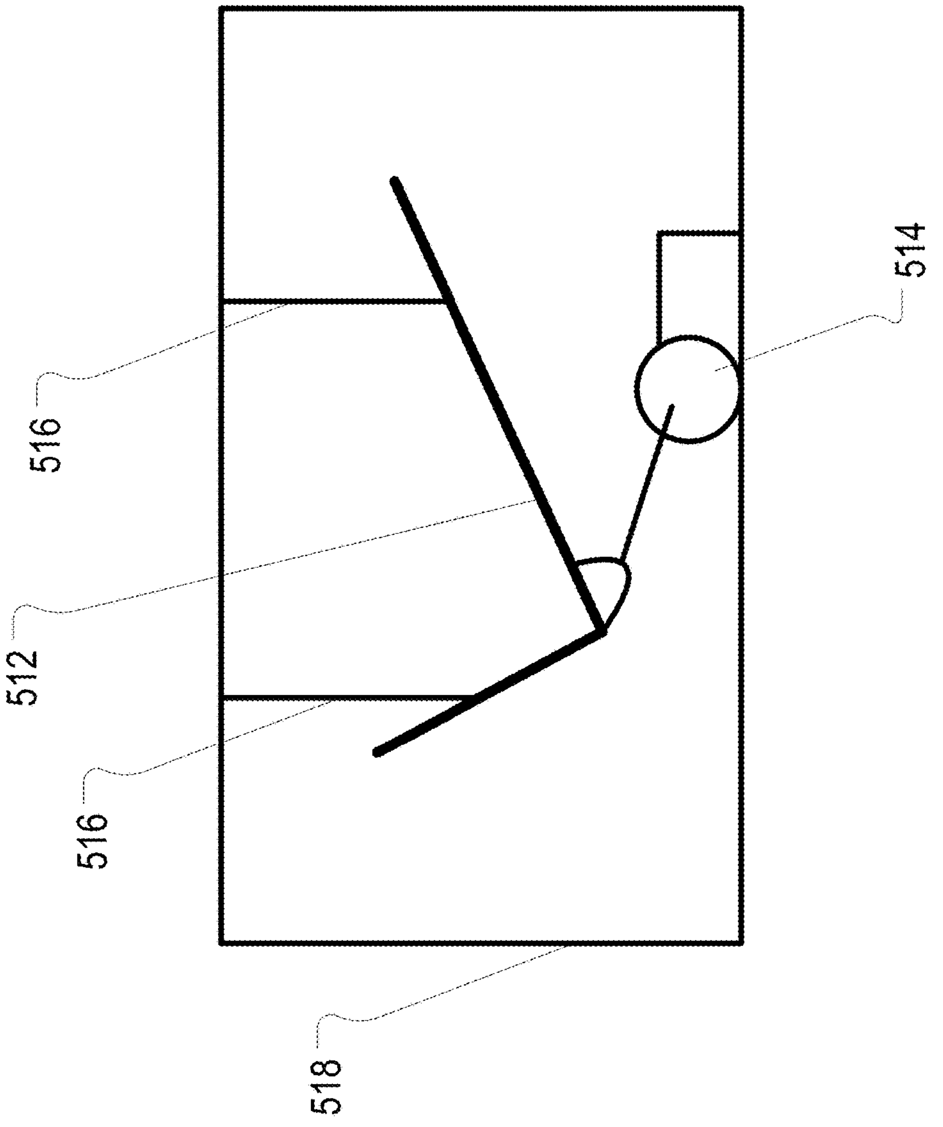
FIG. 52 schematically depicts a suspension CPM machine in accordance with one or more preferred implementations.

FIG. 52 schematically depicts a suspension CPM machine in accordance with one or more preferred implementations. The suspension CPM machine includes a frame 518, elastic bands 516 suspended from the frame, an extremity holder 512 suspended by the elastic bands 516, and a motor 514 for driving movement of the extremity holder 512.

Figure 53:
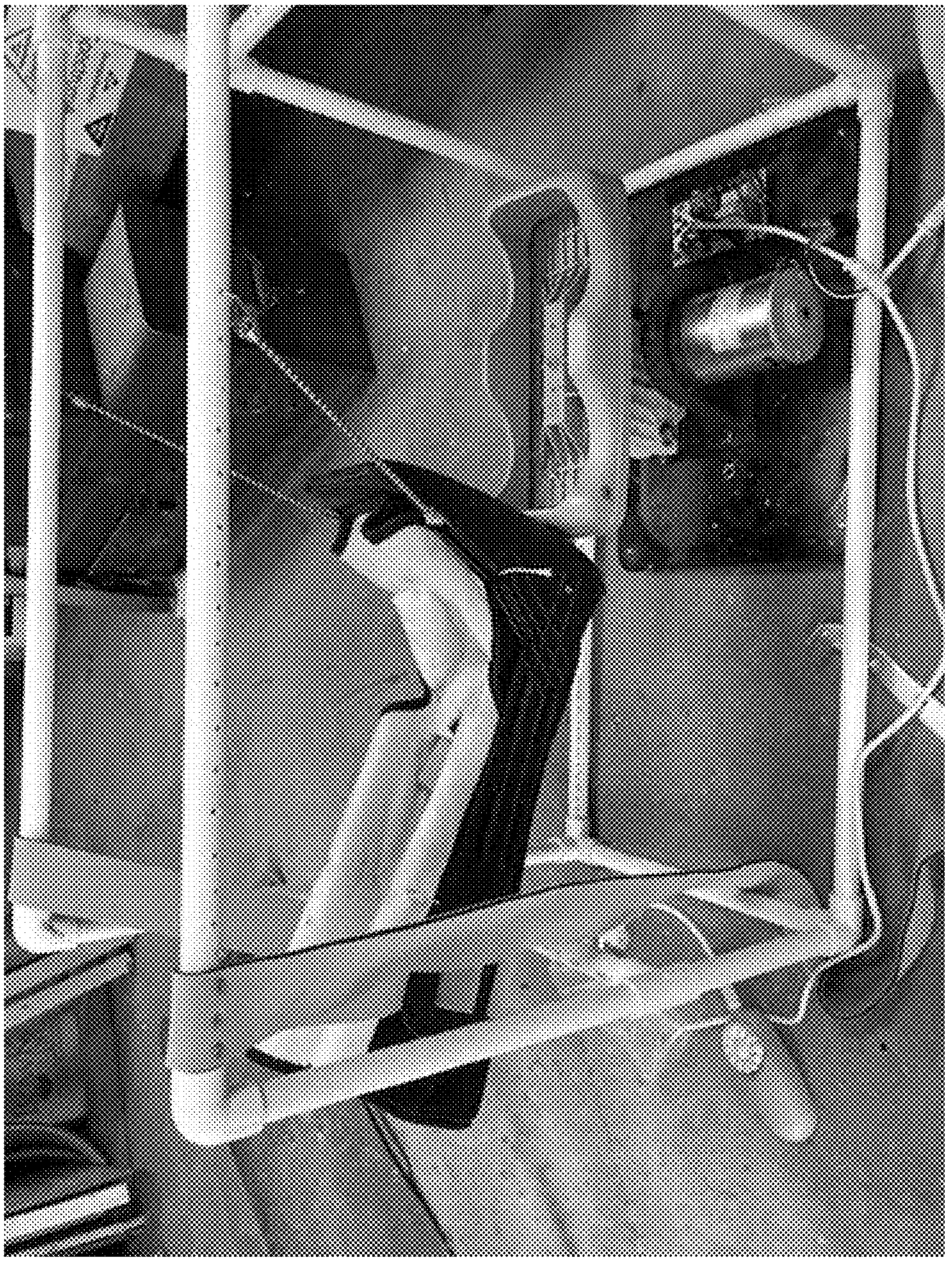
FIG. 53 illustrates an exemplary suspension CPM machine in accordance with one or more preferred implementations.

FIG. 53 illustrates an exemplary suspension CPM machine in accordance with one or more preferred implementations.

In accordance with one or more preferred implementations, a suspension CPM machine includes a suspension system comprising elastic cords, bands, straps or springs which act to elastically dampen movement.

In accordance with one or more preferred implementations, a suspension CPM machine comprises a motor connected to an extremity holder via an elastic component, which acts to dampen motion.

In accordance with one or more preferred implementations, a suspension CPM machine includes electronic connectivity to assess machine utilization and/or functionality.

As noted above, joint movement can be described with reference to directionality, magnitude, frequency, and arc.

In accordance with one or more preferred implementations, a micro CPM machine delivers rapid, short arc movement in one or more planes of motion.

In accordance with one or more preferred implementations, a micro CPM machine is configured to deliver multiplanar motion through two or more planes. In accordance with one or more preferred implementations, a micro CPM machine is configured to deliver uniplanar motion through a single plane.

In accordance with one or more preferred implementations, a micro CPM machine is configured to deliver motion comprising flexion/extension, internal/external rotation, or axial compression/distraction. In accordance with one or more preferred implementations, a micro CPM machine is configured to deliver motion comprising one or more of: flexion, extension, internal rotation, external rotation, axial compression, and distraction.

In accordance with one or more preferred implementations, a micro CPM machine is configured to deliver rapid, short arc motion involving a high frequency or speed of movement. In accordance with one or more preferred implementations, a micro CPM machine is configured to deliver short arc motion involving 1 to 10 degrees of alternating motion. In accordance with one or more preferred implementations, frequency of movement is high frequency, such as, for example, 0.5 Hz to 1000 Hz (vibrational).

In accordance with one or more preferred implementations, micro CPM movement is superimposed on a long arc traditional CPM movement.

In accordance with one or more preferred implementations, directionality, magnitude, frequency, and motion arc are all adjustable and variable.

In accordance with one or more preferred implementations, a micro CPM machine includes control circuitry to control a speed of rotation of one or more rotative components. In accordance with one or more preferred implementations, a micro CPM machine includes a dial or other control mechanism to control a speed of rotation of one or more rotative components. In accordance with one or more preferred implementations, a micro CPM machine includes a control mechanism to control a speed of a motor.

In accordance with one or more preferred implementations, frequency is variable and adjustable. In accordance with one or more preferred implementations, a micro CPM machine is configured to allow for setting of independent speeds per axis or plane of motion.

In accordance with one or more preferred implementations, a preferred angle in one plate may be limited or fixed (e.g. a knee flexion angle) while a micro CPM machine imparts movement in another plane.

In accordance with one or more preferred implementations, a device may be configured to allow for setting of a knee flexion angle or arc of motion specifically to correspond to an area of joint surface damage.

In accordance with one or more preferred implementations, a device may be programmed to engage intermittently at multiple flexion angles.

In accordance with one or more preferred implementations, movements from a passive range of motion machine such as a micro CPM machine are combined with active or active-assist motion.

In accordance with one or more preferred implementations a micro CPM machine is incorporated into a brace.

In accordance with one or more preferred implementations, a micro CPM machine is configured for controlled delivery of joint force. In accordance with one or more preferred implementations, a micro CPM machine is configured for pulsatile axial compression.

In accordance with one or more preferred implementations, a micro CPM machine involves plyometric or spring-assisted reverse points of movement for an arc of movement.

In accordance with one or more preferred implementations, a micro CPM machine is configured to minimize impact or compression forces, e.g. utilizing padding, springs or shock absorbers.

In accordance with one or more preferred implementations, a micro CPM machine is configured to allow for fully passive or active-assist movement. In accordance with one or more preferred implementations, a micro CPM machine is configured to minimize cartilage shear forces.

In accordance with one or more preferred implementations, a micro CPM machine is battery powered and comprises one or more batteries. In accordance with one or more preferred implementations, a micro CPM machine is configured for connection to an electrical outlet. In accordance with one or more preferred implementations, a micro CPM machine is air-propelled.

In accordance with one or more preferred implementations, a micro CPM machine comprises a single motor. In accordance with one or more preferred implementations, a micro CPM machine comprises multiple motors. In accordance with one or more preferred implementations, a single motor is configured to effect one or more movements of a micro CPM device (e.g. both rotational movement of a foot receiving member and sliding, translational movement of a sliding member relative to a base member). In accordance with one or more preferred implementations, a micro CPM machine comprises a cam mechanism for secondary movement.

In accordance with one or more preferred implementations, a micro CPM machine comprises a vibration component in one or more planes.

In accordance with one or more preferred implementations, a micro CPM machine comprises mechanical and electrical mechanisms (e.g. switches) to adjust for variable speeds, cycles, and forces.

In accordance with one or more preferred implementations, a micro CPM machine comprises a pinion mechanism. In accordance with one or more preferred implementations, a micro CPM machine is configured for adjustable differentiation rates of motion.

In accordance with one or more preferred implementations, a micro CPM machine is configured for any bodily joint application. In accordance with one or more preferred implementations, a micro CPM machine is configured for an upper extremity application (e.g. shoulder, elbow, wrist, hand). In accordance with one or more preferred implementations, a micro CPM machine is configured for a lower extremity application (e.g. hip, knee, ankle, foot). In accordance with one or more preferred implementations, a micro CPM machine is configured for a spine application. In accordance with one or more preferred implementations, a micro CPM machine is configured for a jaw application. In accordance with various preferred implementations, a micro CPM machine may be configured for any synovial or cartilaginous joint application where an articulation exists.

In accordance with one or more preferred implementations, a micro CPM machine is configured for sitting, reclined, or supine use. In accordance with one or more preferred implementations, a micro CPM machine is configured for use with one or both opposed extremities. In accordance with one or more preferred implementations, a micro CPM machine is configured for adjustable joint height.

In accordance with one or more preferred implementations, a micro CPM machine is portable.

In accordance with one or more preferred implementations, a micro CPM machine is configured for veterinary applications involving use with one or more joints of an animal.

In accordance with one or more preferred implementations, a micro CPM machine comprises a pressure sensor on a footplate or other body part receiving member.

In accordance with one or more preferred implementations, a micro CPM machine comprises a cycle counter or time meter.

In accordance with one or more preferred implementations, a micro CPM machine is configured for wireless connectivity (e.g. Bluetooth connectivity).

In accordance with one or more preferred implementations, a micro CPM machine comprises a range of motion meter.

In accordance with one or more preferred implementations, use of a micro CPM machine is combined with electrical, ultrasound, and other modalities of pain control and nerve/muscle stimulation.

In accordance with one or more preferred implementations, use of a micro CPM machine is combined with use of high speed video markers (e.g. reflective markers) to monitor range of motion during use of the micro CPM machine and facilitate determination of applied forces.

In accordance with one or more preferred implementations, electronic devices are secured to body parts of a user of a micro CPM machine, and the distance between two or more electronic devices is continually monitored to facilitate determination of range of motion and applied forces.

In accordance with one or more preferred implementations, a micro CPM machine or simultaneously utilized electronics counts a number of rotations or repetitions, monitors how much time is spent on the micro CPM machine, and monitors how much bending of a joint (such as a knee) occurs.

In accordance with one or more preferred implementations, a methodology involves measuring the response of a joint to a micro CPM machine and adjusting the machine accordingly.

In accordance with one or more preferred implementations, a methodology involves utilizing magnetic resonance imaging to generate one or more images during use of a micro CPM machine.

In accordance with one or more preferred implementations, a micro CPM machine oscillates a joint with an elastic recoil at one or more ends of the motion cycle.

In accordance with one or more preferred implementations, a micro CPM machine is platform-based, i.e. moves a joint from a ground-based platform.

In accordance with one or more preferred implementations, a micro CPM machine is portable, e.g. moves a joint from either side of the articulation. In accordance with one or more preferred implementations, a micro CPM machine is incorporated into a brace on a leg, and movement of a wearer's lower leg is driven from the wearer's thigh.

In accordance with one or more preferred implementations, a micro CPM machine utilizes rocking, pistoning, and gliding movement with rotational movement as well (e.g. back and forth rotational movement as illustrated in FIG. 3B).

In accordance with one or more preferred implementations, a micro CPM machine utilizes rocking, pistoning, and gliding movement without rotational movement of the type illustrated in FIG. 3B.

In accordance with one or more preferred implementations, a micro CPM machine utilizes elastic dampening.

In accordance with one or more preferred implementations, a micro CPM machine utilizes elastic oscillation.

In accordance with one or more preferred implementations, a micro CPM machine is configured to provide a bounce at the end of a range of motion, e.g. via use of a bumper, spring, or elastic band.

Based on the foregoing description, it will be readily understood by those persons skilled in the art that the present invention has broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A micro constant passive motion machine for applying short arc constant passive motion to a knee joint of a user, the machine comprising:

(a) a base member including an adjustable stand member rotatably secured thereto;

(b) a sliding member secured to the base member using one or more slide mechanisms which permit sliding, translational movement of the sliding member relative to the base member, the sliding member including a pivot mechanism opening defined therethrough proximate one lengthwise end thereof;

(c) a fixed support member secured to, and extending upward from, a top side of the sliding member;

(d) a pivot member rotatably secured to the fixed support member with a bottom end of the pivot member extending through the pivot mechanism opening defined through the sliding member;

(e) a leg receiving member secured to the pivot member, the leg receiving member being sized and shaped to receive a leg of a user, including a foot of a user;

(f) a motor assembly secured to an underside of the sliding member, the motor assembly comprising (i) a motor, (ii) a primary rotative component including a first pulley and a plurality of connection openings defined in a top side of the primary rotative component;

(g) a second rotative component rotatably secured to the underside of the sliding member proximate the pivot mechanism opening, the second rotative component comprising a second pulley;

(h) a belt mechanically connecting the first pulley of the first rotative component with the second pulley of the second rotative component, such that rotation of the first rotative component by the motor effects rotation of the second rotative component via the belt;

(i) a pivot shaft secured to the bottom end of the pivot member, the pivot shaft being mechanically connected to the second rotative component such that rotation of the second rotative component effects side to side pivoting movement of a bottom of the pivot shaft, which in turn effects rotation of the pivot member and the leg receiving member; and (j) a connection strut secured proximate a first end to the primary rotative component at one of the connection points, and secured proximate a second end to the base member, such that rotation of the primary rotative component effects sliding, translational movement of the sliding member relative to the base member;

(k) wherein the machine is configured such that the motor, when effecting rotation of the primary rotative component, effects both (i) via the connection strut, sliding, translational movement of the sliding member relative to the base member, and (ii) via the belt and the secondary rotative component, rotation of the pivot member and the leg receiving member.

2. The machine of claim 1, wherein the leg receiving member comprises a foot receiving portion.

3. The machine of claim 1, wherein the leg receiving member comprises a leg support portion.

4. The machine of claim 1, wherein the plurality of connection openings defined in the top side of the primary rotative component are arranged in a spiral configuration.

5. The machine of claim 1, wherein the leg receiving member is secured directly to the pivot member.

6. The machine of claim 1, wherein the leg receiving member is secured to the pivot member with a hinge member.

7. The machine of claim 1, wherein the machine comprises one or more springs secured to the base member and the sliding member configured to dampen sliding, transitional movement of the sliding member at one or both ends of a range of motion.

8. The machine of claim 1, wherein the machine comprises one or more shock absorbers configured to dampen sliding, transitional movement of the sliding member at one or both ends of a range of motion.

9. The machine of claim 1, wherein the machine comprises one or more springs secured to the base member and the sliding member configured to assist in lifting of a leg of a user during an up stroke.

10. The machine of claim 1, wherein the secondary rotative component comprises a groove receiving and retaining in floating engagement therein an end of the pivot shaft.

11. The machine of claim 1, wherein the secondary rotative component comprises a groove receiving and retaining in floating engagement therein an end of the pivot shaft, and wherein the groove is shaped to effect a single oscillation per revolution.

12. The machine of claim 1, wherein the secondary rotative component comprises a groove receiving and retaining in floating engagement therein an end of the pivot shaft, and wherein the groove is shaped to effect two oscillations per revolution.

13. The machine of claim 1, wherein the secondary rotative component comprises a groove receiving and retaining in floating engagement therein an end of the pivot shaft, and wherein the groove is shaped to effect three oscillations per revolution.

14. The machine of claim 1, wherein the secondary rotative component comprises a groove receiving and retaining in floating engagement therein an end of the pivot shaft, and wherein the groove is shaped to effect four oscillations per revolution.

15. The machine of claim 1, wherein a pivot strut is secured at one end to the pivot shaft, and is secured at its opposite end to a bottom face of the secondary rotative component such that rotation of the secondary rotative component effects, via the pivot strut, movement of a bottom of the pivot shaft.

16. The machine of claim 1, wherein the machine comprises a plurality of rotatable stand members.

17. The machine of claim 1, wherein the machine further comprises one or more leaf springs supporting the leg receiving member.

18. The machine of claim 1, wherein the machine further comprises one or more leaf springs supporting a calf portion of the leg receiving member.

* * * * *